United States Patent [19]
Dulong

[11] Patent Number: 5,881,312
[45] Date of Patent: *Mar. 9, 1999

[54] MEMORY TRANSFER APPARATUS AND METHOD USEFUL WITHIN A PATTERN RECOGNITION SYSTEM

[75] Inventor: Carole Dulong, Saratoga, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 762,546

[22] Filed: Dec. 9, 1996

Related U.S. Application Data

[63] Continuation of Ser. No. 34,678, Mar. 19, 1993, abandoned.

[51] Int. Cl.$^6$ .................................................. G06F 13/00
[52] U.S. Cl. .......................................... 395/827; 382/181
[58] Field of Search .................................... 395/823, 840, 395/855, 854, 606, 827; 382/218, 229, 231, 303, 181; 711/219, 220

[56] References Cited

U.S. PATENT DOCUMENTS

| | | |
|---|---|---|
| 4,084,235 | 4/1978 | Hirtle et al. . |
| 4,209,841 | 6/1980 | Bambara et al. ...................... 395/854 |
| 4,295,193 | 10/1981 | Pomerene . |
| 4,373,191 | 2/1983 | Fette et al. . |
| 4,395,699 | 7/1983 | Steinberg ............................. 382/218 |
| 4,414,626 | 11/1983 | Arai et al. ............................. 395/854 |
| 4,532,587 | 7/1985 | Roskell et al. . |
| 4,654,785 | 3/1987 | Nishiyama et al. . |

(List continued on next page.)

FOREIGN PATENT DOCUMENTS

| | | |
|---|---|---|
| 0550865 | 12/1992 | European Pat. Off. . |
| 58-24975 | 8/1981 | Japan . |
| 63-282586 | 5/1987 | Japan . |

OTHER PUBLICATIONS

Labrousse et al., "Create–Life: A Modular Design Approach for High Performance ASICs", Presented at Compcon 90, San Francisco, 28 Feb.–Mar., 1990.

Adams et al., "Utilising Low Level Parallelism in General Purpose code: The HARP Project", Microprocessing and Microprogramming 29 (1990) 137–149.

DeGloria et al., "A Programmable Instruction Format Extension to VLIW Architectures", Comp Euro 1992 Proceedings, May 4–8, 1992, pp. 35–40.

Matterne et al., "A Flexible High Performance 2–D Discrete Cosine Transform IC", Phillips Research Laboratories, IEEE 1989, pp. 618–621.

Houzet et al., "GFlops: A General Flexible Linearly Organized Parallel Structure for Images", IEEE 1991, pp. 431–444.

Steven et al., "iHarp: A Multiple Instruction Issue Processor", IEEE Proceedings –E, vol. 139, No. 5, Sep. 1992.

*Primary Examiner*—Jack A. Lane
*Attorney, Agent, or Firm*—Blakely, Sokoloff, Taylor & Zafman LLP

[57] ABSTRACT

A computer implemented apparatus and method for transferring information from one set or sets of memory locations to another set or sets of memory locations. The present invention has particular advantageous use within a computer system specially implemented for pattern recognition applications, such as handwriting or voice recognition. The present invention includes a system with an automatic sequencer able to sequentially generate sequential source and destination addresses and able to generate appropriate data requests to internal and external memory controllers. The present invention memory to memory transfer unit allows memory transfer operations to occur in parallel with the operation of arithmetic pipelines that process pattern recognition procedures. Therefore, using the present invention, no additional processing time is consumed by a memory transfer. Double buffering is utilized to transfer information and process information in the same time frame.

4 Claims, 18 Drawing Sheets

U.S. PATENT DOCUMENTS

| | | |
|---|---|---|
| 4,766,566 | 8/1988 | Chuang . |
| 4,790,026 | 12/1988 | Gennery et al. . |
| 4,819,233 | 4/1989 | Delucia et al. . |
| 4,849,921 | 7/1989 | Yasumoto et al. . |
| 4,953,115 | 8/1990 | Kanoh . |
| 4,982,352 | 1/1991 | Taylor et al. . |
| 5,014,327 | 5/1991 | Potter et al. ............................ 382/218 |
| 5,045,993 | 9/1991 | Murakami et al. .................... 395/375 |
| 5,050,068 | 9/1991 | Dollas et al. . |
| 5,051,940 | 9/1991 | Vassiliadis et al. . |
| 5,111,512 | 5/1992 | Fan et al. . |
| 5,142,634 | 8/1992 | Fite et al. . |
| 5,148,386 | 9/1992 | Hori . |
| 5,202,967 | 4/1993 | Matsuzaki et al. . |
| 5,203,002 | 4/1993 | Wetzel . |
| 5,226,091 | 7/1993 | Howell et al. . |
| 5,255,378 | 10/1993 | Crawford ................................ 395/855 |
| 5,265,174 | 11/1993 | Nakatsuka .............................. 382/227 |
| 5,299,321 | 3/1994 | Iizuka . |
| 5,303,356 | 4/1994 | Vassiliadis et al. . |
| 5,333,209 | 7/1994 | Sinden et al. . |
| 5,333,280 | 7/1994 | Ishikawa et al. . |
| 5,371,864 | 12/1994 | Chuang . |
| 5,404,552 | 4/1995 | Ikenga . |
| 5,408,625 | 4/1995 | Narita et al. . |
| 5,416,913 | 5/1995 | Grochowski et al. . |
| 5,434,872 | 7/1995 | Petersen et al. ........................ 395/854 |
| 5,437,042 | 7/1995 | Culley et al. ........................... 395/854 |
| 5,452,432 | 9/1995 | Macachor ................................ 395/854 |
| 5,459,798 | 10/1995 | Bailey et al. ........................... 382/218 |
| 5,617,486 | 4/1997 | Chow et al. . |

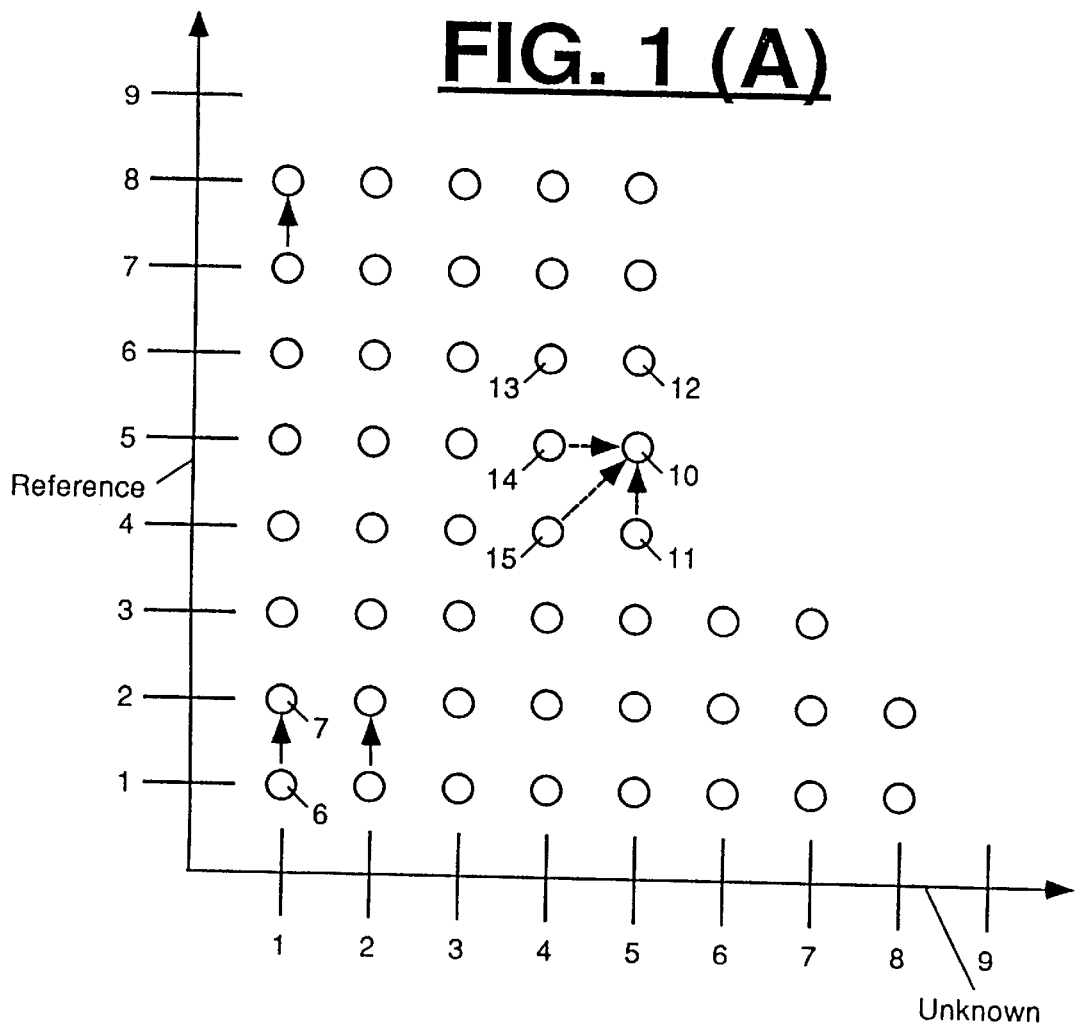

MEMORY TRANSFER APPARATUS AND METHOD USEFUL WITHIN A PATTERN RECOGNITION SYSTEM

This is a continuation of application Ser. No. 08/034,678, filed Mar. 19, 1993, now abandoned.

TABLE OF CONTENTS

TABLE OF CONTENTS
BACKGROUND OF THE INVENTION
SUMMARY OF THE INVENTION
BRIEF DESCRIPTION OF THE DRAWINGS
DETAILED DESCRIPTION OF THE INVENTION
   I. Introduction
   II. DTW and HMM Pattern Recognition Procedures
   III. Overall Computer System of the Present Invention
     A. System Components (Hardware)
     B. DTW and HMM Procedure Partitioning (Software)
     C. Communication Interface between a PR Engine and CPU
   IV. Pattern Recognition Engine 525
     A. Overview of Components of Pattern Recognition Engine
   V. Execution Unit 430 of the Pattern Recognition Engine 525
     A. Overview of Components of Execution Unit 430
     B. Arithmetic/Pointer Pipelines of the Execution Unit 430
     C. Instruction Formatting of the Present Invention
     D. Distance Arithmetic Pipeline 38 of the Present Invention
     E. Pointer Pipeline 35a of the Present Invention
       Asymmetric Source Type Format of the Present Invention
       Byte or Word Accessing in Memory Without Processing Penalty
     F. Control Pipeline 454 of the Execution Unit 430
     G. Memory to Memory Transfer Unit 416
   VI. Specialized Instructions within the Present Invention
     A. The Case Instruction
     B. Manhattan Distance Instruction of the Present Invention
   VII. Program Examples for Lower Level Procedures
     A. Dynamic Time Warping Pattern Recognition Example
     B. Hidden Markov Models Pattern Recognition Example
CLAIMS
ABSTRACT OF THE INVENTION

BACKGROUND OF THE INVENTION

1. Field of the Invention

The present invention relates to the field of memory transfers of information. Specifically the present invention relates to the field of memory to memory transfers of information within a computer system that may be specially adapted for pattern recognition applications.

2. Prior Art

The ability to store and accurately recognize patterns is a particularly good application for general computer systems. Computer systems offer the unique ability to process at high speeds specialized procedures and information formats that are developed for the field of pattern recognition. Using pattern recognition technology, a computer system can be advantageously utilized to respond to variable patterns of information (such as handwritten characters and voice) rather than rigid input devices, such as a keyboard input device. Using such technology, a computer system can be utilized to recognize visible patterns, such as pictures and video frame, or audible patterns, such as voice and other sounds, or movement patterns such as handwriting. Computer systems that process the vast amount of information required to perform pattern recognition applications must provide adequate mechanisms for rapid and efficient movement of information between memory devices. It would be advantageous, then, to provide a computer system with an efficient mechanism for transferring information quickly and without consuming valuable computation time which can be useful in conjunction with a pattern recognition system. The present invention offers such capability.

Typically, a library of reference or prototype patterns may be stored within the memory storage devices of a general purpose computer system implemented by software for pattern recognition. Each library pattern is further composed of many individual points or states that, in total, comprise the pattern representation; this format of points or states also constitutes an input unknown pattern or patterns. These known library reference patterns are then individually compared against the input patterns. The general purpose computer systems of the prior art are programmed to individually compare, point by point, or state by state, the individual components of a particular reference pattern to the individual components of the input unknown pattern. This continues for each reference pattern in the library of patterns involving a large amount of repetitive processing tasks and predictable movement of different information from memory store to memory store. For each pattern a match path is developed that indicates the level of identity between the unknown and the reference patterns. Reference patterns with good match paths are then selected by the computer system as candidates for a resultant match. The computer system then analyzes each of the reported candidates to determine which is best matched the unknown input pattern. It would be advantageous to provide an efficient system to rapidly transfer prototype information from a base or reference library into a working memory area for direct comparisons without consuming valuable processing time from execution units that perform the unknown pattern to reference pattern comparisons. The present invention offers such advantageous capability.

Heretofore, data cache systems have been employed for more efficient data access to and from predetermined destination and source addresses. Although cache memory transfer systems may operate advantageously in some applications, they are not necessarily effective in the realm of pattern recognition applications particularly in the area of information transfer of reference patterns and results between alternate memory stores. This is the case because data cache systems take advantage of the fact that often the same information is accessed sequentially and this often reused information may be stored in a special memory ("cache") for quick access over and over again. In other words, a cache based system exploits data "locality" where data is used and stored in a special location to be used over again. However, in the area of pattern recognition, the unknown information pattern is rarely duplicative of a prior unknown pattern. And if possibly duplicative, the occurrence is very rare and would never justify the complexity of a data cache. Furthermore, each of the reference libraries, by definition, are different and therefore a cache would not contribute greatly to the processing efficiency of transferring such reference patterns. There would be no reason to include duplicate reference patterns within the same library. Each of the library reference patterns are unique and thus add more intelligence to any pattern recognition system that utilizes the library. Further, since the input comparison information is not similar from pattern to pattern, the results of these comparisons are not duplicative either. These results must be transferred from the recognition engine to some alternative or temporary storage area. Therefore, since the information transfers involved within pattern recognition systems are not duplicative, and the same data is not constantly reused, a data cache system does not offer advantageous capabilities within this environment.

It would be advantageous to provide a memory transfer capability that would provide rapid and efficient transfer of information that may not be related sequentially or duplicative in any way, while not consuming valuable processing time. The present invention offers such capability. It would further be advantageous to offer such a system within a pattern recognition system. The present invention offers such functionality.

Accordingly, it is an object of the present invention to provide a memory transfer system for transferring information from one set or sets of memory locations to another set or sets of memory locations in an efficient and rapid method. It is further an object of the present invention to provide such a memory transfer operation within a general purpose computer system that is specially optimized for pattern recognition applications. It is further an object of the present invention to provide a memory to memory transfer system that can efficiently transfer pattern information that may not be related sequentially or duplicative in any way (i.e., pattern information that does not have the property of data locality). It is further an object of the present invention to provide such a memory transfer system that does not consume valuable computer processing time that is being used in a pattern recognition procedure for comparing a set of values representative of an unknown pattern to sets of values representative of reference patterns. It is an object of the present invention to provide a memory to memory transfer system that integrates to a pen based computer system to provide a more efficient system for handwriting recognition. It is an object of the present invention to provide a memory to memory transfer system that integrates to a general purpose computer system to provide a more efficient system for voice recognition. It is further an object of the present invention to provide a memory to memory transfer capability that may be substantially programmer controlled rather than hardware controlled (such as a cache unit).

SUMMARY OF THE INVENTION

A computer implemented apparatus and method for transferring information from one set or sets of memory locations to another set or sets of memory locations is presented herein. The present invention has particular advantageous use within a computer system specially implemented for pattern recognition applications, such as handwriting or voice recognition. The present invention includes a system with an automatic sequencer able to sequentially generate sequential source and destination addresses and able to generate appropriate data requests to internal and external memory controllers. The present invention memory to memory transfer unit allows memory transfer operations to occur in parallel with the operation of arithmetic pipelines that process pattern recognition procedures. Therefore, using the present invention, no additional processing time is consumed by a memory transfer operation. Double buffering is utilized to transfer information and process information in the same time frame.

Embodiments of the present invention include a memory transfer apparatus for transferring pattern information between memory means of a pattern recognition system, the memory transfer apparatus comprising: memory transfer means for performing memory transfer operations by automatically generating destination and source addresses and for automatically generating memory access requests to transfer information from the source addresses to the destination addresses; external memory means for storage of a plurality of pattern recognition reference patterns, the external memory means coupled to receive the memory access requests; and internal multiported memory means for storage of an unknown pattern and selected pattern recognition reference patterns. Further embodiments of the present invention include the above wherein the memory transfer means comprises: means for generating sequential destination addresses starting from an initial destination address register which remains constant; means for generating sequential source addresses starting from an initial source address register which remains constant; and means for counting a predetermined number of the memory access requests starting from an initial count register which remains constant.

The present invention includes a memory transfer apparatus for transferring pattern information between memory means of a pattern recognition system as described above wherein the memory transfer means transfers a selected next reference pattern into the internal multiported memory means while the internal multiported memory means is accessed to compare the unknown pattern to a previously transferred reference pattern. The present invention also includes a memory transfer apparatus for transferring pattern information between memory means of a pattern recognition system as described above wherein the memory transfer means transfers results of a first comparison between the unknown pattern and a selected first reference pattern from the internal multiported memory means to the external memory means while a second comparison is performed between the unknown pattern and a selected second reference pattern, the unknown pattern and the selected second reference pattern within the internal multiported memory means.

The present invention includes the above apparatus invention and also a method of transferring data within a pattern recognition system comprising the steps of: generating sequential destination addresses by referencing from a constant initial register and updating a working destination address register; generating sequential source addresses by referencing from a constant initial register and updating a working source address register, storing a library of reference patterns in an external memory means; storing within an internal memory means an unknown pattern, selected reference patterns from the library and comparison results; and generating memory access requests to the internal memory means and to the external memory means to transfer information between the external memory means and the internal memory means from the source addresses to the destination addresses, the step of generating memory requests comprising the steps of: transferring a first reference pattern from the library to the internal memory means; and transferring a second reference pattern from the library to the internal memory means while the internal memory means is being accessed to compare the first reference pattern with the unknown pattern.

DETAILED DESCRIPTION OF THE INVENTION

I. Introduction

Figure 1:
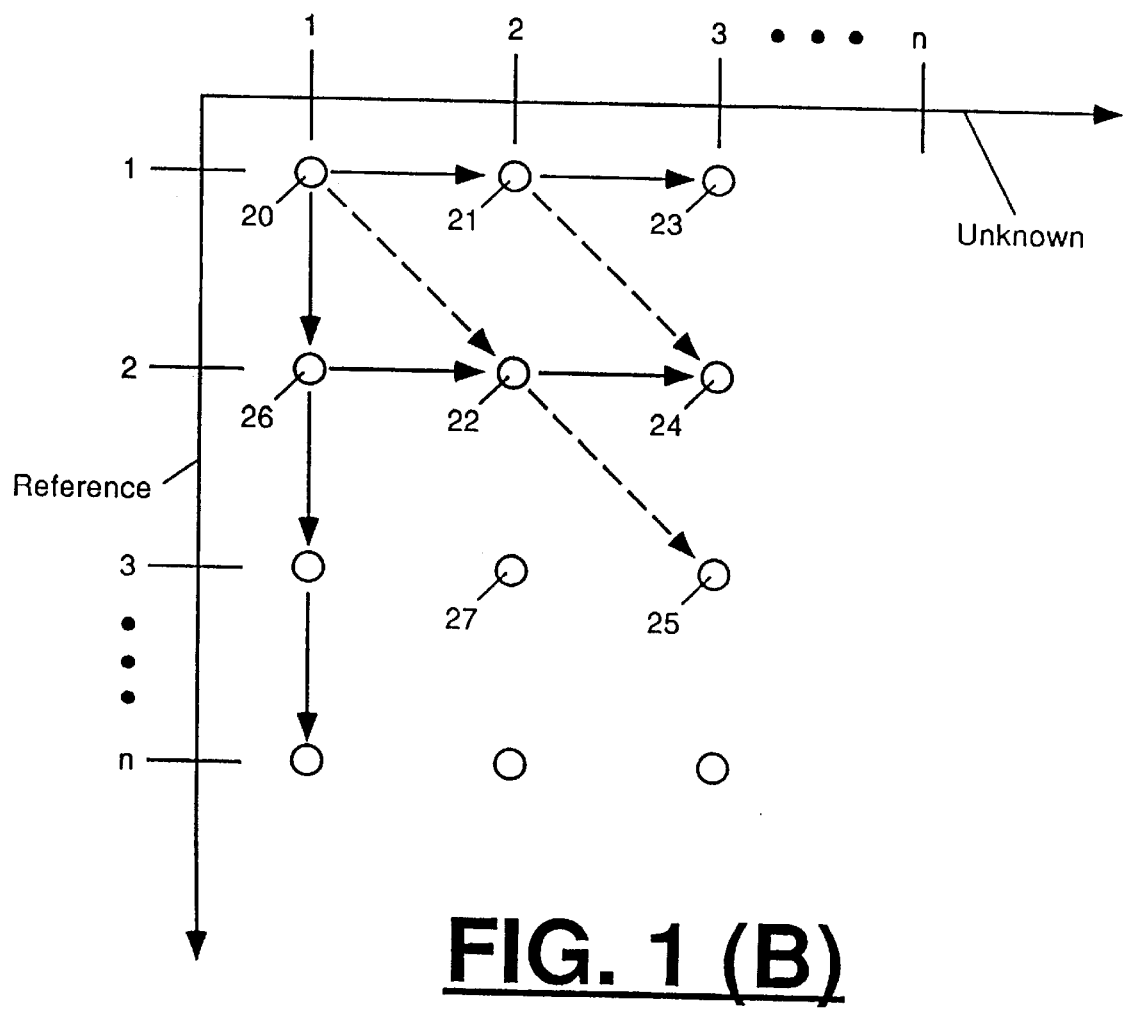
FIG. 1(A) is an illustration of a lattice constructed between points of a reference pattern and points of an input unknown pattern during a Dynamic Time Warping pattern recognition procedure.
FIG. 1(B) is an illustration of a lattice construction between states of a reference pattern and probability states of an input unknown pattern during a Hidden Markov Models pattern recognition procedure.

The present invention includes an apparatus and method for accurate and high performance real-time pattern recognition within a general purpose computer system that may be utilized for handwriting and voice recognition applications. The present invention includes a specially optimized multiprocessing hardware unit capable of performing, in parallel, a multitude of steps required for pattern recognition procedures, such as Dynamic Time Warping and Hidden Markov Models. The present invention multiprocessing hardware unit may interface with the address/data bus of a general purpose computer system operating a high level pattern recognition procedure; the multiprocessing hardware unit (also called Pattern Recognition Engine, (PR)) executes the low level steps of the recognition procedure. The present invention provides a private memory array coupled to the PR engine for storage of reference patterns. The present invention may operate effectively on any general purpose desktop computer system or pen-based computer system, such as for example, a Macintosh™ platform available from Apple Computer Inc., of Cupertino, Calif. or an IBM or IBM compatible personal computer system or platform.

In the following detailed description of the present invention numerous specific details are set forth in order to provide a thorough understanding of the present invention. However, it will be obvious to one skilled in the art that the present invention may be practiced without these specific details. In other instances well known methods, apparatus, systems, components, and procedures have not been described in detail as not to unnecessarily obscure the present invention.

II. DTW and HMM Pattern Recognition Procedures

As discussed above, the present invention may be particularly used within the field of pattern recognition of computer systems. Two well known procedures utilized by pattern recognition computer systems are described. These procedures are called Dynamic Time Warping and Hidden Markov Models. The present invention is optimized to operate these procedures in order to render pattern recognition. Therefore, the following is a discussion of the pertinent processing steps required for DTW and HMM procedures used for pattern recognition. It is appreciated that a full understanding of DTW and/or HMM procedures is not a requirement to understanding the elements of the present invention. In so far as the elements of the DTW and HMM procedures have driven the design of the present invention, these elements are discussed herein. It is noted that for additional background information regarding the well known DTW and HMM procedures used in voice and handwriting recognition, reference is made to: "An Introduction to Hidden Markov Models," by L. R. Rabiner and B. H. Juang, IEEE ASSP Magazine, January 1986; T. Parsons author of "Voice and Speech Processing," published by McGraw-Hill in 1987; "On line Handwriting Recognition—A Survey," by C. C. Tappert, C. Y. Suen, and T. Wakahara, IEEE, 1988; and C. C. Tappert, "Cursive Script Recognition by Elastic Matching," IBM J. Res. Develop. Vol. 26, No. 6, Nov. 1982.

Regarding FIG. 1(A), there is illustrated a graphical representation of the two axis used in the Dynamic Time Warping (DTW) procedure used for pattern recognition. According to the DTW procedure, there are several reference patterns that are known and are placed into a reference library. One goal of the DTW procedure is to compare an unknown (input) pattern against the reference patterns of the library in order to locate a match between the unknown and the reference patterns. FIG. 1(A) graphically illustrates the DTW procedure applied to one reference pattern against the unknown pattern. It is appreciated that the DTW procedure operates, as will be described herein, for each reference pattern in the library against the unknown pattern. Along the vertical axis are plotted points (from 1 to 9) that comprise a reference pattern that is stored in the reference library within a memory unit of computer system. Along the horizontal axis is plotted points (from 1 to 9) that comprise an unknown pattern that is compared by the computer processing system against the reference pattern. As each point of the unknown is compared against each point of the reference pattern, a lattice or array of points is generated within the two axis.

As each point is compared, a cost function is generated across the lattice that runs from left to right across the lattice. A goal of the DTW procedure and the present invention is to locate the lowest cost path across the lattice for each reference pattern and compare the paths of each of the reference patterns in order to locate the best matched pattern to the unknown. Each point of the pattern has a given number of features. A classical feature of a point includes the spatial (x, y) coordinates of that point. DTW allows the computer system to locate the best way of distorting the unknown pattern to match the reference pattern at a minimum cost. The cost is called the distance between the unknown pattern and the reference pattern. The reference pattern for which the distance to the unknown is the lowest is the best candidate for a pattern match. The DTW procedure computes the lattice of points using well known Dynamic Programming techniques.

At each point of the lattice, two independent computations need be performed by the present invention. First, a local distance (d), must be computed between the associated point of the unknown pattern verses the reference pattern point. Secondly, the best path to get to the current point from the "neighbor" points must be determined. The two computations are performed in repetition during the DTW procedure. The independence between these two computations is the basic property used by the present invention to accelerate the DTW procedure. For example, the DTW procedure begins at the lower left side of the lattice (at point 6) and calculates upward along the first lattice line until the end (top) point is reached. Within the first vertical lattice line, the first point of the unknown pattern is compared against all of the points of the reference pattern. At the end of the first lattice line, the DTW procedure then starts at the second vertical lattice line (i.e., the line above unknown point 2 on the horizontal axis) and compares each of the reference pattern points against the second point of the unknown pattern and so forth down the lattice line for each unknown point.

For instance, at point 10, the spatial feature of the fifth point of the unknown is compared against the fifth point of the reference pattern. Basically the (x, y) values associated with each of the points are subtracted from each other to yield the absolute value of the result. This is called the distance computation. Next, the DTW procedure examines the cost function of associated with each neighbor point to point 10, these would be points 11, 15, and 14 which are some valid neighbors in this DTW example. The neighbor with the lowest cost function is then selected, say point 14, and this value is then added to the distance value for point 10. The path of the lowest cost (the best path) then includes the link point 14 to point 10. As the lattice grows from left to right the lowest cost path will be generated. The operation used in the DTW procedure to determine the best neighbor point is called the path function in these discussions.

As can be seen from this discussion a distance computation and a path computation are required for each point of the lattice for DTW processing. Each point of the unknown is compared against each point of the reference pattern generating a multitude of computations. Since there are no data dependencies between the best path computations and the distance computations for any individual point within the lattice, the present invention may perform these computations in parallel. Furthermore, each of the above two computations require pointers which indicate the locations of data used in the computation. The computations to update these pointers is also performed in parallel within the present invention. Therefore, the present invention is optimized to perform DTW processing in so far as there are separate arithmetic pipelines to perform the distance computation and to perform the best path computation. Also the present invention provides specialized instruction formats to process operations within the arithmetic pipelines used by DTW and HMM procedures. Further, there are separate pointer pipelines to perform the pointer updates for each arithmetic pipeline. Lastly, there is a separate control pipeline to perform control branchings between the operations of a DTW pattern recognition procedure. This will be further developed below.

Hidden Markov Models is another procedure utilized for pattern recognition. Refer to FIG. 1(B). In a HMM, a letter, a word or sentence is modeled as a series of transitions from state to state along arcs. Each arc has an associated probability which gives the probability of the transition from one state to the next at the end of an observation frame. A set of probability density functions associated with each state gives the probability of the feature to have the different possible values. The unknown pattern is represented by an ordered set of states (1 to n), similar to those used by DTW. These states are represented along the horizontal axis of FIG. 1(B). The known or reference pattern is also represented as a series of states along a vertical axis. Within each state of the reference is a probability density function that gives the probability that an input state (of the unknown pattern) will match that known state. The Viterbi scoring procedure computes the highest probability that a given set of observation points matches a reference pattern.

FIG. 1(B) illustrates a typical HMM lattice of states. As an example, the HMM procedure first determines the probability that the unknown state 1 will be found within the probability distribution of the first state of the reference pattern (also state 1); this is a local probability determination. The procedure then computes the probabilities that the unknown state 1 is within each of the other states of the test pattern (2 to n) along the first vertical lattice line of FIG. 1(B) starting from the lowest state and sequentially processing lattice points. The second lattice line is then entered representing the second state of the unknown pattern. With reference to point 22, the HMM procedure determines the local probability that state 2 of the unknown is within the probability density function of state 2 of the reference pattern; this is called the local probability of point 22. Then the HMM procedure determines the probability that a transition will occur between point 20 and point 22 (p1), and the probability that a transition will occur between point 26 and point 22 (p2); these are the two paths to arrive at point 22. Points 26 and 20 are the neighbor states of point 22. The HMM then individually multiplies the values of p1 and p2 against the probabilities associated with each point 20 and 26 respectively to determine the highest probability neighbor of points 20 and 26; this is the best path computation. Once that neighbor is selected, point 22 will adopt as its probability value the probability value of the neighbor (i.e., the neighbor's local probability) multiplied by the transition probability (from that neighbor to point 22) times the local probability of point 22. Again, a highest probability path is formed linking the selected neighbor and the point 22. This continues through the lattice until the highest probability path is located for all of the reference patterns in the reference library. Each point of the unknown is compared against each state of the reference pattern.

As can be seen, in the HMM procedure at each lattice point two independent computations are required. First, the local probability for a point to be observed in a state of the reference pattern is computed. Second, the best path to get to that point from the neighbor points must be computed, as another probability function. If the above computations are done on a logarithmic scale, the multiplication operations become addition operations on exponential values. In this case, the above computational operations of the HMM procedure resemble the DTW procedure operations. The present invention takes advantage of this similarity and the fact that the required operations for each lattice point are independent of each other. Since there are no data dependencies between the best path probability computations and the local probability computations for any individual point within the HMM state lattice, the present invention may perform these computations in parallel. Furthermore, each of the above two computations require pointers which indicate the locations of data used in the computation. The computations to update these pointers are also performed in parallel within the present invention. Therefore, the present invention is optimized to perform HMM processing in so far as there are separate arithmetic pipelines to perform the local probability computation and to perform the best path probability computation and the arithmetic pipelines have specialized instruction formats. Further, there are separate pointer pipelines to perform the pointer updates for each arithmetic pipeline. Lastly, there is a separate control pipeline to perform control branchings between the operations of an HMM pattern recognition procedure. This will be further developed below.

III. Overall Computer System of the Present Invention

A. System Components (Hardware)

Figure 2:
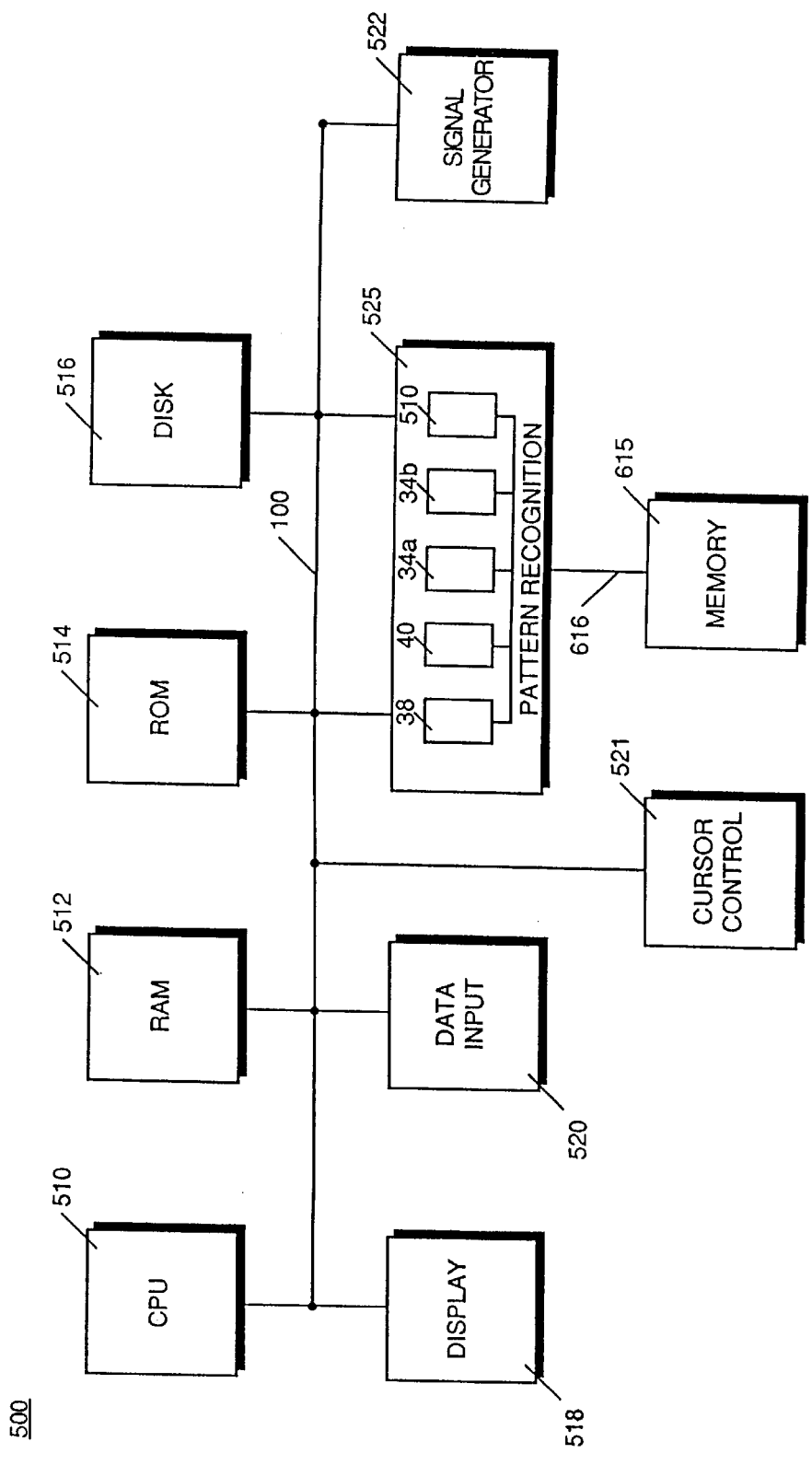
FIG. 2 is an overall block diagram of a computer system of the present invention utilizing a pattern recognition engine (with a private memory) for performing and reporting the results of pattern comparisons.

An embodiment of the present invention may be advantageously utilized within a standard computer system 500 optimized for pattern recognition by a specialized multiprocessor. The computer System 500 having a common system bus 100 as illustrated in FIG. 2. In general, such general purpose computer systems used by the preferred embodiment of the present invention comprise a bus 100 for communicating information, a central processor 510 coupled with the bus for processing information and instructions, a random access memory 512 coupled with the bus 100 for storing information and instructions for the central processor 510, a read only memory 514 coupled with the bus 100 for storing static information and instructions for the processor 510, a data storage device 516 such as a magnetic or optical disk and disk drive coupled with the bus 100 for storing information (such as audio or voice data) and instructions, a display device 518 coupled to the bus 100 for displaying information to the computer user, an alphanumeric input device 520 including alphanumeric and function keys coupled to the bus 100 for communicating information and command selections to the central processor 101, a cursor control device 521 (such as a mouse) coupled to the bus for communicating user input information and command selections to the central processor 510, and a signal generating device 522 coupled to the bus 100 for communicating command selections and data to the processor 510.

In the present invention the signal generation device 522 may include, as an input device, a microphone and a analog to digital converter (digitizer) for capturing sounds in analog signal form and transforming those sounds into digital data which the general purpose computer system may process. The signal generator 522 also includes a mechanism for isolating unknown sound segments from the sampled digital data and storing those unknown sound segments into a memory unit such as RAM 512. These sound segments are one type of unknown pattern that the present invention will process in order to recognize. The signal generator 522 may also include a stylus and specialized pad for input of handwriting information (which is an analog communication signal representing the movement of the stylus with reference to the pad by a user hand) to a digitizer so that handwritten data may be input to the computer system 500 as well. Digitizers typically sample the position of the pen 200 times a second. The positions of the pen are coded in two bytes, one for the x position and one for the y position in a two coordinate (x, y) Cartesian system. The digitizer also provides information to indicate when the pen is up, when the pen is down and other proximity information for a total of about 12 bytes of information. This creates a bandwidth of 400 to 1200 bytes/second which can be processed by a serial interface to the system bus 100. This digitized handwriting information may also be segmented and stored in a memory unit, such as RAM 512. These digitized and input segments are one form of unknown pattern that the present invention will analyze in the pattern recognition procedures. It is appreciated that mechanisms for digitizing audio signals and for inputting stylus information and digitizing same are well known and that any of such mechanisms may be advantageously used within the elements present invention to gather an unknown input pattern for recognition.

The display device 518 utilized with the computer system 500 of the present invention may be a liquid crystal device, cathode ray tube, or other display device suitable for creating graphic images and alphanumeric characters recognizable to the user. The display device also includes a video graphics controller or VGA coupled to the ISA bus 100 and also coupled to a output frame buffer for display of images and text. The cursor control device 521 allows the computer user to dynamically signal the two dimensional movement of a visible symbol (pointer) on a display screen of the display device 518. Many implementations of the cursor control device are known in the art including a trackball, mouse, joystick or special keys on the alphanumeric input device 520 capable of signaling movement of a given direction or manner of displacement.

The computer system 500 as shown in FIG. 2 utilizes a system bus 100 that adheres to the well known 5 volt ISA computer bus format. Therefore, reference to a system bus 100 throughout this present discussion may be interpreted as utilizing the ISA standard computer system bus. The preferred embodiment of the present invention also contains a pattern recognition system (engine) 525 capable of executing sections of program code shared between the CPU 510 that compare reference patterns against an unknown pattern to locate candidate reference patterns for match. The pattern recognition engine (also called a multiprocessing unit) is coupled to the bus 100 and is programmable. The pattern recognition system (Pattern Recognition Engine) 525 is composed of two arithmetic pipelines 38 and 40 as well as two pointer pipelines 34*a* and 34*b* as well as on-chip memory units, register files and other associated control hardware 510 that will be described in greater detail to follow. Coupled to the pattern recognition engine 525 via dedicated bus 616 is a private memory unit 615 for storage of library reference patterns. Although embodiments of the present invention may store the library patterns within the common RAM 512, the preferred embodiment of the present invention stores these library entries within the private memory 615. The private memory 615 is about 512 kilobytes in size, but configurations from 64 kilobytes to 16 megabytes are supported, and in fact any size memory capable of containing reference patterns is consistent with the present invention. It is appreciated that memory 615 communicates with PR engine 525 over line 616 and not the host communication bus 100. This reduces bandwidth requirements of the communication bus 100.

It is appreciated that the present invention may have particular advantageous use within a pen based personal computer system, and therefore the computer system 500 may be construed to include pen-based personal computers that utilize a pen (stylus) and pad for data input from the user interface, as discussed above.

In a typical pattern recognition scenario, the coordinates captured by the digitizer from a stylus are preprocessed by the CPU 510 and normalized features are sent to the pattern recognition engine 525 of the present invention over communication bus 100. The pattern recognition engine 525 would execute the comparisons between the unknown pattern and all the prototype patterns stored in the library in its private memory 615 utilizing private bus 616.

Figure 3:
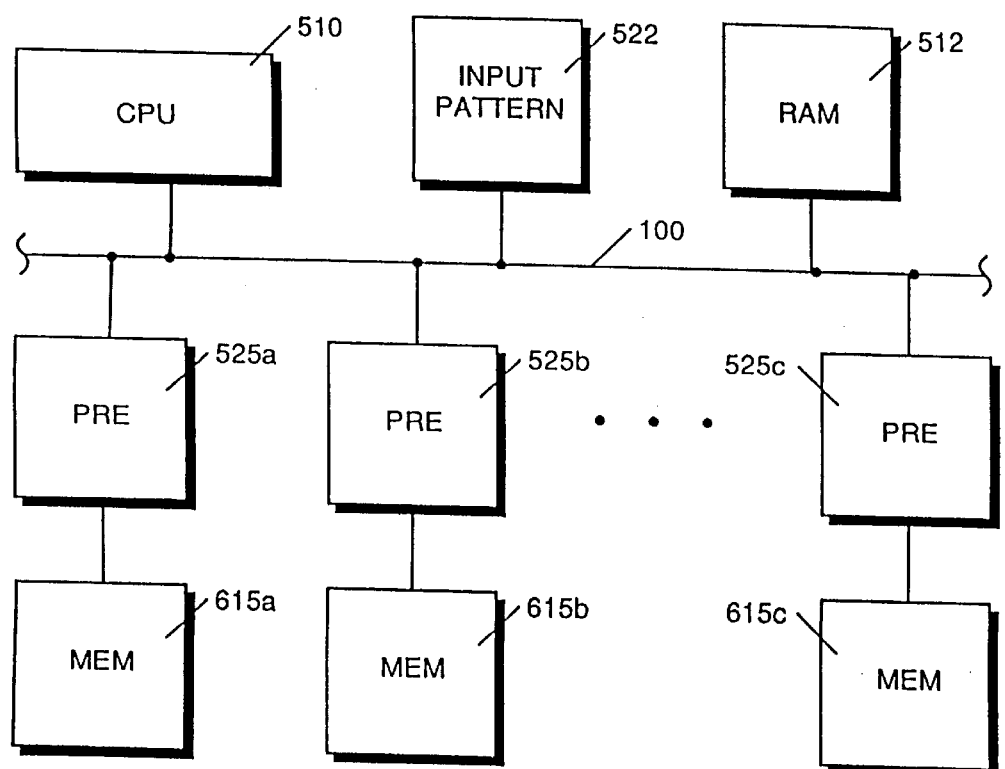
FIG. 3(A) is a block diagram of pertinent components of a computer system of the present invention that utilize multiple pattern recognition engines for performing pattern recognition, each engine having separate memories.
FIG. 3(B) is a block diagram of pertinent components of a computer system of the present invention that utilize multiple pattern recognition engines for performing pattern recognition, each engine sharing the same separate memory.
Figure 3:
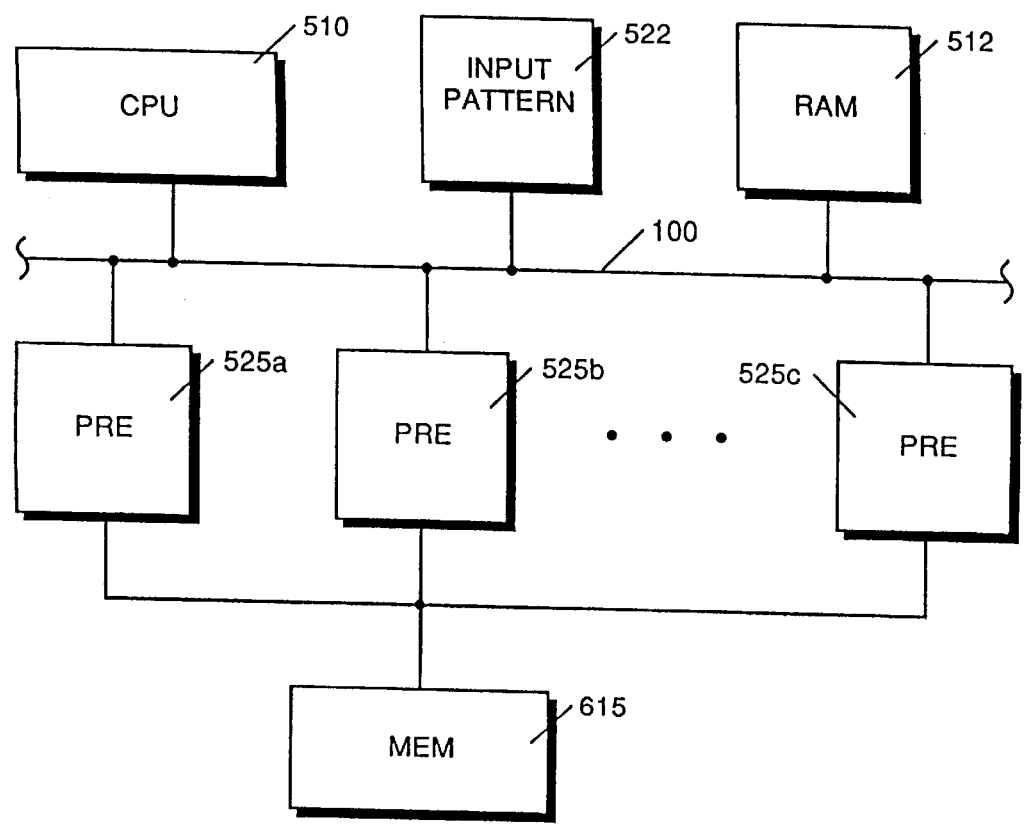

FIG. 3(A) and FIG. 3(B) illustrate system embodiments of the present invention that are utilized for applications that require more performance than that offered by a single pattern recognition engine (PR engine) 525. Such an application may include high speed speech recognition which uses the HMM algorithm for which the present invention is additionally optimized When more than one PR engine is required, the system architecture of the present invention may adopt at least two different models which are represented by FIG. 3(A) and FIG. 3(B). One model has each PR engine 525a–525c interfaced with its own private memory 615a–615c and the other model has each PR engine interfaced with a common memory 615. The CPU 510 is responsible for splitting the processing work from among the separate PR engines in the former case while the synchronization is accomplished by the PR engines themselves in the latter case.

Refer to FIG. 3(A) which illustrates the former case. The pertinent components of the computer system 500 are illustrated. The host CPU 510 is coupled to the host communication bus 100 as well as the computer memory 512. Also coupled to the bus 100 is an input pattern block 522 which comprises a stylus input, an analog to digital converter and an I/O controller all for inputting and temporarily storing the unknown handwriting sample. The unknown input pattern may be temporarily stored in memory array 512. It is appreciated that block 522 can be utilized to input a voice sample by substituting a microphone input data stream for the stylus input. There are also n number of PR engines, 525a to 525c, each independently coupled to the ISA bus 100. Each PR engine contains its own library of prototype patterns 615a to 615c respectively. The CPU may input up to n separate unknown patterns from block 522 during a single recognition processing cycle, a separate unknown would be sent to each PR engine over bus 100. Each PR engine would then compare the received unknown against the library of patterns within the private memories using buses separate from bus 100. This occurs in parallel. Results would then be indicated to the CPU 510 which would then select the best matched candidates. Alternatively, the same unknown could be transferred to each PR engine and each PR engine could compare (in parallel) the unknown to separate sections of the prototype library. Refer to FIG. 3(B) which illustrates the system substantially as described with reference to FIG. 3(A) bus wherein each separate PR engine shares the same prototype library 615.

B. DTW and HMM Procedure Partitioning (Software)

According to the present invention, the pattern recognition procedure that must be executed by the computer system 500 may be partitioned or shared between the CPU 510 and the pattern recognition engine 525. The pattern recognition engine 525 is delegated the lower level tasks of computing much of the inner loop calculations to determine prototype pattern candidates for a match to a particular unknown pattern. Therefore, the PR engine 525 performs the point by point distance computations and best path determination for each reference pattern against the unknown pattern. Upon completing these tasks, the results are then reported to the host CPU 510 via an interrupt generation which signals to the CPU 510 the completion of the PR engine processing or a bus signal on bus 100 may be generated. The CPU 510 then records the best path information for each reference pattern and will select the ultimate match candidates from the information supplied to it by the PR engine 525. It is appreciated that the 510 is performing higher level scheduling, synchronization and result determination steps of the HMM and DTW pattern recognition procedures that are not processing intensive while the PR engine 525 performs the bulk of the lower level processing intensive aspects of these procedures. When used this combination, the CPU 510 and PR engine 525 of the present invention system provides an extremely flexible, powerful and accurate mechanism for pattern recognition, including handwriting and voice pattern identification while allowing the CPU 510 to perform other system tasks that may not be related to pattern recognition. To this extent, the PR engine 525 of the present invention may be coupled with any general purpose computer system to increase that computer system's accuracy and performance regarding pattern recognition applications. It is appreciated that the present invention is able to provide the above functionality in a real-time response of at most 0.1 seconds between unknown pattern input and pattern identification, thus providing a system that is fully user interactive.

More specifically, recognition procedures include three major processing steps: 1) a preprocessing or feature extraction and normalization step; 2) a search and match step; and 3) a post processing and final decision step. The most processing intensive functions are the lower level search and match step where up to 90% of the computation time will be consumed. The PR engine 525 of the present invention is optimized for the search and match step of the above procedure and assumes that the pre-processing and post-processing steps are accomplished by the CPU 510. It is appreciated that because memory 615 is not coupled on host bus 100, during lower level processing the CPU and host bus are not tied up doing PR processing but may perform unrelated tasks.

Figure 4:
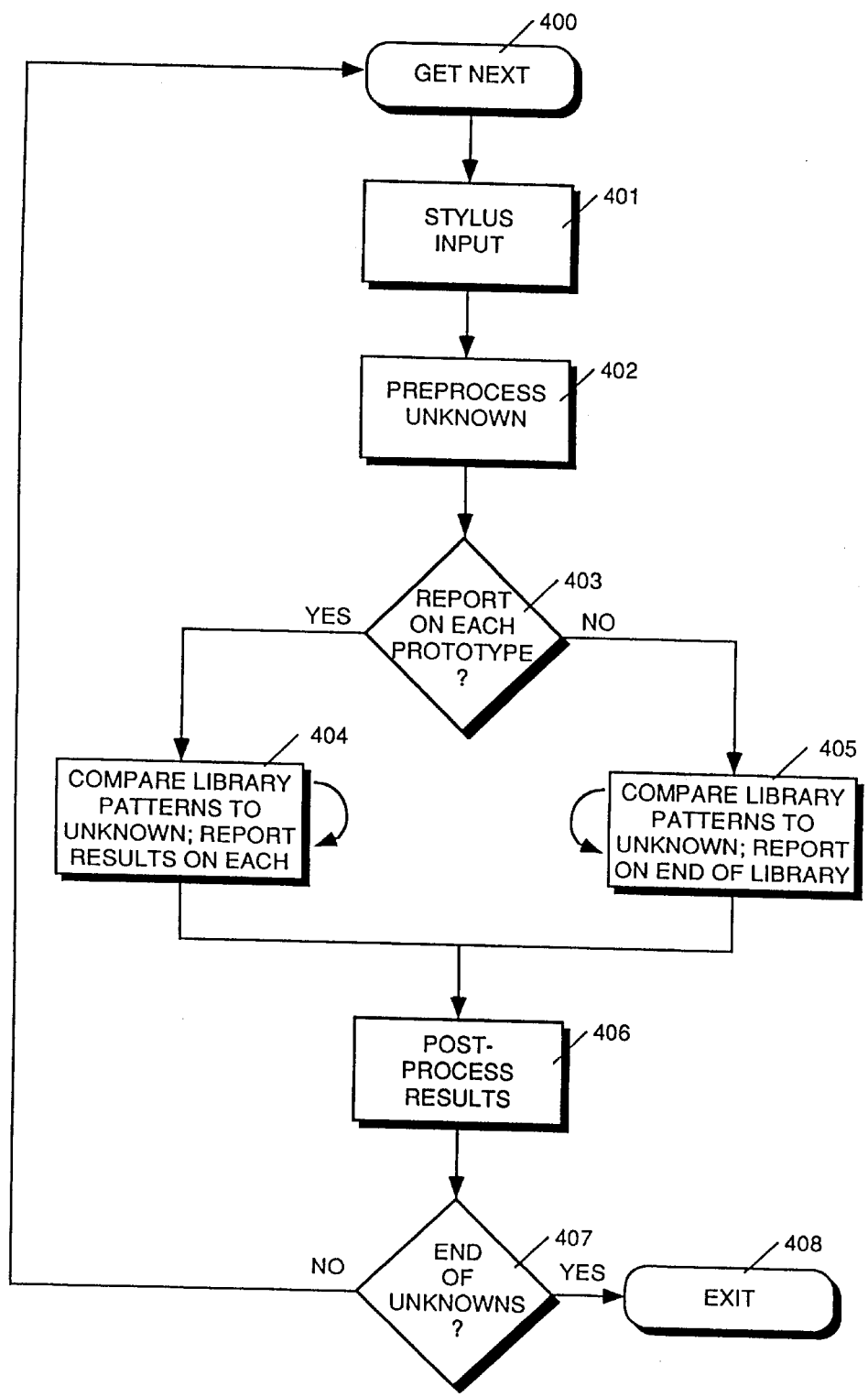
FIG. 4 illustrates an overall process flow of a pattern recognition procedure that has various tasks partitioned between a system central processing unit and a pattern recognition engine of the present invention.

A typical pattern recognition flow for either HMM or DTW processing is shown in the process flow of FIG. 4 which illustrates the software partitioning. At block 400, the process begins and an unknown pattern is prepared for processing. At block 401 the digitizer sends stylus inputs to the CPU 510 or RAM 512 through a serial port. The digitizer has a sampling rate of about 200 pairs of coordinates per second. Each coordinate is a byte of data, so this represents a bandwidth of about 400 bytes per second. At block 402 the main CPU pre-processes the coordinates and sends a normalized set of features to the PR engine 525 over bus 100. This represents a block transfer of data of 100 to 200 bytes every 100 milliseconds. Normalization is required for effective processing of the PR engine. Next at block 403, the CPU 510 indicates to the PR engine 525 the selected reporting scheme for the results of the PR engine. If the CPU 510 wants a report generated at the end of each prototype reference comparison then block 404 is run. Otherwise, block 405 is executed where the PR engine 525 only reports the results of each prototype comparison at the end of the total library. Results are signaled to the CPU by the PR engine via an interrupt generated by the PR engine or directly over bus 100. Within blocks 404 and 405, the PR engine 525 computes the lattices, representing the comparison of the unknown pattern or character with each reference model stored within the library. This involves memory transfers from the library memory 615 to the PR engine 525. When the CPU receives the interrupt from either blocks 405 or 404 indicating a match complete, it generates a transfer of the results from the PR engine to the system memory 512. Then, at block 406 the CPU post-processes all of the results generated by the PR engine and formulates a final match prototype pattern based on the prototype candidates selected by the PR engine. The CPU then may report the match to a computer user via the display unit 518 or other output device or will use the result internally. At block 407, the CPU checks if there are more unknown patterns to process and if so will return to block 400 or otherwise exit the pattern recognition flow via block 408. Specifically, it is appreciated that blocks 401 and 402 and 406 are considered high level processing tasks while blocks 404 and 405 are considered lower level processing tasks. It is appreciated that the program examples presented herein to follow are performed within blocks 404 and 405 of the present invention.

C. Communication Interface between a PR Engine and CPU

The PR engine 525 is a component attached to the ISA bus using standard ISA bus cycles. It communicates with the main CPU 510 through index and data registers, mapped in the ISA memory or I/O space. The main CPU 510 accesses the PR engine private memory 615 through these, the same way the 386 SL accesses the 82360SL configuration space, for example. The PR engine 525 interfaces with the private memory 615 which holds all the prototype patterns. The private memory is loaded with the reference patterns at rest time from the disk drive unit 516 under the control of the CPU 510. This memory unit can also be updated under the control of the CPU when new prototypes are learned. Communication between the CPU 510 and the PR engine 525 of the present invention may be carried out based on any number of well known conventions. However, the preferred embodiment of the present invention utilizes an interrupt based system along with specially indexed registers. Appendix B illustrates the memory map of the present invention.

IV. Pattern Recognition Engine 525

A. Overview of Components of Pattern Recognition Engine

Figure 5:
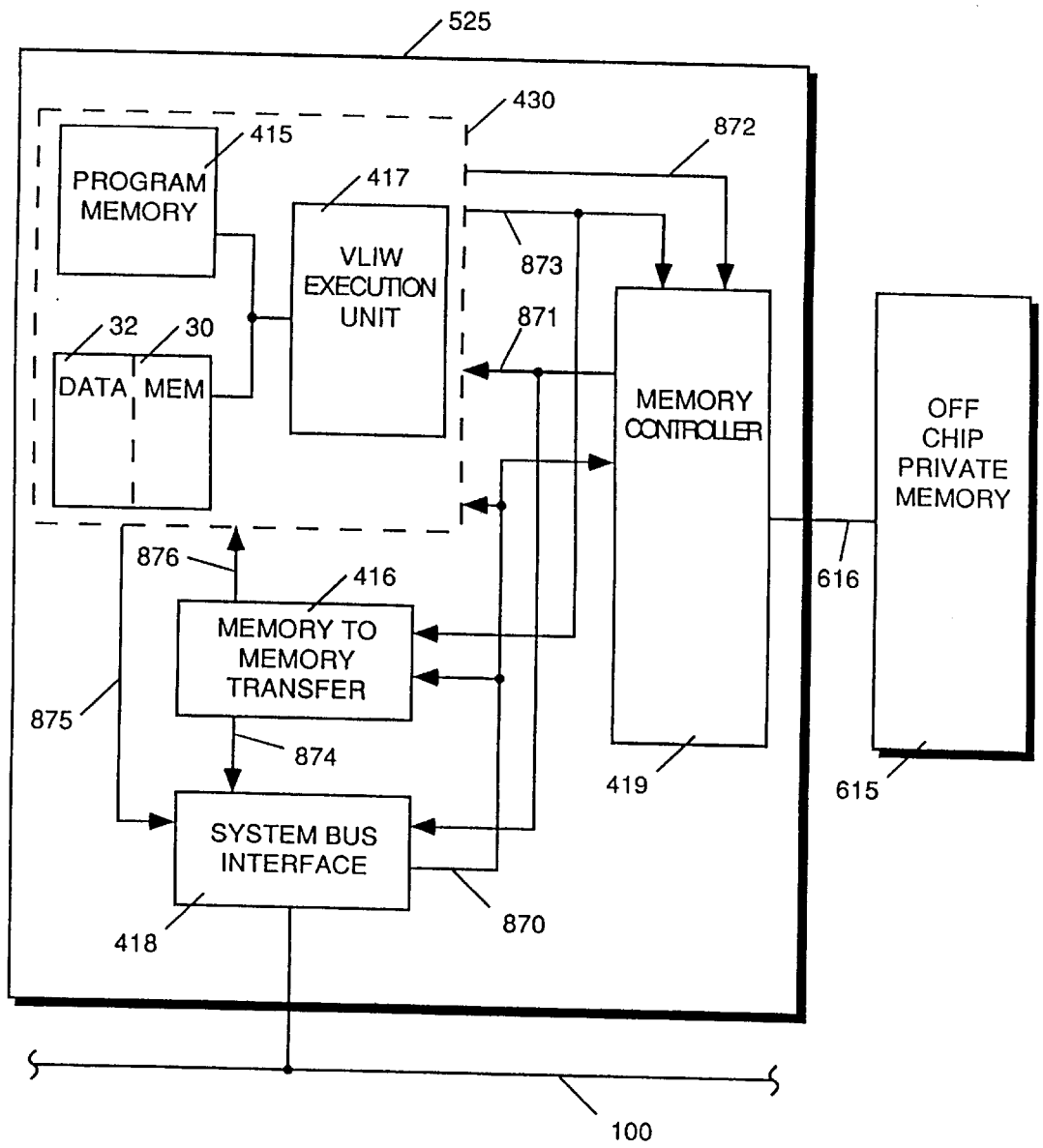
FIG. 5 is a block diagram illustrating the major elements of pattern recognition engine of the present invention as well as the private off chip memory unit.

The pertinent components of the pattern recognition engine 525 (programmable multiprocessor) are illustrated in FIG. 5, which except for the external memory 615 are located within a single chip package. FIG. 5 also illustrates the communication bus architecture shared between the components of the PR engine 525. Each pattern recognition engine contains: a program memory 415, two data memories 30 and 32, a memory controller 419, a memory to memory transfer block 416, a VLIW execution block 417 and a system bus interface block 418. It is appreciated that any of the well known system bus interface technologies may be utilized within the present invention PR engine. The execution unit 430 is comprised of program memory block 415, data memories 30 and 32 and VLIW execution block 417 as well as other elements to be described below. Interfaced to each PR engine 525 is a private memory block 615 as discussed above. The system bus interface 418 is coupled to the ISA system bus 100. Each of the above blocks, where pertinent to the discussions of the present invention, will be described in greater detail to follow. It is appreciated that the program memory 415 may be loaded with the lower level procedures by the CPU 510 directing transfers from the disk 516 or RAM 512.

There are seven different communication buses 870–876 allowing communication between the different units of the PR engine 525. There is only one possible driver for each bus, there can be several destinations. The system bus interface unit 418 writes the channel parameters using the SBI-Write bus 870 and reads these parameters using the SBI-Read-Para bus 874. Note that the SBI unit 418 is the only unit which drives the SBI-Write bus 870 and the memory to memory transfer unit 416 is the only driver of the SBI-Read-Para bus 874. All data returning from memory cross the memory bus 871 which is distributed to all units. The unit which has requested the returning data reads it from the memory bus. The memory bus 871 is only driven by the memory controller 419. The memory bus is also indicated as bus 110. Bus indications 115 to or from the memory to memory transfer block 416 may refer to buses 876, 874, 870, or 873 accordingly, depending on the discussion. It is appreciated that bus 875 is the SBI read execution unit bus. Bus 876 is the execution unit read bus. Bus 872 is the channel write memory bus. Bus 870 is the SBI write bus.

Refer still to FIG. 5. From the execution unit 430 standpoint, it is important to notice that the following transfers can occur in parallel: 1) receive a read or write request from the system bus interface 418; 2) send data to the memory controller 419 for a memory to memory transfer, 3) send a load or a store request to the memory controller 419, or send a read or write request to the channel parameters of the memory to memory transfer unit 416; or 4) receive returning data from memory, results of external load instructions or results of a memory to memory transfer operation.

The VLIW execution unit 417 of the present invention is a 16 bit engine and executes only integer computations since floating point is not required by the DTW and HMM algorithms. There are five pipelines in the execution unit which can execute three types of instructions which are ALU instructions, pointer instructions and control flow instructions. There are two arithmetic pipelines, two pointer pipelines and one control flow pipeline. The five pipelines may be controlled in parallel with one Very Large Instruction Word which is 80 bits in width. Instructions are stored in the program memory 415 which is a 256×80 bit memory unit which must be loaded before a program starts, from the off-chip memory unit 615 or from the disk drive 516 or from the CPU memory unit 512.

The off chip private memory 615 contains the prototype or reference patterns for comparison during pattern recognition procedures. In the preferred embodiment of the present invention handwriting recognition system, this memory contains patterns information regarding reference symbols that would be located on a typical keyboard, such as alphanumeric symbols, punctuation and other function and specialized keys. Also contained within this memory 615 are a predetermined number of variations for each symbol. During a pattern recognition procedure, this data is loaded, typically a symbol at a time from the off-chip memory to the PR engine 525 via memory to memory transfers over dedicated bus 616.

It is important that the off chip private memory is not coupled to the general system bus 100, but is rather coupled to the PR engine 525 via a separate bus 616. This is the case so that the memory to memory transfers that occur during normal pattern recognition procedures do not contribute to the bandwidth of data located on the system bus 100. Thus, the data transferring along bus 616 is separate from the system bus 100, it does not interfere with or slow down the host CPU 510 or the remainder of the computer system 500 from performing other tasks. This allows the computer system 500 of the present invention to operate more efficiently. The host CPU 510, therefore, does not compete with the PR engine 525 for bus accessing privileges with respect to the data traversing bus 616.

Referring to FIG. 5, the memory controller of the present invention, block 419, interfaces the PR engine 525 with the off-chip private memory 615. The memory controller supports both SRAM and DRAM memory chips and performs the required interface for memory transfers between the PR engine 525 and the private memory 615, including timing functions, pulsing of RAS and CAS signal lines as well as other well known RAM interface signals. The memory controller also performs memory access arbitration for memory access requests between the elements of the PR engine and the private memory 615. In the case of the SRAM, the number of wait states is programmable within the memory controller unit. In the case of DRAM, different timings and fast page modes are supported. When DRAMs are used, the PR engine executes refresh on request by activation of a refresh pin. The memory controller 419 supports a peak bandwidth of 50 megabytes per second at 25 MHz which required for cursive handwriting recognition applications.

The present invention contains two memory to memory transfer channels within block 416. These channels are dedicated to data transfers internal to the PR engine memory space. The memory space addressed to the PR engine 525 is shown in Appendix B. These channels control data transfers between one of the on-chip memories (30 and 32) and the off-chip memory 615. Each channel is composed of a 32 bit external address, a 16 bit internal address, a 16 bit count, and a 16 bit control word. The control words specify whether a transfer is a read or a write operation of the on chip memory, and whether the transfers must be chained with another transfer. The control word also allows the CPU 510 or the PR engine 525 to abort a memory to memory transfer. The two PR engine channels can be chained together. This means that the two transfers occur back to back without intervention from the CPU or the execution unit of the PR engine. It is appreciated that only one channel can be active at a time within the present invention. Therefore, one transfer between the on-chip and the off-chip memory can be executed in parallel with a program running in the execution unit of the PR engine. Completion of a transfer in any channel generates a done signal that may be polled. There is one specific signal per channel. These signals are programmer visible and can be tested by the program running in the execution unit, see Appendix B.

The system bus interface block 418 performs data transfers between the CPU 510 and the PR engine 525. It is appreciated that any number of ISA interface technologies may be utilized within the present invention. A discussion of the interface utilizes by the present invention is presented to follow. These transfers are always done under the control of the CPU 510. The PR engine is a slave on the system bus in the preferred embodiment of the present invention. This interface also allows the PR engine to send interrupts to the CPU. Interrupts are typically used to indicate completion of a lattice to the host CPU 510 and are used to signal the host CPU 510 to read the results of the PR engine. Interrupts are also sent by the PR engine 525 to the host CPU 510 in case of detection of an error or exception. The present invention supports a 5 volt ISA bus interface. The system bus interface block 418 includes a 32 bit index register and a 16 bit data register for scalar transfer and a 32 bit auto-increment address register and a 16 bit data port register for block transfer operations; these are the communications registers. These registers are to be mapped into the ISA memory or I/O space. All registers and memories of the PR engine are mapped into the private memory space of the PR engine, which includes: memory 615, the on-chip memories, 30, 32, the program memory 415 and the registers, see Appendix B. This allows the CPU to have access to the complete context of the PR engine 525 through the index and data registers.

Referring to FIG. 5, it is appreciated that the communication registers of the system bus interface 418 are memory mapped in the ISA memory space. However, embodiments of the present invention could also map these addresses in the memory space or the I/O space. Mapping in the memory space allows zero wait state bus cycle and offers a better bandwidth out of the ISA bus over I/O mapping. The PR engine 525 accepts a chip select input and assumes that the address decoding is accomplished off chip. The only address inputs seen by the PR engine are 3 bits of the system address bus used to access the different communication registers. The PR engine 525 of the present invention supports three types of bus cycles: 1) a standard 16 bit ISA read or write cycle. This is a 3 cycle transfer (one wait state), which can be used for ISA memory read or write, or for ISA I/O read or write; 2) extended 16 bit ISA read or write cycle which is a more than one state transfer which can be used for extended ISA memory read or write, or extended ISA I/O read or write; and 3) a 16 bit zero wait state read or write which is disabled by default. According to the last cycle type, if enabled in the mask register, these cycles are used for zero wait state ISA memory read and write transfers by the present invention.

According to the operation of block 418 of the present invention, for transfers of single words (scalar transfers) the PR engine 525 has three communications registers that can be read or written from the system bus. These are two index registers and a scalar data register. All three registers are 16-bits wide. The two index registers hold an address in the PR engine private memory space. Reading the scalar data register means reading the data located within the address specified by the index registers. Writing the scalar data register means writing the data at the address specified by the index register. Typically the CPU 510 writes the two index registers with the two components of the PR engine address that it wants to access (PR engine addresses are 32 bits wide). If the CPU 510 wants to execute a read of the addresses specified in the index registers, it then reads the scalar data register and the PR engine 525 provides the required data. If the CPU 510 wants to execute a write of the address specified in the index registers, it writes the scalar data register and the PR engine 525 executes the write operation.

Refer to FIG. 5. To optimize transfers of blocks of data the PR engine 525 supports block transfers within the system bus interface 418. These allow the CPU 510 to eliminate generating successive addresses and to only have to read or write data from or to a data port. Block transfers are implemented with three additional communication registers: 1) an auto-increment low address; 2) an auto-increment high address; and 3) a data port, all located within block 418. These three communication registers are ISA mapped and can be accessed directly from the system bus 100. Two 16 bit words need to be initialized for a block transfer between the PR engine 525 and the CPU 510. These are the high and low start address within the PR engine memory space. This address is loaded in the ISA mapped auto-increment address register. Once the start address of the block transfer is initiated, the CPU 510 only has to read or write the data port register as many times as there are words in the transfer. Every time the host CPU reads or writes the data port register, the PR system interface 418 increments the auto-increment address to the next word address. The start address is a byte address so it is incremented by 2 after each access to the data port register.

The present invention system performance is set to recognize a handwritten character within 100 milliseconds for discrete run-on handwriting. This is selected because this rate is considered to be immediate in an interactive mode. It is important to provide immediate interaction with a user when handwritten characters are commands, for example, or when editing a text. For cursive handwriting the target response time is 300 milliseconds which corresponds to 3 characters per second which is the average number that a typical person can generate. For run-on discrete handwriting the present invention utilizes 250 reference patterns within the library in memory 615 which allows for three variations of each symbol normally represented in a keyboard layout. Within run-on discrete handwriting recognition procedures the lattice size is about 20×20 points and the performance is approximately 2 million points per second for pattern recognition.

For cursive handwriting, shapes depend on preceding and following letters thus increasing the required number of prototypes to 750 reference patterns within the present invention. To recognize cursive handwriting, the lattice size is 40×40 and the performance is approximately 4 million points per second processed. One possible trade-off of the present invention to be able to support more references and still achieve real time response is to reduce the number of points representing references and observation sequences. The computation power required by the DTW and HMM procedure is proportional to the number of references and to the square of the number of points in the observation sequence. For a system of the present invention with three features per observation point and three neighbors per lattice point, cursive recognition requires about 100 million operations per second. Therefore, the present invention PR engine 525 is specially optimized for DTW and HMM procedures and may simultaneously execute instructions within two arithmetic pipelines and two pointer pipelines to achieve the above processing power requirements while executing memory to memory transfers in parallel as well.

V. Execution Unit 430 of the Pattern Recognition Engine 525

A. Overview of Components of Execution Unit 430

Figure 6:
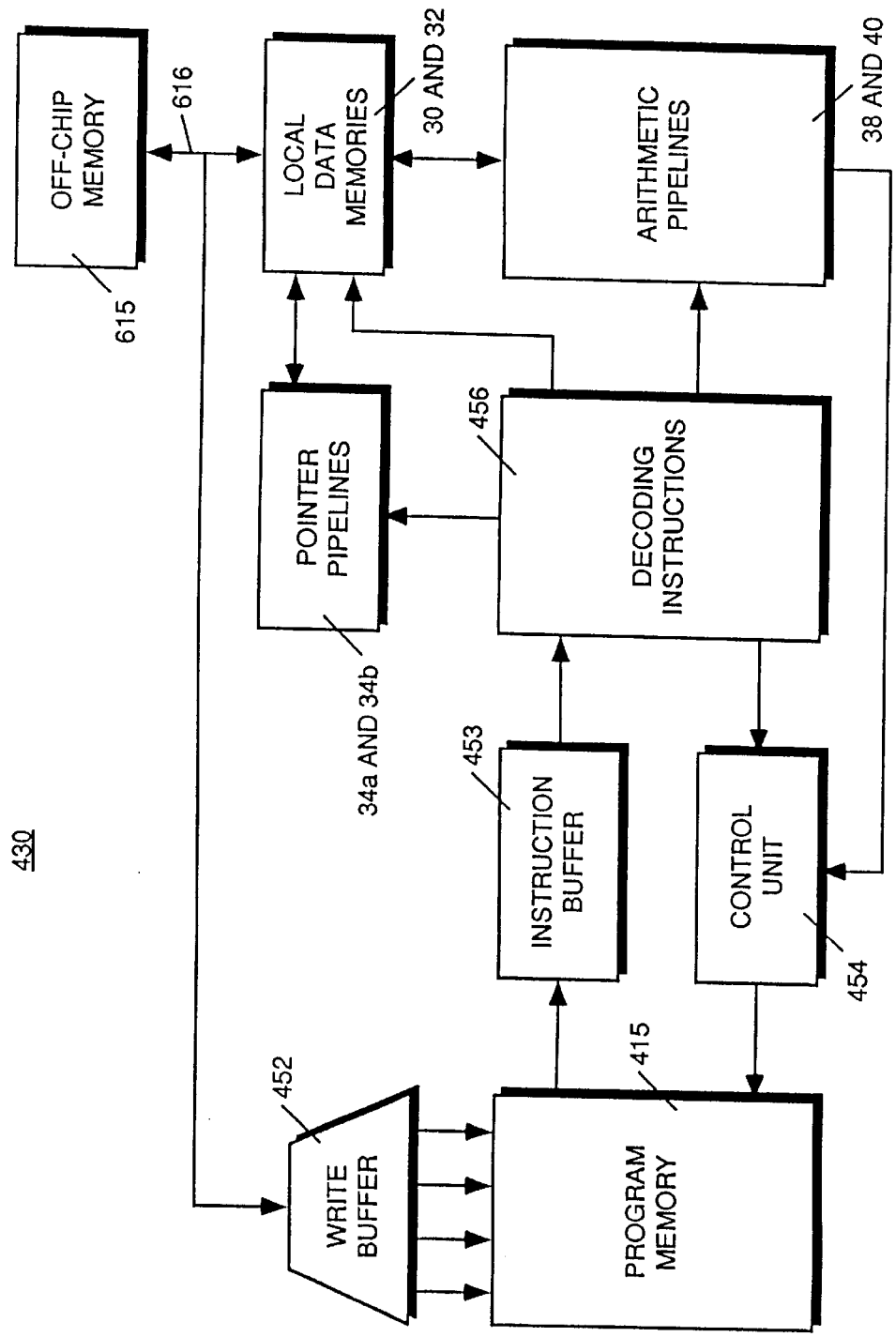
FIG. 6 illustrates a block diagram of the elements of the execution unit of the pattern recognition engine of the present invention.

FIG. 6 is a block diagram of the execution unit 430 of the present invention and as discussed above the execution unit comprises the VLIW execution block 417, data memories 30 and 32 as well as program memory 415 as well as other units presented herein. Referring to FIG. 6, execution unit 430 specifically comprises write buffer 452, program memory 415, instruction buffer 453, control unit 454, pointer pipelines 34a and 34b, instruction decoder 456, local data memories 30 and 32, and arithmetic pipelines 38 and 40. The input to write buffer 452 is coupled to the off-chip memory 615 (over bus 616). The output of write buffer 452 is coupled to program memory 415. Program memory 415 is also coupled to receive an output from control unit 454. Instruction buffer 453 is coupled to receive an output from program memory 415. The output of instruction buffer 453 is coupled to instruction decoder 456. Pointer pipelines 34a and 34b, local data memories 30 and 32, arithmetic pipelines 38 and 40, and control unit 454 are all coupled to receive outputs from instruction decoder 456. Pointer pipelines 34a and 34b are also coupled to local data memories 30 and 32 for providing addresses to local data memories. Local data memories 30 and 32 are also coupled to arithmetic pipelines 38 and 40 for exchanging data. Local data memories also receive and send data to off-chip memory 615. Control unit 454 is also coupled to receive an output from the arithmetic pipelines. It should be noted that the lines depicted in FIG. 6 may represent more than one conductor.

Program memory 415 stores the instructions of the application to be executed by the execution unit of the present invention; as discussed above these are the lower level instructions of the partitioned pattern recognition procedure. Program memory 415 is loaded with the instructions from off-chip memory via write buffer 452. Instructions are read out of program memory 415 and routed to instruction buffer 453. Instruction buffer 453 holds the multiprocessor instructions and, in conjunction with instruction decoder 456, decodes the instructions, sending the commands to the different pipelines (i.e., pointer pipelines, arithmetic pipelines, and the control unit). In other words, control instructions are sent to control unit 454, pointer instructions are sent to pointer pipelines 34a and 34b, and arithmetic instructions are sent to arithmetic pipelines 38 and 40. In the currently preferred embodiment, control flow pipeline 454 executes control flow instructions. The pointer pipelines 34a and 34b generate addresses of operands and results in data memories 30 and 32. In the currently preferred embodiment, arithmetic pipelines execute integer operations using operands from the general purpose registers 36 and data memories. It is appreciated that the program memory 415, the data memory 30 and the data memory 32 are called internal buffers.

Since there are two instruction formats in the currently preferred embodiment (i.e., an 80-bit format and a 40-bit format), instruction buffer 453 must extract the instruction fields from the lines of program memory 415 according to the proper format. In the present invention, instruction buffer 453 and instruction decoder 456 use multiplexers to separate and decode the individual control, pointer and arithmetic instructions, such that they can be distributed to their respective pipelines.

Referring still to FIG. 6, instruction decoder 456 provides the read and write addresses of the control register file, the source and destination operands for the control flow pipe operator, the opcode for the control flow operator, indications regarding whether to write to the program counter, and instruction decoder 456 provides flag selection.

In the currently preferred embodiment, arithmetic pipelines 38 and 40 comprise two identical arithmetic pipelines. Arithmetic pipelines 38 and 40 utilize local data memories 30 and 32 respectively and a general purpose register file 36 to perform data computations (i.e., arithmetic operations). In the currently preferred embodiment, these data computations correspond to the application of handwriting recognition routines to input data via DTW and HMM pattern recognition procedures. According to alternative embodiments of the present invention, these data computations correspond to the application of speech and voice recognition routines to input data via DTW and HMM pattern recognition procedures. In the currently preferred embodiment, all operations are accomplished with 16-bit operands and results, with the exception of the multiply operation which produces a 32-bit result. Furthermore, all arithmetic operations within an instruction are executed in a single cycle (instruction clock cycle).

Pointer pipelines 34a and 34b provide the addresses of operands and results in data memories 30 and 32 respectively. In the currently preferred embodiment, data memories comprises two separate memories 30 and 32 and pointers pipelines comprise two pointer pipelines 34a and 34b, one for each data memory in local data memories. Pointer pipelines also execute arithmetic instructions on the pointers.

Referring still to FIG. 6, control unit 454 comprises the control flow pipeline of the present invention. The control flow pipeline executes the control flow instructions. In the currently preferred embodiment, all control flow instructions are executed in a single cycle. The control flow pipeline is completely independent of the pointer pipelines and the arithmetic pipelines in that the control flow pipeline has its own register file, containing control registers and its own arithmetic operator for performing simple operations, such as addition and subtraction on the control registers, and its own flags. The control flow pipeline also contains the program counter. In prior art systems, the control flow instructions and loop maintenance is accomplished using the arithmetic pipelines due to the dependencies which occur between the data computations and the loop maintenance and/or branch instructions. Due to the independence between the data computations and the control flow operations in the handwriting recognition algorithms performed by co-processor of the present invention, the control flow instructions and loop maintenance instructions do not rely on the data computations performed by the arithmetic pipelines. Therefore, the control instructions may be executed separately from the data computations performed by the arithmetic pipelines. By operating separately, the control flow pipeline of the present invention may operate in parallel with pointer pipelines and arithmetic pipelines.

B. Arithmetic/Pointer Pipelines of the Execution Unit 430

Figure 7:
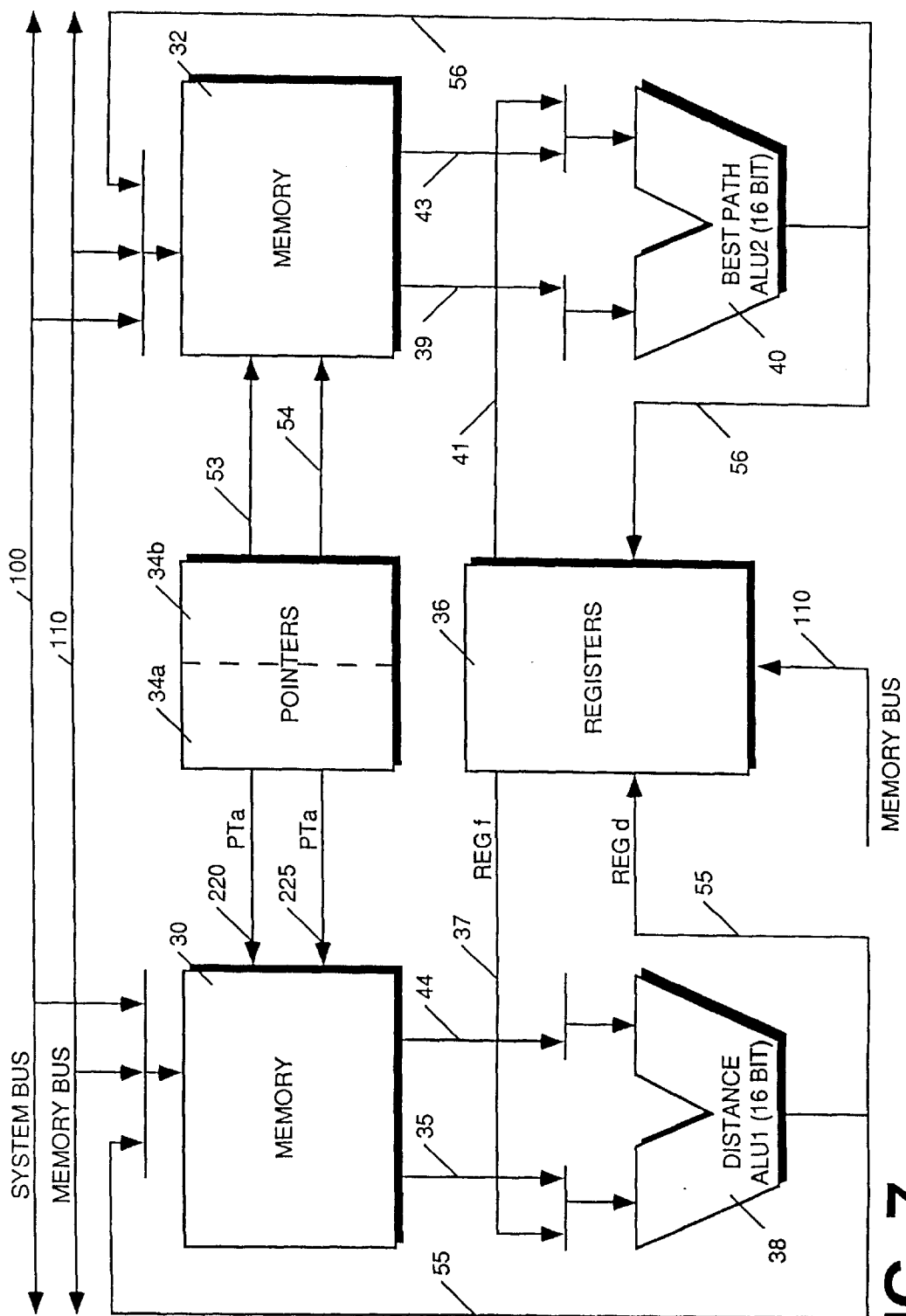
FIG. 7 is a block diagram illustrating the two arithmetic pipelines, the two pointer pipelines, the data memories, pointer registers, and general purpose registers of the present invention.

With reference to FIG. 7, an overall logical system diagram of the present invention arithmetic pipeline and pointer pipelines is illustrated within the environment of the pattern recognition engine 525. The details of the components illustrated in the system diagram will be further described in discussions to follow. There are two identical arithmetic pipelines 38, 40 and two identical pointer pipelines 34a and 34b illustrated. According to the present invention, two data memory units 30 and 32 are utilized. These memory units contain the immediate pattern data of the unknown pattern and reference pattern that will be processed, point by point, by the present invention as well as other lattice information for each processing point within the DTW and HMM procedures. These memory units are RAM units and contain 256 entries by 16 bits wide each; however, such specific configurations of the present invention may be altered to accommodate various programming implementations and stay within the scope of the present invention.

Both memory units 30 and 32 are coupled to a separate pointer pipeline 34a or 34b which supplies two separate designated pointer pairs (Pta and Ptb) from each pointer pipeline which are used to reference entries of the memory units 30 and 32. Each pointer pipeline provides the address of operands and results for each data memory separately. Pointer pipeline 34a addresses data memory 30 while pointer pipeline 34b supplies pointers to address data memory 32. The memory units are each associated with a separate arithmetic pipeline; memory unit 30 with arithmetic pipeline 38 and memory unit 32 with arithmetic pipeline 40. Each of the memory units have dual read channels and one write channel. Each memory is able to provide two operands to an associated arithmetic pipeline and write a result from the associated arithmetic pipeline or from a memory transfer every cycle. Therefore, each memory has two data output channels and one data input channel. The data input channel for each memory is multiplexed between a system bus 100, a memory bus 110 and the output of an accumulator of an associated arithmetic pipeline.

More specifically, memory unit 30 of the present invention has two 16 bit read output channels 35, 44 which are fed to two input channels of arithmetic pipeline 38 to supply two operands to the distance arithmetic pipeline 38. Arithmetic pipeline 38 is a pipeline that can perform, among other functions, the distance computations that were referred to above with reference to the DTW and HMM procedures. The output of arithmetic pipeline 38 is fed to the write input of memory 30 via line 55 to supply the memory with the result of the arithmetic pipelines computation or can be written into the register file 36. One pointer pipeline 34a is also coupled with memory 30 to supply the two pointers (Pta and Ptb) which are coupled to the read address lines of memory 30 and which address the contents of memory 30 to output operands over the output channels coupled to the arithmetic pipeline 38. Pointer, Pta, is input over line 220 and pointer, Ptb, is input over line 225. The system bus 100 and the memory bus 110 are also coupled to the input write channel of memory 30. A general purpose register file 36 is also coupled to one input of the arithmetic pipeline 38 via line 37 in order to deliver the contents of one of the registers (Regf) to the arithmetic pipeline 38 in the form of an operand. The contents of line 37 and 35 are multiplexed into the corresponding arithmetic pipeline input. The output of the arithmetic pipeline 38 is also input to the general purpose register file 36 via line 55 to supply a register designated as Regd. The memory bus 110 is also communicatively coupled with the general purpose register file 36. It is appreciated that according to the present invention, the memory 30 is uniquely coupled to the arithmetic pipeline 38 that can perform the distance computations. Pointers Pta and Ptb control the accessing of memory 30 to output corresponding values over output channels 35 and 44 to supply arithmetic pipeline 38.

Similarly, with reference to FIG. 7, memory 32 is associated with arithmetic pipeline 40. Arithmetic pipeline 40 of the present invention performs the best path computations as described above for the DTW and HMM procedures. The system bus 100, the memory bus 110, and the output of the accumulator of arithmetic pipeline 40 over line 56 are multiplexed into the write input of memory 32. The two read address inputs of memory 32 are coupled to two pointers supplied over lines 53 and 54 from the other pointer pipeline 34b. These pointers are not the same pointers that index memory 30 since they are generated by different pointer pipelines. A read channel output 39 is coupled to an input of the arithmetic pipeline 40. The other read channel output 42 is coupled to the other arithmetic pipeline 40 input and multiplexed with an input line 41 that coupled with the general register file 56. It should be noted that the pointer values associated with both line 220 and 225 are multiplexed to the write address channels of the memories 30 and pointer values 53 and 54 are multiplexed to the address channels of memory 32.

According to the system diagram of the present invention as shown in FIG. 7, there are two arithmetic pipelines, one arithmetic pipeline 38 for computing the distance functions and one arithmetic pipeline 40 for computing the best path. The distance pipeline, or arithmetic pipeline 38, receives operands from the data memory 30 or from the general purpose register file 36 (as Regf) and writes results in the memory 30 or into the general purpose register file into the register identified as Regd. The best path pipeline, arithmetic pipeline 40, receives operands from data memory 32 or the general purpose register file 36 and writes results into memory 32 or into the general purpose register file 36. Although the two arithmetic pipelines work with different memory units, they can exchange data through the common general purpose register file 36. Within the register file 36, there are 16 general purpose registers that are 16-bits wide each. Addresses of operands or results to be read out or written into the data memories 30, 32 are provided by the pointer pipelines 34a and 34b respectively. The register file 36 has four ports, two read ports 37 and 36 and two write ports 55 and 56. The register file of the present invention is able to provide one operand to each arithmetic pipeline every cycle and is able to write a result from each arithmetic pipeline operation every cycle.

It is appreciated that each of the two arithmetic pipelines operate of the present invention in parallel to perform the above computations simultaneously. It is also appreciated that the pointer values supplied by the pointer pipeline 34a and 34b are also updated during the same time as the arithmetic pipelines are performing their calculations. The present invention provides a system whereby in the same instruction cycle that the arithmetic pipelines are calculating their respective results, a pointer pipeline associated with each arithmetic pipeline is preparing the pointer values Pta, Ptb for the next computation (instruction cycle) so that there is no processing delay associated with the pointer update function. It is further appreciated that since the two arithmetic pipelines 38, 40 are identical and also that the two pointer pipelines 34a and 34b are identical, only one set of arithmetic pipeline 38 (the distance pipeline) and associated pointer pipeline 34a will be described in detail herein. It is appreciated that the other set, arithmetic pipeline 40 (the best path pipeline) and pointer pipeline 34b is analogous. It is appreciated that the general purpose register file 36 is common between both of the above sets.

C. Instruction Formatting of the Present Invention

The present invention PR engine 525 may utilize a Very Long Instruction Word architecture processing and utilizes a specialized instruction coding scheme that allows the parallel processing capabilities as described above. This encoding scheme uses a Very Long Instruction Word (VLIW) encoding scheme which illustrated in Table I below. That is, in the currently preferred embodiment, many instructions are grouped together into wide instructions and issued in a single instruction cycle. Each part of the wide instruction words controls a different pipeline in the PR engine 525. In the present invention, the ability to achieve this type of parallelism using wide instructions is due, in part, to the nature of the recognition algorithms utilized by PR engine 525, which perform computations independent of branching routines and loop structures (i.e., the control flow) embedded within the pattern recognition program.

In the currently preferred embodiment, the width of the wide instruction word is 80 bits. Instructions are kept in a program memory 415 which is loaded before the program begins from the off-chip memory 615 or from the disk 516 or from the main memory 512 of the computer system 500.

The present invention also uses a shorter 40-bit format for instructions. The most significant bit of the instruction defines its format. In the currently preferred embodiment, if the most significant bit is 0, the instruction is a short 40-bit format. However, if the most significant bit is a 1, the instruction is a long 80-bit format.

Specifically, according to one embodiment (see Table I below), long instructions comprise six separate fields. The first field identifies whether or not the instruction format is long or short. Table I illustrates a long format. The second field is a 15 bit field that contains control instruction information and contains a long control instruction. The third field contains information for the operation of the distance arithmetic pipeline 38 and the fifth field contains information for the operation of the best path arithmetic pipeline 40. The fourth and sixth fields contain information that is sent to the two pointer pipelines 34a and 34b, respectively, for pointer update. It is appreciated that the two arithmetic pipelines as well as the two pointer pipelines operate in parallel according to the fields of the Very Long Instruction Word format.

TABLE I

| 1 bit | 15 bits | 27 bits | 5 bits | 27 bits | 5 bits |
|---|---|---|---|---|---|
| 1 | Long Cntl | ALU1 | Pt1 | ALU 2 | Pt 2 |

According to Table I, the fourth field corresponds to the instruction field for pointer pipeline 34a. This five bit field controls the pointer pipeline used by the distance arithmetic pipeline 38 of the present invention and contains a pointer instruction or operation. The sixth and last field corresponds to the instruction field for pointer pipeline 34b. This five bit field controls the pointer pipeline used by the best path arithmetic pipeline 40 of the present invention and contains a pointer instruction or operation. It is appreciated that a pointer instruction may utilize pointer information stored within an arithmetic instruction field.

The short instruction format (40 bit format) of the present invention resembles the above Table I however contains only four fields. In the currently preferred embodiment, the first field comprises 1 bit, the second field comprises 7 bits of control information, the third field comprises 27 bits and the fourth field comprises 5 bits. In the present invention, the first field indicates whether the instruction is a long or short instruction. The following seven bits (i.e., the second field) represent a short control instruction. The twenty-seven bits (i.e., the third field) following the seven bits of the short instruction represent an arithmetic pipeline instruction. The last five (i.e., the fourth field) bits represent a pointer instruction.

Short control instructions are used by the present invention to initiate loops, to set up the control registers (CRs) and the condition bits in the control pipeline. Short instructions also allow the control of simple loops, like initialization loops for example. Long control instructions are used in the inner loops, to control the program flow and perform the branching and comparison operations of the control pipeline. In the currently preferred embodiment, all but two short control instructions are a subset of the long control instructions. The control instructions utilize control registers, which hold loop counters and branch addresses and displacements, flags and condition bits in the control pipeline for their execution.

In the currently preferred embodiment of the short and long control instruction format, the three bits following the first bit represent the opcode of the instruction, while the remaining bits specify the control registers, flags or condition bits required for execution. The currently preferred embodiments of both the short and control instructions and their associated operations are included in the Appendix C.

Table II illustrates in detail the fields available for each 27 bit arithmetic pipeline instruction field. As shown there are four different instruction formats available for the arithmetic pipeline of the present invention. For the sake of discussion, it is assumed that Table II illustrates the breakdown of the fields associated the distance arithmetic pipeline 38 and pointer pipeline 34a. However, the discussion equally applies to the best path arithmetic pipeline 40 except that each pipeline utilizes a different and associated pointer pipeline. As Table II illustrates the arithmetic pipeline instructions are 4 address instructions. An arithmetic pipeline instruction specifies addresses of two pointer registers and addresses of two general purpose registers. Which registers are used as sources or source addresses and which registers are used as destination or destination addresses is specified in a 5 bit field called the type, or, more specifically, source type and destination type. The operation performed between the sources is called the opcode. The accumulator may also be a source and it is appreciated that the accumulator always holds the result of the previous arithmetic pipeline instruction.

TABLE II

| 6 bits | 1 bit | 4 bits | 4 bits | 4 bits | 4 bits | 4 bits |
|---|---|---|---|---|---|---|
| Opcode | Destination type | Source Type | Ptb | Pta | Regf | Regd |
| Opcode | 1 (*Ptb) | 0x11 *Pta op Imm | Ptb | Pta | 8 bit immediate | |
| Opcode | 0 (Regd) | 1111 Regf op Imm | 8 bit immediate | | Regf | Regd |
| nop or ldimm | 0 (Regd) | | 16-bit immediate | | | Regd |

The above Table II illustrates that the arithmetic pipeline of the present invention may adopt one of four different formats. The first format will be discussed in detail herein. According to the first format, the first six bits of the instruction represent the opcode or operation for the particular instruction cycle. A listing of the available operations that may be performed by each arithmetic pipeline the present invention is presented herein at the Appendix A. The arithmetic pipeline opcode is typically a arithmetic operation to be performed by the arithmetic pipeline. The next bit indicates where the destination will be for the result of the operation. This destination may be the designated register, Regd, of the general purpose register file 36 or may be an address within the data memory 30 as pointed to by the designated pointer, Ptb. The next four bits indicate the source type of the present instruction which indicates from where the sources of the opcode will be taken. This will be described in detail to follow. The next four bits (the fourth field) indicate which pointer of the 16 pointers of the pointer file associated with arithmetic pipeline 38 will be designated as pointer Ptb. The next four bits (the fifth field) indicate which pointer of the 16 pointers of the pointer file associated with arithmetic pipeline 38 will be designated as pointer Pta. The following four bits indicate which register of the 16 registers of the general purpose register file 36 will be designated as Regf. The following four bits indicate which register of the 16 registers of the general purpose register file 36 will be designated as Regd.

It is appreciated that this first format of the arithmetic pipeline instruction contains four addresses of four different sources. Depending on the status of the source type field, these four addresses may be utilized in order to gather the operands for the designated opcode or to route the result of the opcode to a proper destination. It is appreciated that since pointer pipeline 34a operates in parallel with arithmetic pipeline 38 and may designate pointers for a pointer instruction, up to four separate addresses may be utilized and updated within a single instruction. This format allows a large degree of flexibility for the instructions of the arithmetic pipelines of the present invention. According to the second format illustrated in Table II, an 8 bit immediate value can be placed into the last 8 bits of the arithmetic pipeline instruction format. In this format, the destination address must be designated as *Ptb which is the address within the memory 30 pointed to by Ptb. In the third format, the 8 bit immediate value is placed in the 8 bits that are usually reserved for the pointer indicators. In this format, the result is predetermined for the register, Regd. Lastly, the forth format allows for a 16 bit immediate value to be introduced into the arithmetic pipeline. It is appreciated that the type field indicates the addressing mode for the operands and results of the operation specified within the opcode field. Therefore, four addressing modes are provided for the operands: 1) immediate operand mode; 2) register operand mode; 3) pointer indirect mode; and 4) pointer indirect with register offset mode. Register mode and pointer indirect mode are the two only possible addressing modes for results of arithmetic pipeline instructions.

Table III illustrates how the selection of destination and sources of the arithmetic pipeline are selected depending on the destination and source type fields.

TABLE III

| Destination Type (1 bit) | Source 1 Type (2 bits) | Source 2 Type (2 bits) |
|---|---|---|
| 0 Regd | 00 *Pta (byte) | 00 *Ptb (byte) |
| 1 *Ptb | 01 *Pta (word) | 01 *Ptb (word) |
| | 10 *(Pta + Regf) | 10 Accumulator |
| | 11 Regf | 11 Immediate |

According to Table III, when the destination field of the arithmetic pipeline instruction format is 0, the result of the arithmetic pipeline will be loaded from the accumulator into the register indicated as Regd. Otherwise, the result will be loaded into the memory 30 at a location indicated by pointer, Ptb. The first two bits of the source type refer to the first source location for the arithmetic pipeline 38. If the first two bits of the source type are 00 then the first source will be indirectly addressed from pointer, Pta, from the memory 30 in a 8 bit format. If the first two bits of the source type are 01 then the first source will be indirectly addressed from pointer, Pta, from the memory 30 in a 16 bit word format. If the first two bits of the source type are 10 then the first source will be indirectly addressed from pointer, Pta, and offset by the value of Regf from the memory 30 in a 16 bit word format. If the first two bits of the source type are 11 then the first source will be taken as the value within Regf, a direct access, in a 16 bit word format.

Referring still to Table III, the second two bits of the source field indicate the location of the second source of the arithmetic pipeline 38. If the second two bits are 00 then the second source will be obtained via indirect addressing according to the value of pointer, Ptb, and the memory 30 will deliver a byte format. If the second two bits are 01 then the second source will be obtained via indirect addressing according to the value of pointer, Ptb, and the memory 30 will deliver a word format. If the second two bits of the source type field are 10 then the second source will come from the accumulator of the arithmetic pipeline 38. If the second two bits of the source type are 11 then the second source of the arithmetic pipeline will come from the immediate value found in the arithmetic pipeline instruction format of Table II. Table III illustrates that the present invention arithmetic pipeline offers a rich addressing scheme of four possible operand addresses for each arithmetic pipeline instruction opcode.

D. Distance Arithmetic Pipeline 38 of the Present Invention

Figure 8:
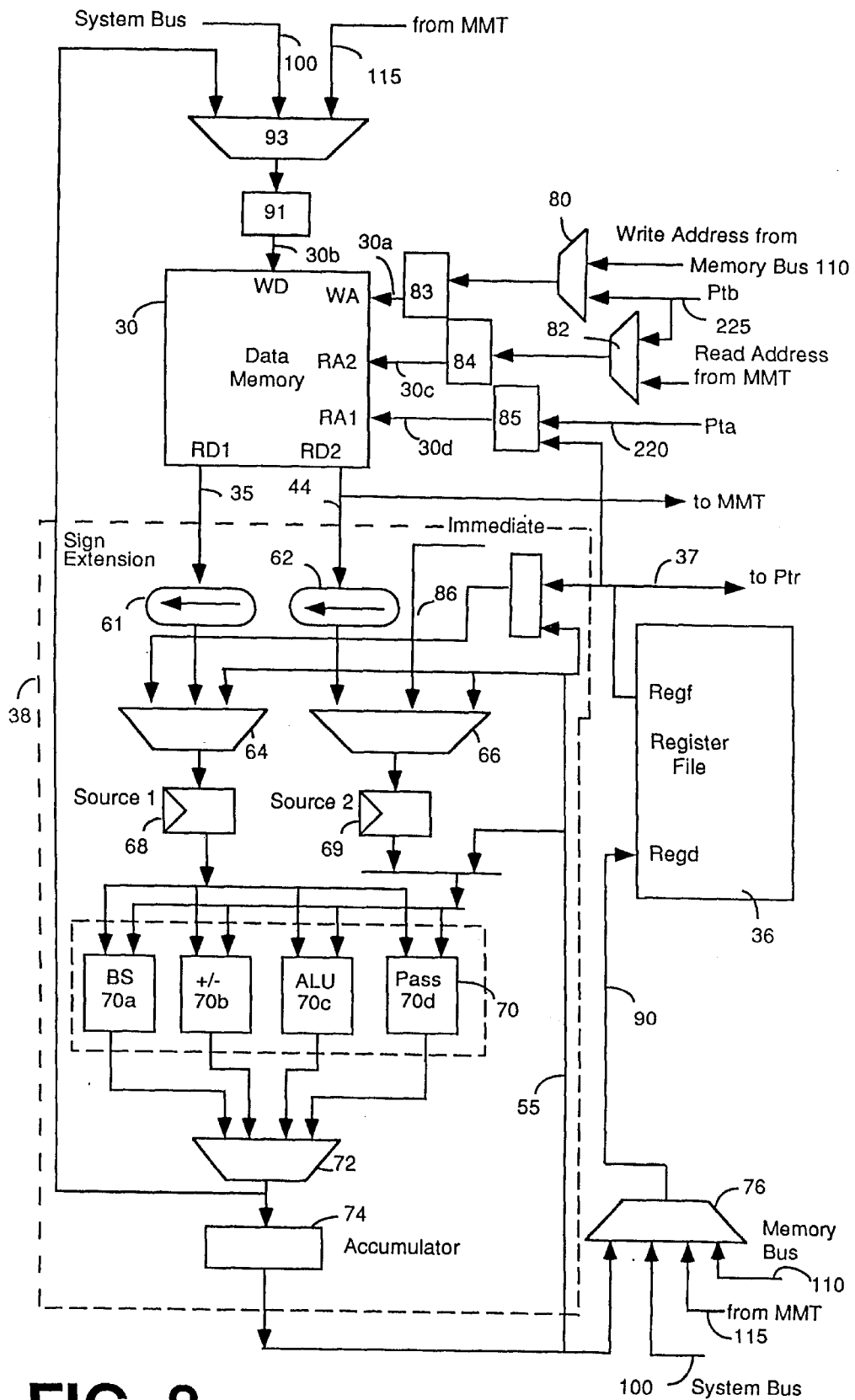
FIG. 8 is a block diagram of an arithmetic pipeline of the present invention.

Given the addressing schemes of the present invention as described above and the instruction formats, a discussion of the hardware components that realize elements of an arithmetic pipeline of PR engine 525 of the present invention will now be presented. With reference now to FIG. 8, there is illustrated a more detailed diagram of the distance arithmetic pipeline 38 (dashed lines) that performs the distance calculations of the HMM and DTW procedures. The best path arithmetic pipeline 40 is identical to this pipeline. FIG. 8 also illustrates the general purpose register file 36 and the associated data memory 30 in more detail that are used with the arithmetic pipeline 36. It is appreciated that with reference to the arithmetic pipeline 40, it will exchange information with memory 32 which is addressed by pointer pipeline 34a but will address the general purpose register file which is common to both arithmetic pipelines.

Data memory 30 is shown in FIG. 8. The write data port 30b of memory 30 is coupled to a register (latch) 91 which receives data input from a multiplexer 93 over three sources. It receives input from the system bus 100, from a memory to memory transfer block 416 input 115 or from the output of the arithmetic pipeline 38. The single write address port 30a of memory 30 receives an input from register (latch) 83 which receives an input from multiplexer 80. Addresses from the memory to memory transfer block 416 over line 115 or from the designated pointer, Ptb, can be multiplexed into the latch 83. The pointer, Ptb, originates from the pointer pipeline 34a. The first read address port 30c of the memory 30 is coupled to a register (latch) 84 which receives its input from multiplexer 82. Multiplexer 82 receives address inputs from designated pointer, Ptb, and from the memory to memory transfer block 416 over line 115. The second read address port 30d receives input from logic unit block 85 which receives two inputs. One input is the designated pointer, Pta, and the other input is the designated register, Regf. The first read address port is associated with the first read data output port 35 and the second read address port is associated with the second read data output port 44 of the memory 30. It is noted that an output from channel 44 is also fed to the memory to memory transfer block 416.

The two read data output channels 35 and 44 supply two operands to the arithmetic pipeline 38. The read data output channel 35 of the present invention is a sixteen bit line and is fed into a eight bit multiplexer (not shown here) and then fed into a sign extension block 61 of the arithmetic pipeline 38. Similarly, the read data output channel 44 is a sixteen bit line and is fed into a eight bit multiplexer (not shown here) and fed into a sign extension block 62 of the arithmetic pipeline 38. The sign extension logic blocks 61 and 62 are coupled to an input line of each multiplexer 64 and 66 respectively. Each sixteen bit data channel 35 and 44 is also directly coupled to the inputs of multiplexers 64 and 66 respectively. Also coupled to an input of multiplexer 64 and 66 is the accumulator 74. The output of the register file 36 is also fed into an input of multiplexer 64 via line 37 and a bypass circuit; this carries the designated Regf value.

Coupled to the input of multiplexer 66 is line 86 which carries an immediate value. Multiplexer 64 is selected via the first two bits of the source type field and multiplexer 66 is selected via the last two bits of the source type field associated with arithmetic pipeline 38. Multiplexer 64 therefore selects the location for the first source which is loaded into register (latch) 68 while multiplexer 66 selects the location for the second source which is loaded into register (latch) 69. The reason the accumulator is fed into the first source, even though no accumulator location is allowed according to Table III, is because when a designated Regf is a register that was previously the value of the accumulator in the just previous instruction, the present invention will input the accumulator value as Regf instead of accessing the register file 36. This is an implementation choice selected by the present invention for efficiency and is transparent to a programmer of the arithmetic pipeline 38.

The arithmetic pipeline 38 of FIG. 8 of the present invention for the direction arithmetic pipeline contains four operators within an operator unit 70. These operators are a barrel shifter 70a, an adder and subtractor 70b, an ALU unit 70c which may also perform subtraction operations, and a pass operator 70d which is a multiplexing element between the first and second sources. It is appreciated that the present invention may operate utilizing a variety of operators and that the above are illustrated as just one operator configuration of the present invention. Each of the above four operators are coupled to both sources 68 and 69 to receive the two operands. Each of the operators are also coupled to a multiplexer 72 which channels the results to an accumulator. Depending on the operation selected, the multiplexer 72 channels the proper result to the accumulator latch 74. All of the arithmetic operations are done with 16 bit operands and results. It is appreciated that there are two operators that may perform subtraction functions, the ALU 70c operator and the subtractor 70b operator. The accumulator is also fed via line 55 to a bypass circuit into multiplexer 66 and to a bypass circuit that may substitute for Regf. Further, the accumulator output is fed into one input of multiplexer 76 along with the memory bus 110, the system bus 100 and an input from a memory to memory transfer block 416 over line 115. The output of the multiplexer 76 is then fed via line 90 to the 16 bit general register file 36 into the register designated as Regd by the arithmetic pipeline instruction format shown in Table II.

According to the diagram of FIG. 8, the present invention arithmetic pipeline 38 may have two possible source locations; one operand may come from the general purpose register file and an operand may come from the data memory 30 accessed by a pointer from the pointer pipeline 34a. Also, there are two possible destinations for a particular arithmetic pipeline instruction format; one possible destination may be to store the result into the register file 36 or to store the result into the data memory 30. Multiplexers 64, 66, 72, 76 and 93 are used to perform the specific routing to realize the source and destination types indicated by the instruction formats of Table II of the present invention.

Figure 9:
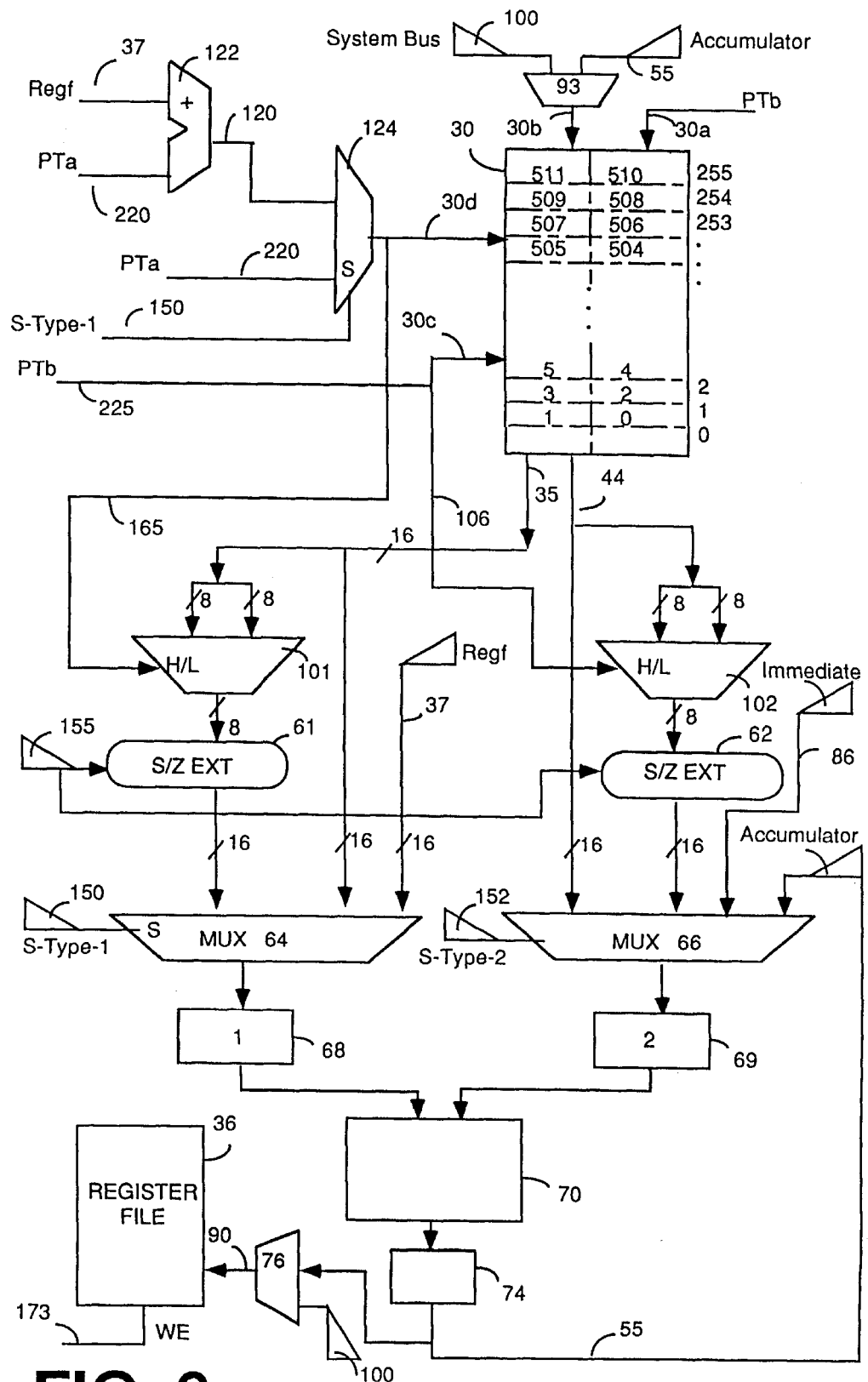
FIG. 9 is a detailed block diagram of an arithmetic pipeline of the present invention.

Referring now to FIG. 9, the present invention arithmetic pipeline is disclosed in more detail. The memory unit 30 of the present invention is divided into 256 entries of 16 bits each entry and each entry is also divided into two bytes. Therefore, there are 512 byte entries within the memory 30, the same is true for memory 32. Table III allows both byte and word accesses from the memory 30 via the pointers *Pta and *Ptb (indirect accessing used here). Depending on the source type, the arithmetic pipeline will process the output of the memory 30 as word data or as byte data. It is appreciated that each of the read address ports 30*d* and 30*c* of the memory 30 input an eight bit address value in order to access the memory. This is the case because the output channels 34 and 44 are sixteen bits long and there are 256 entries. However, for byte accessing there must be another bit added so that an individual byte within an accessed word can be selected. This ninth bit is the least significant bit (LSB) of the address value is supplied by the pointer values, Pta and Ptb, and is separated from the address that enters port 30*d* and port 30*c*. The LSB from pointer, Pta, is carried via line 165 to a high/low selector input of multiplexer 101. The LSB from pointer, Ptb, is carried via line 166 to a high/low selector input of multiplexer 102. The manner in which the present invention utilizes these bits will be developed in discussions to follow further below. It is appreciated that all reference to pointers Pta and Ptb refer to the pointer that originate from the pointer pipeline 34*a*.

Since Table III only allows pointer Ptb or Regd to be a destination address, the write address into port 30*a* of memory 30 is Ptb from the pointer pipeline 34*a*. Data for the write channel 30*b,* as discussed before, may originate from the accumulator via line 55 or may come from another system component over the system bus 100 or memory to memory transfer block 416 over line 115. The first read address channel 30*d* originates from multiplexer 124 which is controlled by select line 150. Select line 150 carries the first two bits of the source type of the arithmetic pipeline 38 instruction format of Table III. If line 150 selects '00' or '01' then the multiplexer allows the pointer data of Pta to pass to port 30*d*. If the select line 150 selects '10' then the multiplexer 124 will couple the line 120 to channel 30*d*. Line 120 is output from a logical adder 122 that adds the values of the designated Regf to the value of the pointer, Pta and outputs the result over line 120. In all cases the pointer value, Ptb, is fed to the input of read address channel 30*c* during HMM or DTW processing of the present invention.

The data read output channel 35 is 16 bits wide and will carry the high and low bytes of the word address by the signal at line 30*d*. This line 35 is separated into a high byte line having 8 bits and a low byte line having 8 bits and each of these are fed into a multiplexer 101. Multiplexer 101 will select either the high byte line or the low byte line of the addressed word depending on the value of line 165 which is the ninth and least significant bit of the designated pointer, Pta, or the summation of Pta and Regf. If line 165 is low, the low byte is selected and if line 165 is high then the high byte is selected and routed to the sign or zero extension block 61. Line 155 originates from the instruction opcode field of Table II. This field will indicate if sign extension is required by the nature of the opcode. If sign extension is required then the selected byte from line 35 and the multiplexer 101 will be placed into a 16 bit register in the least significant byte position and the most significant byte of the 16 bit register will be all set to "1" by block 61 of the present invention if the sign bit of the selected byte is a "1." However, the most significant byte of the 16 bit register will be all set to "0" by block 61 if the sign bit of the selected byte is a "0." This block 61 can transform a signed byte (8-bits) into a signed word (16-bits) if the opcode of the current arithmetic pipeline instruction indicates that a sign operation is required.

The 16 bit register result of the sign/zero extension block 61 is fed into one input of a multiplexer 64. The 16 bit data read channel 35 is also fed into an input of multiplexer 64. Lastly, the value of the designated register, Regf, is fed into an input of multiplexer 64. Multiplexer 64 is selected according to line 150. If line 150 selects '00' then the output of block 61 is channeled into the first source register 68. If line 150 selects '01' or '10' the multiplexer 64 selects the read data channel 35 to be coupled to the first source register 68. Lastly, if line 150 selects '11' then line 37 is coupled to the first source register 68.

Referring still to FIG. 9, the second read data channel 44 outputs a 16 bit value which is separated into two 8 bit lines, a high byte and a low byte and each of these are fed into a multiplexer 102. Multiplexer 102 will select either the high byte or the low byte of the addressed word depending on the value of line 166 which is the ninth and least significant bit of the designated pointer, Ptb. If line 166 is low, the low byte is selected and if line 166 is high then the high byte is selected and routed to the second sign or zero extension block 62. The multiplexer is selected by line 155. Line 155 originates from the instruction opcode field of Table II. This field will indicate if sign extension is required by the nature of the opcode. If sign extension is required, then the selected byte from line 44 and the multiplexer 102 will be placed into a 16 bit register within block 62 in the least significant byte position and the most significant byte of the 16 bit register will be all set to "1" by block 62 of the present invention if the sign bit of the selected byte is a "1." However, the most significant byte of the 16 bit register will be all set to "0" by block 62 if the sign bit of the selected byte is a "0." This block 62 can transform a signed byte (8-bits) into a signed word (16-bits) if the opcode of the current arithmetic pipeline instruction indicates that a sign operation is in order. The 16 bit register of block 62 is then output to an input of multiplexer 66.

Referring to FIG. 9, multiplexer 66 receives an input from block 62. It also receives an input directly from channel line 44. It receives an input from the accumulator of arithmetic pipeline 38 over line 55. Lastly, multiplexer 66 receives an input from line 86 which is the immediate data value of the arithmetic pipeline instruction format. All of the inputs to multiplexer 66 are 16 bit in length. Line 152 is fed as the select line for multiplexer 66 and represents the last two bits of the select type of Table III. If line 152 selects '00' then the input from the block 62 coupled to the second source register 69. If line 152 selects '01' then line 44 is coupled to register 69. If line 152 selects '10' then line 55 is coupled to the register 69 to bring the accumulator value to the second source and if line 152 selects '11' then line 86 is coupled to place the immediate value into register 69. The output of the first source register 68 and the second source register are fed to the operator unit 70 which contains the barrel shifter operator, the adder/subtractor operator, the arithmetic pipeline operator, and the pass operator. The multiplexed result of the operator unit 70 is then routed into an accumulator register 74 which is coupled to line 55 and also fed into a multiplexer 76 which supplies the result to the register file 36 as designated register, Regd. The system bus is also coupled to the multiplexer 76.

The destination type bit of the arithmetic pipeline instruction format of Table III effects the placement of the result of the arithmetic pipeline 38. When the destination is selected as the designated register Regd (i.e., the bit is 0) then the write enable 173 of the general purpose register file 36 allows the arithmetic pipeline result to be stored into the addressed Regd. When the destination type is selected for the indirect addressing pointer, *Ptb, (i.e., bit is 1) then the write enable is asserted onto memory 30 which is addressed by pointer Ptb via port 30*a* and the result is supplied via line 55 and the multiplexer 93. It is noted that multiplexer 93 selects line 55, or line 100, as an input during HMM and DTW point processing.

Therefore, according to the above discussions the present invention arithmetic pipeline realizes in circuitry the addressing modes illustrated in Table I, Table II, and Table III. It is appreciated that all of the discussions with regard to FIG. 8 and FIG. 9 apply analogously to identical arithmetic pipeline 40. However, pointers Pta and Ptb originate from pointer pipeline 34b for the arithmetic pipeline 40 and the memory unit associated with arithmetic pipeline 40 is memory 32. Further, while the distance arithmetic pipeline 38 utilizes the first arithmetic pipeline instruction field (27 bits) of Table I, the best path arithmetic pipeline 40 utilizes the second arithmetic pipeline instruction field (27 bits) of Table I.

E. Pointer Pipeline 35a of the Present Invention

Figure 10:
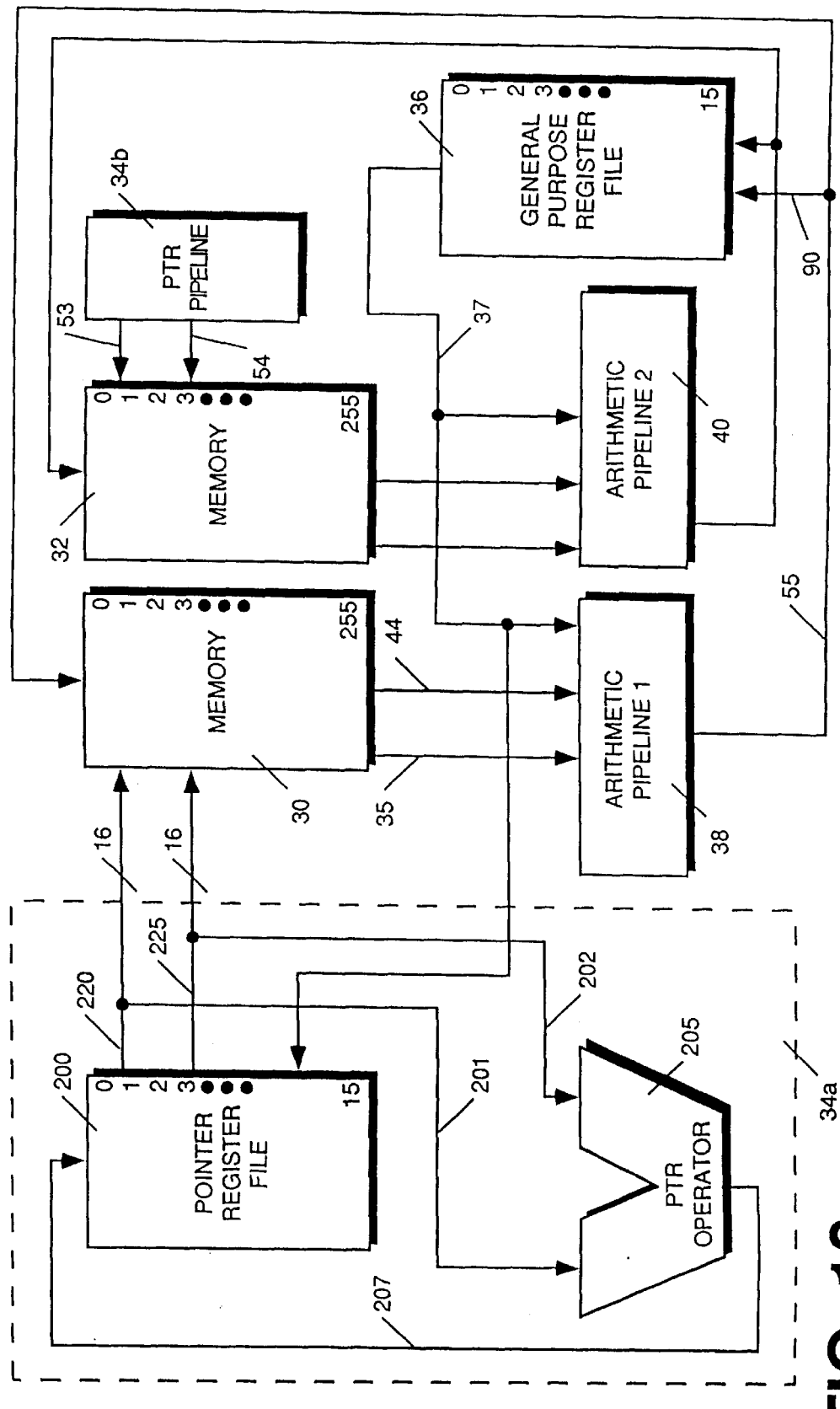
FIG. 10 is an illustration of the interface of the pointer pipelines of the present invention to the arithmetic pipelines.

FIG. 10 is a logical block diagram and illustrates the elements of pointer pipeline of PR engine 525 of one embodiment of the present invention in more detail concerning the interface of the arithmetic pipelines and the pointer pipelines. The two arithmetic pipelines 38 and 40 are illustrated coupled to memory units 30 and 32 respectively and also coupled to the general purpose register file 36. Pointer pipeline 34b is illustrated coupled to memory unit 32. The distance pointer pipeline 34a is illustrated in more detail. Within the pipeline architecture 38 is located a pointer register file 200 that contains 8 registers that are 16 bits wide each. This register file is coupled to a pointer operator 205 which is a logical unit that can perform operations on the pointers, Pta and Ptb. The designated pointers, Pta and Ptb are output over lines 220 and 225, respectively, which are coupled to memory 30 and also coupled to the pointer operator 205. The result of the pointer operator is fed back into the pointer register 200. Also, Regf is supplied to the pointer register file 200 via line 37 from the register file 36.

Given this overall system diagram, it is appreciated that the architecture and instruction coding for pointer pipeline 34b is identical to the pointer pipeline 34a (except pipeline 34a addresses memory 30 while pipeline 34b addresses memory 32) and therefore is not described in detail as to not unnecessarily obscure the present invention. It is appreciated that the pointer pipeline 34b contains its own pointer register file and does not utilize the register file 200 of pointer pipeline 34a. Since each arithmetic pipeline has a corresponding pointer pipeline counterpart, during the processing cycle wherein an arithmetic pipeline is performing a point computation, the associated pointer pipeline will be updating the pointer information so that upon the immediate next processing cycle the arithmetic pipeline may process the next valid point of the lattice without a pointer update delay.

In so doing the processing required to update the pointers takes no additional processing time. The present invention therefore offers an extremely efficient and rapid processing scheme that may be especially useful in pattern recognition procedures. It is appreciated that the arithmetic pipeline 38 may operate utilizing one or two addresses as a source for source1, one address as a source for source2, one address as a destination while the pointer pipeline 34a may simultaneously operate on another, fourth address which may be an additional pointer address. Therefore, within one instruction the present invention allows processing four addresses and a pointer address update function. Therefore, within one instruction the present invention allows simultaneous processing four addresses and two arithmetic functions, one function being computed by the arithmetic pipeline and the other being computed by the pointer pipeline.

Figure 11:
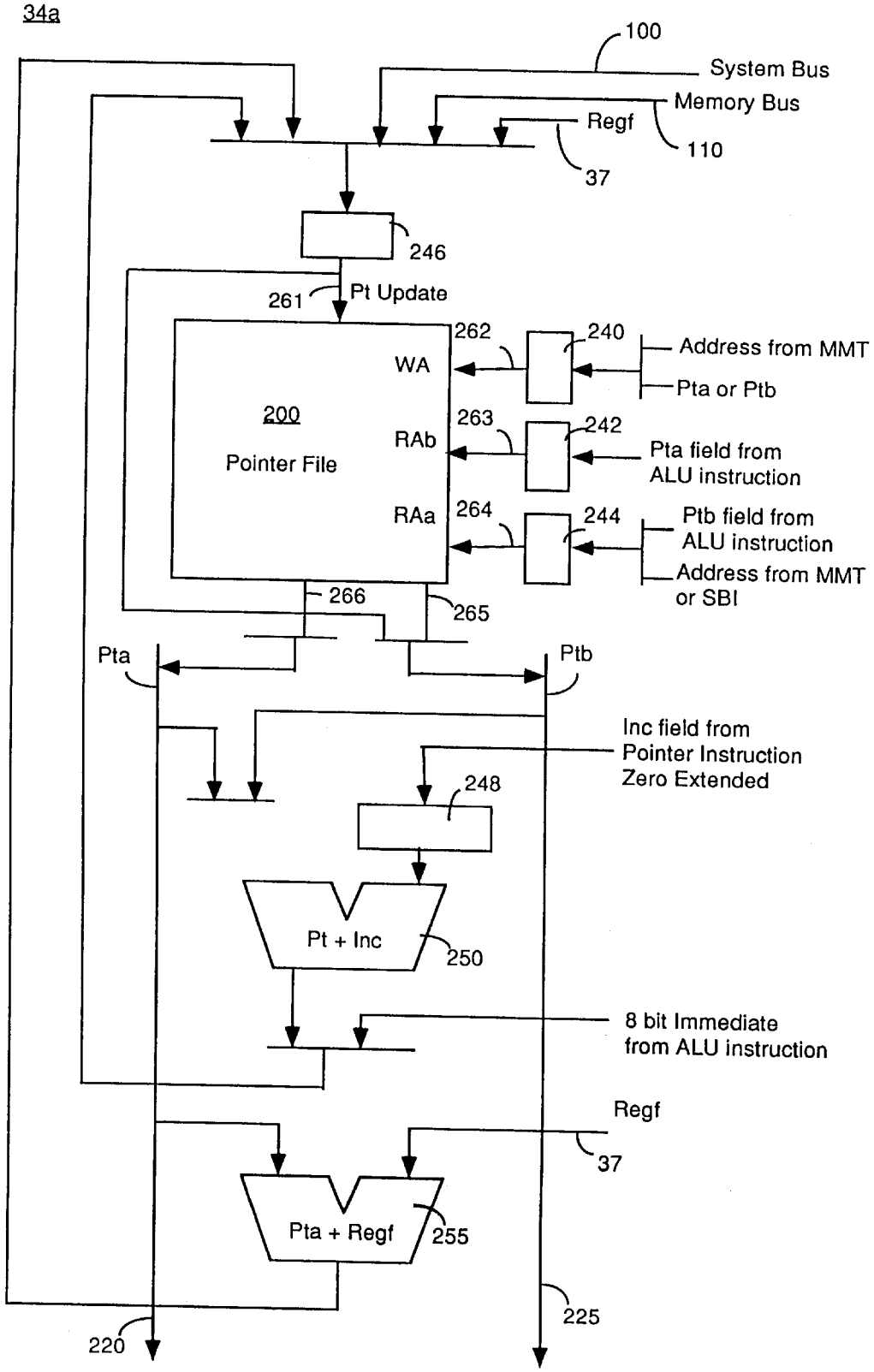
FIG. 11 is a detailed block diagram of a pointer pipeline of the present invention.

Refer now to FIG. 11 which illustrates in more detail a pointer pipeline (34a or 34b) of the PR engine 525 of the present invention. Each pointer pipeline has two adders to compute (pointer+some increment) and (pointer+Register Regf). All pointer operations are 16 bit operations. Write data enters pointer register file 200 via write data port 261. This data is loaded into register 246 via a number of sources. Pointer data may originate from the system bus 100, or from the memory to memory transfer bus 110. Pointer data may arrive from the designated register, Regf via line 37. Data also may enter the write port 261 via the output of adder 250 or from the output of adder 255. Depending on the particular pointer instruction opcode designated in the pointer field (field 4 or field 6) of Table I, a particular source of the above will be multiplexed (via a first pointer multiplexer) into register 246 and input to the write port 261 of the present invention. The write address port 262 of the pointer file receives the pointer address via register 240 which multiplexes inputs from the memory to memory transfer block and from the currently designated pointers, Pta and Ptb. The value input to port 262 will be the address of the designated pointer within the pointer file 200. There are 8 pointers within each pointer file of the present invention, therefore, there are 16 unique pointer addresses for Pta or Ptb. It is appreciated that the output of operator 255 may also be carried over line 220 to the associated arithmetic pipeline.

According to the present invention, the pointer file 200 of the present invention contains two read address ports 263 and 264 and two read data output ports 265 and 266 respectively. The read address port 263 inputs the address of designated pointer Ptb via register 242. Pointer address for Ptb is supplied via the arithmetic pipeline instruction field of Table II. The pointer value for pointer Ptb is then output over read output data port 265. The read address port 264 inputs the address of designated pointer Pta via register 244. The memory to memory transfer block may also access port 264 via register 244 for initialization and setup purposes. Pointer address for Pta is supplied via the arithmetic pipeline instruction field of Table II. The pointer value for pointer Pta is then output over read output data port 266. It is appreciated that both pointers, Pta and Ptb, may be accessed via the pointer register file 200 simultaneously.

Refer to FIG. 11. Both output ports 266 and 265 are routed to the data input port 261 for pointer swap capabilities. The outputs of port 266 and port 265 are multiplexed into a first input of adder 250. The other, second, input of adder 250 receives data from register 248. Register 248 receives data from the increment field of the pointer instruction (which will be described below in Table IV) and this value is zero extended. Depending on the status of the pointer instruction, a different data channel 266 or 265 will be coupled to adder 250 via the first input. Adder 250 outputs a result which is multiplexed with an 8 bit immediate value from the arithmetic pipeline instruction. This multiplexed result is then fed to an input port of the first pointer multiplexer which supplies data to the register 246. Using the adder 250 and the multiplexed values from the arithmetic pipeline immediate field, the present invention allows the pointer pipeline to perform the operations of incrementing a pointer value or assigning a pointer value with an immediate value from the arithmetic pipeline instruction field (Table II).

The output of port 266 is fed into the first input of adder 255 and then is output via line 220 as the current value of designated pointer, Pta, which is used to address memory 30 for the distance arithmetic pipeline 38. The output port 265 is output via line 225 as the current value of the designated pointer, Ptb, which is used to address memory 30 of the distance arithmetic pipeline. Line 37 carries the value of the designated register, Regf, into the second input of adder 255. The result of adder 255 is then routed to the first pointer multiplexer and to register 246. Adder 225 allows the pointer pipeline of the present invention to realize the pointer, Pta, plus register, Regf, operation which may be fed back into register 246 depending on the status of the current pointer instruction.

Table IV below illustrates the detailed decoding scheme of each of the 5 bit pointer instruction field of Table I. As noted, there are two pointer instructions in Table I, one for each of the two pointer pipelines. The first field of Table IV is a one bit field that indicates which designated pointer, Pta or Ptb, is involved in the pipeline operation. This will determine which of the pointer values, Pta or Ptb, are fed to the adder 250 or routed to register 240 for write addressing. The second field, the 2 bit opcode field, indicates the type of instruction to be executed by the pointer pipelines. The last field, the 2 bit increment field, indicates the increment type designated in the opcode field. If the opcode field is '00' and the increment field is a '00' then no operation takes place and the values of the pointers within the register file 200 remain constant during the instruction cycle. If the opcode field is '00' and the increment field is '01' or '10' then either designated pointer Pta or Ptb (depending on the status of the first field) will be incremented by 1 or 2 respectively and stored back into the pointer register file. This realizes the instruction Pta=Pta+1 or +2 and Ptb=Ptb+1 or +2. In this case the output of adder 250 is channeled into register 246. If the increment field is '11' and the opcode field is '00' then the immediate value indicated by the arithmetic pipeline instruction (Table II) is placed into the pointer register indicated by the first field (i.e., either Pta or Ptb). This realizes the instruction Pta or Ptb=immediate. In this case the output of adder 250 is channeled to register 246.

According to Table IV, if the opcode field indicates '01' then either Pta or Ptb is assigned the value associated with the register, Regf. In this case line 37 is channeled to register 246. If the opcode field is '10' then the pointer Pta is added to value contained within register Regf. This realizes the operation Pta=Pta+Regf. In this case the output of adder 255 is channeled into register 246. According to the last two cases, when the opcode field is '11' and the first field indicates 0 then Pta=Ptb and Pta is the source write address while the Ptb value is channeled to port 261. When the opcode field is '11' and the first field indicates 1 then Ptb=Pta and Ptb is the source write address while the Pta value is channeled to port 261 to perform the swap operation. According to the above discussion, the pointer pipeline has the capability to perform several basic operations on the pointer values concurrently with the arithmetic pipeline processing. It is appreciated that the pointer register file 200 contains 8 registers of 16 bit width. The arithmetic pipeline instruction format of Table II indicates which of these 8 registers will be Pta and Ptb associated with the pipeline 34a. Once these are defined, the associated pipeline instruction format of Table IV determines the operations performed on these registers.

TABLE IV

| Which<br>1 bit | Opcode<br>2 bits | Inc<br>2 bits | Flags |
|---|---|---|---|
| 0 | 00 Nop | 00 | |
| 1 Pta | 00 Pt + Inc | 01 Inc=1 | ZP, CP |
| 0 Ptb | 00 pt + Inc | 10 Inc=2 | ZP, CP |
| | 00 Imm | 11 | |
| | 01 Regf | 00 | ZP, CP=0 |
| | 10 Pta + Regf | 00 | ZP, CP |
| 0 | 11 Ptb | 00 | |
| 1 | 11 Pta | 00 | |

It is appreciated that one pointer instruction is attached to each arithmetic pipeline instruction. It operates on one of the pointer registers specified in the corresponding arithmetic pipeline instruction: Pta, or Ptb, as defined by the first field pointer bit. Pointers can be incremented (used when accessing successive data in an array of memory 30), loaded with the contents of a general purpose register, loaded with an immediate value, or added to the contents of a general purpose register. Pta can be loaded with the contents of Pta and Ptb can be loaded with the contents of Pta. As can be seen, the pointer pipelines 34a and 34b provide the addresses of operands and results of the data memories 30 and 32. There are two pointer pipelines, one for each data memory. The pointer pipelines execute arithmetic instructions on the pointers, Pta and Ptb. Each pointer pipeline is capable of delivering two pointers (Pta and Ptb) to an associated data memory every instruction cycle, and also capable of executing one operation on one pointer every instruction cycle. The register file 200 of the pointer pipeline 34a associated with the memory 30 holds pointers 0 to 7 while the register file associated with the pointer pipeline 34b for data memory 32 holds pointers 8 to 15. Pointers 0 to 7 cannot be used to address the memory 32 while pointers 8 to 15 are not used to address memory 30.

It is appreciated that in view of the addressing available for the arithmetic pipeline and that the pointer pipeline allows operations on a selected pointer that may also include a register offset, the present invention provides an instruction capable of four addresses. The above is allowed per instruction cycle. It is further appreciated that in view of the addressing available for the arithmetic pipeline and that the pointer pipeline allows operations on a selected pointer that may also include a register offset, the present invention provides a PR engine 525 an instruction capable of executing an instruction having four addresses. The above is allowed per instruction cycle. A possible use of the above system would be to perform an operation on a first source from *(Pta+Regf) and a second source from *Ptb, then place the result into Regd and at the same time increment pointer Pta. The above can be accomplished within one instruction cycle in a single instruction format using an arithmetic pipeline and a pointer pipeline. It is clear that four addresses were simultaneously utilized, two registers and two pointers. Since the present invention offers two pairs of arithmetic and pointer pipelines, the above function can in reality be accomplished twice, once by each pipeline pair.

Asymmetric Source Type Format of the Present Invention

Referring to Table III, the four possible sources or set of addresses for the source1 operand are not symmetric to the four possible sources or address set for the source2 operand. That is, the accumulator and the immediate data are available only to the source2 operand and not to the source1 operand, therefore the sets of sources available for source1 is not equal to the set of sources available to source2. Further, the register Regf source is not available to the source2 but is available to source1. Also, source indexing mode (via Regf) is not available for source2 but is available for source1. This is referred to as source asymmetry within the operands of the arithmetic pipelines. This asymmetry was designed into the present invention to allow greater source addressing flexibility and combinations while also tailoring the addressing combinations of the arithmetic instructions to the DTW and HMM pattern recognition procedures as well possible future evolution of these recognition procedures.

In order that such asymmetric addressing capability not pose a limitation to the present invention, the present invention has provided several special complementary instruction pairs for noncommutative operations that allow any of the instruction operands of such operations to come from either source1 or source2 to eliminate the problem posed by address set asymmetry. For example, refer to the Appendix A which illustrates a listing of the arithmetic pipeline operations that the present invention PR engine 525 currently supports. Since subtraction is a noncommutative operation there are two instruction to perform subtraction. Once instruction, opcode=AH, specifies the subtraction of source1–source2. Another complementary instruction, opcode=CH, specifies the subtraction of source2–source1. Therefore, the accumulator, which is available only to the source2 register, may be subtracted from a value (source1–accumulator) or may have a value subtracted from it (accumulator–source1) depending on the instruction selected of the complementary instruction pair. In this way the present invention offers flexibility for the use of the immediate value and accumulator value in spite of the fact that the source addressing is not completely symmetric with respect to the accumulator and immediate value.

Byte or Word Accessing in Memory Without Processing Penalty

The arithmetic pipeline, may address either a byte data or a word data item within the same instruction cycle. That is, with reference to FIG. 9, multiplexer 64 and multiplexer 66 may select either the word output from memory 30 or the selected byte output from memory 30 within the same instruction cycle. Each multiplexer is independent and may take a word or a byte input. Also, operations may utilize operands that mix byte and word data within the same instruction clock cycle. For instance source1 may come from *Pta(byte) which is a byte format while source2 may come from the accumulator or from *Ptb(word) and either are word formats. It is appreciated that is advantageous to be able to mix byte and word formats within the same instruction while having the ability to execute that instruction within one clock cycle. The present invention offers the ability to perform an operation involving two byte operands or a byte operand and a word operand or two word operands without any performance degradation between the above types.

F. Control Pipeline 454 of the Execution Unit 430

In the preferred embodiment of the present invention, the control registers (CRs) are typically used as loop counters. Arithmetic operations are executed on the control registers. The values in the control registers are updated each time a loop is executed. The values in the control registers can be compared between themselves or to some other value to determine conditions upon which branch operations may be taken.

The control flow pipeline 454 of the PR engine 525 is also responsible for generating flags and condition bits which are used with branch instructions. The flags are set as a result of the operations performed by all of the pipelines. The condition bits are set as a result of the operations performed by the arithmetic operator of the control flow pipeline. The flags are used by conditional branch instructions to determine whether or not to branch. In the present invention, control unit 454 is capable of generating its own condition bits, which do not depend on any other units (i.e., the arithmetic pipelines; the pointer pipelines) for the generation. The control flow pipeline 454 is also capable of using flags produced by all of the different pipelines in the execution unit. In the currently preferred embodiment, all of the flags are stored in a flag register. It is appreciated that long and short control instruction formats and related information is presented in Appendix C.

Figure 12:
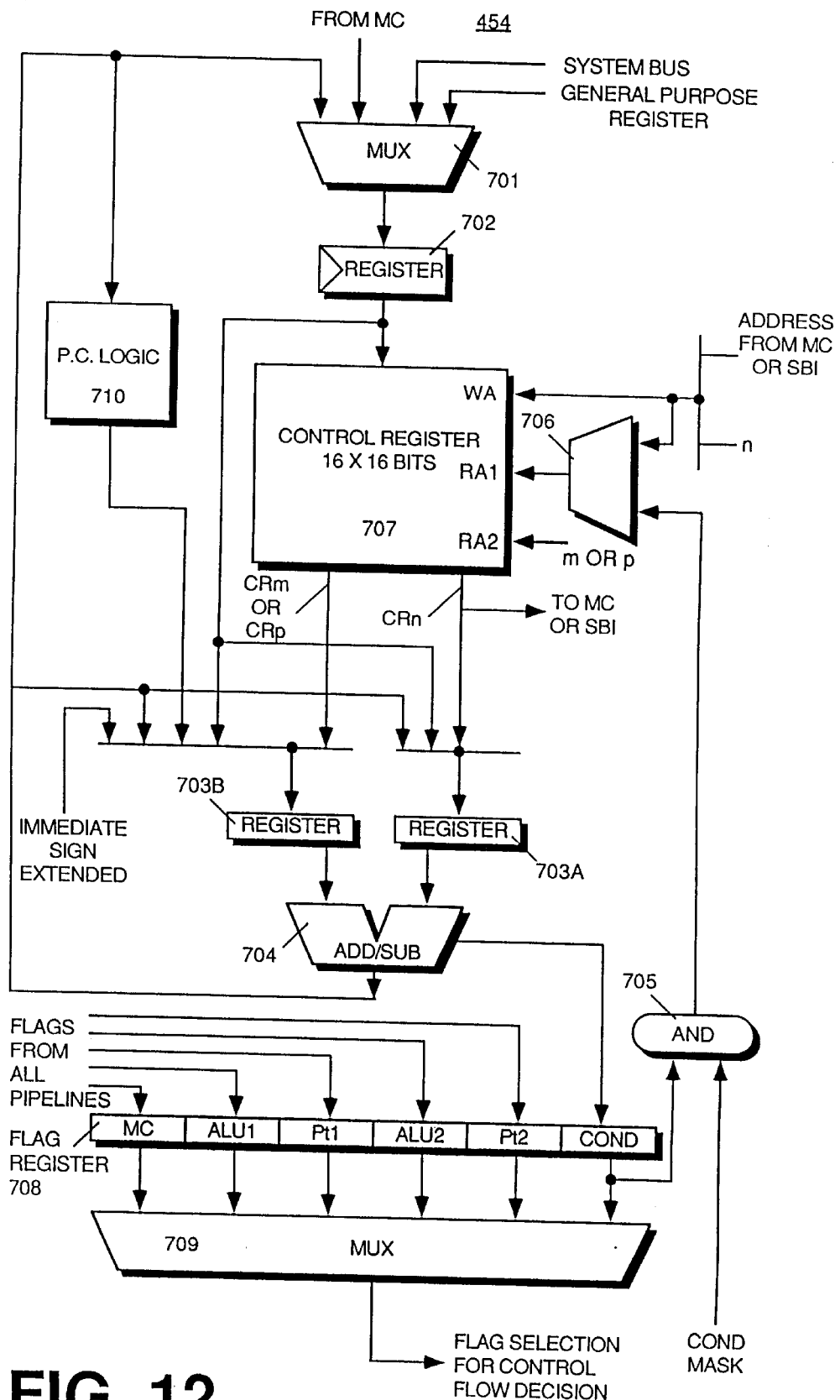
FIG. 12 is a detailed block diagram of the control flow pipeline of the present invention.

A block diagram of the control flow pipeline 454 and the data flow in the control unit are shown in FIG. 12. Referring to FIG. 12, control flow pipeline comprises multiplexers (MUX) 701, 706, and 709, clocked registers 702, 703A and 703B, control register file 707, arithmetic operator 704, AND logic gate 705, flag register 708, and program counter (PC) logic 710. MUX 701 is coupled to receive the data output of arithmetic operator 704, an input from the main memory of the computer system 500, an input from the system bus, and an input from the general purpose registers used by the arithmetic pipelines. The output of MUX 701 is coupled to and clocked into register 702. Register 702 is also coupled to an input of control register file 707. Control register file 707 has three address ports: two read ports and one write port. Control register file 707 is coupled to receive an address from the main memory, via memory control (MC) 419, or the system bus interface 418 on its write address (WA) port. Control register file 707 is also coupled to receive two read address inputs from the output of MUX 706 and the instruction decoder on its two read ports RA1 and RA2 respectively. MUX 706 is coupled to receive an address from the main memory or the system bus interface 418 and the output of the AND gate logic 705.

Control register file 707 is also coupled to registers 703A and 703B. Register 703B is also coupled to receive an output from register 702, an output from PC logic 710, an output arithmetic operator 704 and the immediate sign extended. The immediate sign extended comprises a constant value which is encoded into an instruction (e.g., the 4 in the instruction $CR_n = CR_n + 4$). Register 703A is also coupled to receive the output of arithmetic operator 704 and an output from register 702. The data in control register file 707 is also read out by the main memory via memory controller (MC) 419 or devices on the system bus 100 using one of the data ports. The inputs of arithmetic operator 704 are coupled to receive the operands from the registers 703A and 703B for execution. An output of arithmetic operator 704 is coupled to PC logic 710.

Refer still to FIG. 12. The condition bits are output from arithmetic operator 704 to the condition bit field of flag register 708. The flags from all the other pipelines are also inputted and stored into the flag register 708. In the currently preferred embodiment, flag register 708 comprises flags from the memory controller (MC) 419, the arithmetic pipelines (ALU1, ALU2) 38 and 40, the pointer pipelines (PT1 and PT2) 34a and 34b and the condition bits from arithmetic operator 704. All of the flags from all the pipelines and the condition bits are coupled to be received by MUX 709 which outputs the proper flag for the control flow decision according to the instruction being executed. The condition bits from flag register 708 are also coupled to one of the inputs of AND gate logic 705. The other input to AND gate logic 705 is coupled to the condition mask bits of the instruction.

The control register file 707 is loaded from MUX 701 via register 702. In the currently preferred embodiment, control register file 707 comprises sixteen 16-bit registers. Control register file 707 can be loaded from the system bus and communicate with the host CPU main memory 512 through the system bus 100. Using the system bus inputs, the CPU 510 or other devices are able to write into the control registers. In the currently preferred embodiment, the CPU 510 has control over all internal and external memory of the PR engine 525 and can be utilized to initialize the control flow pipeline. In the present invention, the CPU 510 initializes the control register file 707 with predetermined values at certain times during the operation of the computer system 500. For instance, when the computer system has been shut down or placed into a suspended state from which the computer system must resume, the CPU 510 initializes the control registers with their last known executable state or predetermined values upon power up.

Control registers 707 can also be loaded from main memory. In the currently preferred embodiment, control registers 707 are loaded from the main memory 512 of the computer system 500 when the PR engine 525 and/or the remainder of the computer system 500 is returning from a suspended state or a powered down state. Control registers 707 can be loaded with the values in the general purpose registers. In this manner, the control pipeline can also operate on data produced by an arithmetic pipeline. In the currently preferred embodiment, the control registers 707 are loaded from the general purpose when a control operation comprises either a loop maintenance or control flow operation which is too sophisticated for the control flow pipeline, such that the arithmetic unit must complete the operation during initialization and the transfer the results to control register file 707 for the control flow pipeline to continue. Control registers 707 can also be loaded from the memory controller 419.

The control flow pipeline 454 operates on the decoded instruction from the instruction buffer 453 and the instruction decoder 456. The instruction decoder 456 obtains the control opcode and indicates what operation is to be performed to arithmetic operator 704. The results of the decoding also indicate to registers 703A and 703B which operands to obtain for arithmetic operator 704. Registers 703A and 703B latch the data from its source. In the currently preferred embodiment, the data can be latched from the control registers in control register file 707, from register 702, from the program counter, from the output of arithmetic operator 704 and from the instruction itself as a constant (e.g., from the immediate sign extended). Thus, the decoding of the instruction indicates the location from where the operands of the operation should be read.

Note that for read operations to the control registers in control register file 707, the data is accessed through addresses presented on read ports RA1 and RA2. In the currently preferred embodiment of the present invention, the read addresses are either encoded in the last three fields of the instruction, is an address generated as a result of the execution of a case instruction, via MUX 706 and AND gate 705 or is from an off-chip source. Addresses encoded into the control instruction to access control registers are received by read port RA2. In the currently preferred embodiment, data is read out to the main memory 512 or system bus 100 using an address input at read port RA1, via MUX 706. Likewise, data is written into the control registers using an address on the write address (WA) port of the control register file 707.

Referring still to FIG. 12, arithmetic operator 704 performs the adding and subtracting operations dictated by the decoded instruction and writes the results according to the description in the instruction. The results generated by arithmetic operator 704 may be written to PC logic 710, either of registers 703A or 703B, or to a particular control register, via MUX 701 and register 702, as specified in the instruction. If the resulting data is to be written to a register in control register file 707, the control register is accessed according to address (n) from the control instruction on the WA port of control register file 707.

The execution of some operations by arithmetic operator 704 produces condition bits in the present invention. In the currently preferred embodiment, four condition bits are generated. The condition bits are output to flag register 708, which also receives the other flags from the remainder of the computer system 500. As the flags and condition bits are utilized in determining whether a branch should be taken, the decoded instruction indicates to MUX 709 which bit or bits from flag register 708 is to be examined. In response, MUX 709 outputs the flag or condition bits designated in the instruction to resolve the control flow decision. The bit value is sent to the program counter, along with any data generated and output from arithmetic operator 704.

The control unit 454 of the execution unit 430 includes the program counter for the PR engine 525 of the computer system 500 of the present invention. Using the data and any pertinent flag, the control unit is able to keep track of the program counter. In the currently preferred embodiment, the program counter is updated for each clock cycle. Also in the currently preferred embodiment, the control registers in control register file 707 can be used for providing a displacement in the pattern recognition program, wherein the current program counter can be added to a value in a particular control register using arithmetic operator 704 to obtain a new address (i.e., the new location of the program counter). The control registers can also contain an absolute address of where a program is to branch. One example of the use of an absolute address is in the execution of a case instruction where a list of addresses, which are labeled in the control registers, determine the location of the program counter.

Figure 13:
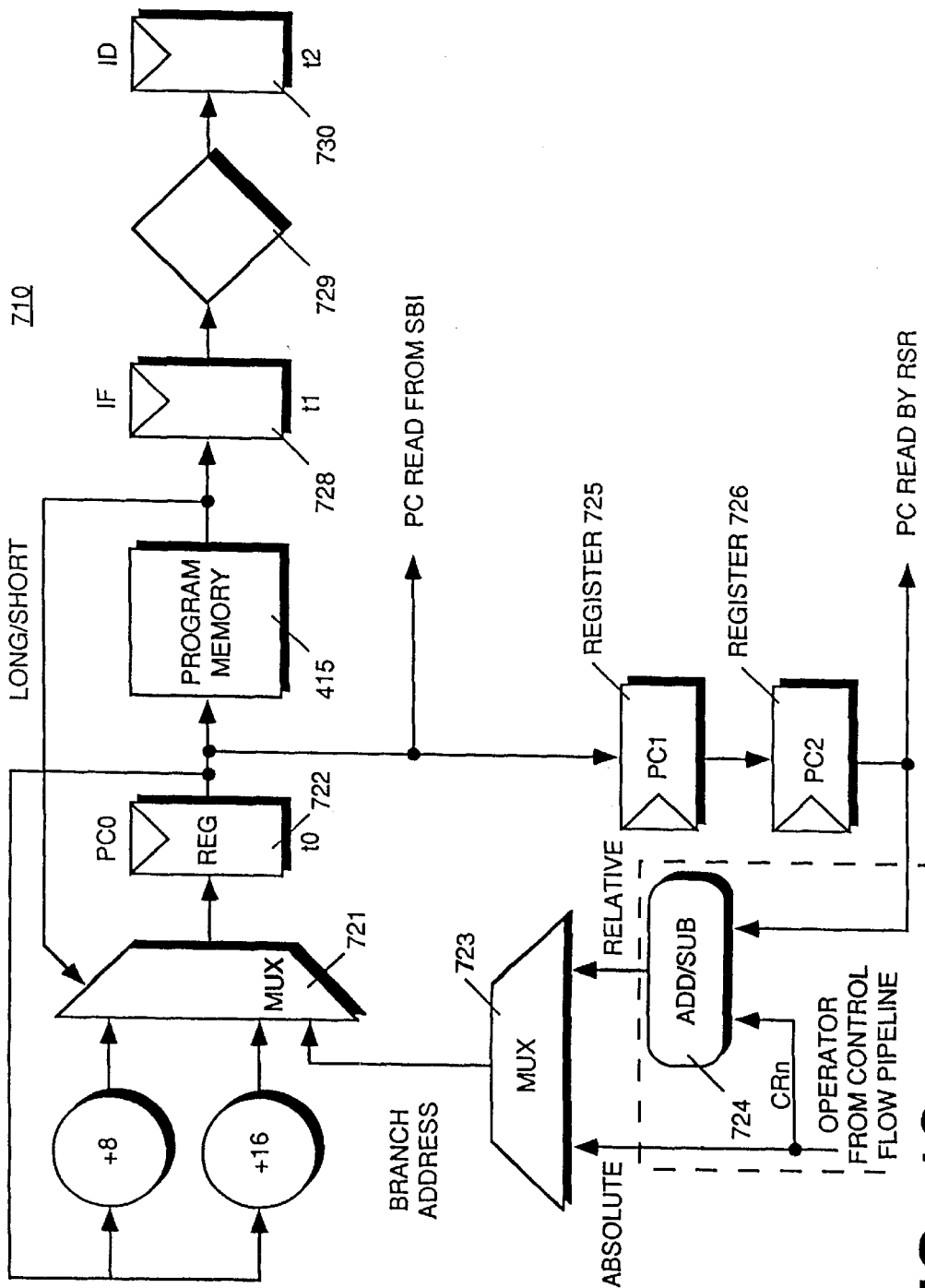
FIG. 13 is a detailed diagram of the program counter logic of the present invention.

In the currently preferred embodiment, the PC logic 710 is shown in more detail in FIG. 13. Referring to FIG. 13, MUXs 721 and 723, PC0 register 722, PC1 register 725, PC2 register 726, instruction fetch (IF) register 728, instruction decode (ID) register 730, program memory 415 and decoding stage 729 are shown. MUX 721 is coupled to receive a +8 input address, a +16 input address and the branch address output from MUX 723. The output of MUX 721 is coupled to PC0 register 722. PC0 register 722 is the program counter and is coupled to program memory 415, PC1 register 725, and can be read by the system bus interface via line 621. The value of PC0 register 722 is also fed back and increased by 8 or 16. The newly computed address is then input into MUX 721. The output of program memory 415 is coupled to IF register 728 and an indication as to whether the instruction fetched was long or short is also looped back, such that MUX 721 can select the proper address for the program counter (which is read into PC0 register 722). Note that the instruction in IF register 728 corresponds to the address in PC1 register 725.

The IF register 728 is also coupled to decoding stage 729. The results output from decoding stage 729 is coupled to the ID register 730. The output of ID register 730 is sent for execution. The PC1 register 725 is coupled to PC2 register 726. Note that the address in PC2 register 726 corresponds to the instruction in ID registers 730. The output of PC2 register 726 is coupled to the arithmetic operator of the control flow pipeline. The arithmetic operator of the control flow pipeline is also coupled to receive an operator from the control registers (CRm). MUX 723 supplies the branch address to MUX 721. MUX 723 receives both the absolute and relative address outputs from the control flow pipeline and outputs either depending on the instruction. For instance, if a case instruction is being executed, MUX 723 would select the absolute address as the input into MUX 721.

The PC logic 710 of the PR engine 525 of the present invention shown in FIG. 13 illustrates the relationship between the program counter and the control flow 454 pipeline. The program counter in PC0 register 722 is used to obtain the new instruction from program memory 415. In the currently preferred embodiment, the writing of an address into PC0 register 722 triggers the execution unit of the PR engine 525 to start the execution of the program located at the address written into PC0 register 722. While this occurs, the previous instruction as indicated by the address in PC1 register 725 is in the IF register 728 and awaits decoding. Also when the program counter PC0 register 722 is loaded, the instruction two stages ahead of the current PC, as indicated by the address in PC2 register 726, is in the ID register 730.

The program counter is loaded according to the previous instruction. If the previous instructions were a branch instruction, then MUX 721 would supply the branch address to PC0 register 722. Note that the target of a branch may be the address of a long instruction, the addresses of the first instruction of a pair of short instructions, or the address of a second instruction of a pair of short instructions. Whether the branch address supplied is an absolute address, such as one generated as a result of the execution of a case instruction, or an address relative the address of the previous PC depends on the results of the execution. Note that the address in PC2 register 726 is used for computations of branch addresses in the case of relative branches. If the previous instruction was not a branch instruction, then the long/short indication output from program memory 415 indicates whether the last instruction fetch was a long or short format instruction. Depending on the indication, the program counter is incremented by the proper address displacement (i.e., +8 or +16), such that the program counter in PC0 register 722 is updated. Note that in the present invention there are three copies of the program counter corresponding to the first three stages of the pipeline (i.e., PC0, PC1 and PC2). In the currently preferred embodiment, all of the program counters are byte addresses that are 16 bits wide.

G. Memory to Memory Transfer Unit 416

The memory to memory transfer block 416 of the PR engine 525 of the present invention is an autonomous unit which can execute block memory moves of data within the PR engine address space specified in Appendix B. That is, this block may be set up in advance by the CPU 510 or the execution unit 430 to move a continuous block or blocks of data from one memory location to another without requiring further processing expenditures by either execution unit. The PR engine 525 uses this mechanism as one way to transfer pattern or result information between the on-chip memories (i.e., data memory 30 and 32 and the program memory) and the off-chip private memory 615. The memory to memory transfer block may also transfer information between different locations of the on-chip memories and different locations between the off-chip memories but these operations require more than one memory to memory transfer operation. During execution of a program, for example a pattern recognition program, memory to memory transfers via block 416 exchange data with the program memory 415, and the two data memories 30 and 32. There are two separate memory transfer channels within block 416 and only one of the two channels is active at any time to transfer data between the internal and external memories. Each channel has separate registers but each channel shares the same associated operators for the memory to memory transfer operation. Since both channels share the same operators, only one channel is actively performing a memory to memory transfer operation at any time. When a channel is not active (i.e., transferring information) nor pending, it is called free. Memory transfer channels are initialized and activated by the execution unit 430 of the pattern recognition engine or may be activated by the system CPU 510.

Figure 14:
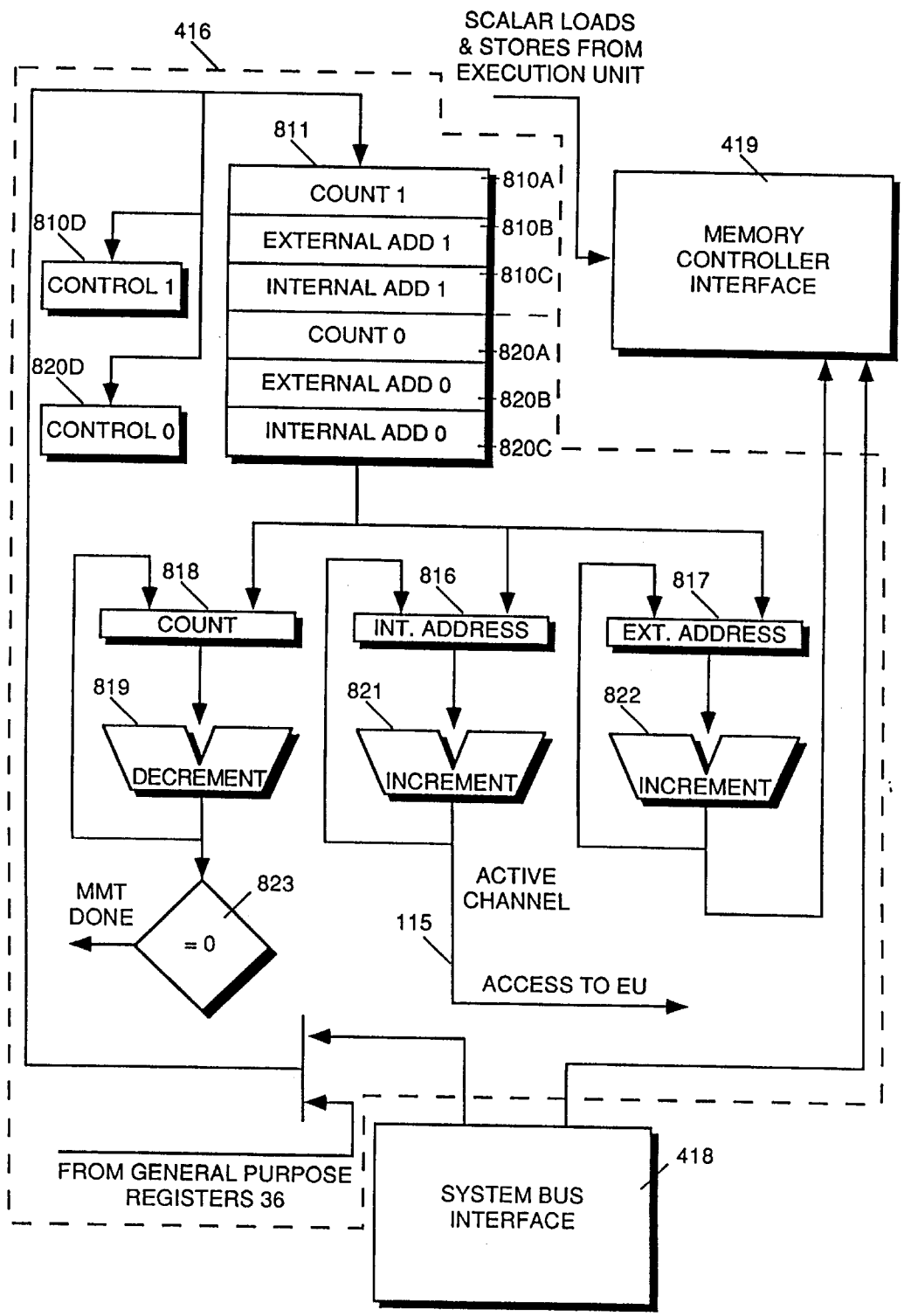
FIG. 14 is a diagram of the internal logical functions of the memory to memory transfer unit and channel parameters of the present invention.

Refer to FIG. 14 which illustrates a block diagram of the two memory transfer channels of the memory to memory transfer block 416. Parameters of the two memory transfer channels are stored in a two ported RAM 811, which is organized as 8 words of 16 bits each although various different implementations would be within the scope of the present invention. Registers referenced from 810a to 810d are for channel1 and registers referenced from 820a to 820d are for channel0. There are three increment-decrement operators 818, 816, 817 associated with the channels, one 16-bit operator 818 the count, one 16-bit operator 816 for the internal address and one 32 bit operator 817 for the external address. The control words 810d and 820d are located outside the parameters RAM 811 since they are accessed one bit at a time and are only 5 bits wide. Internal addresses generated by memory to memory transfers are decoded and routed to the proper unit by an address decoder. Addresses corresponding to on-chip memory are sent to the execution unit 430 through a dedicated address bus in order to access the on-chip memories. External addresses of the off-chip memory are sent to the memory controller 419 for arbitration and interface. The memory to memory transfer block 419 has one dedicated address bus to send requests to the memory controller 419.

The priority of access to the external memory are as follows from highest to lowest: 1) access from the system bus 100 made by the host CPU 510; 2) scalar transfer from external load and store instruction executed by the execution unit 430; and 3) memory to memory transfers which is the lowest. This priority and arbitration is resolved by the memory controller 419.

The four parameters of FIG. 14 are described in more detail. The count registers 810a, 820a for each channel represent the number of 16-bit data to be moved by the memory to memory transfer operation. If the destination of the transfer is the program memory 415 then the count value must be a multiple of 5 16-bit words because the program memory is 80 bits wide. Both the internal and external addresses are part of the PR addressing space (see Appendix B) and must be word aligned. The internal address 810c and 820c for both channels is an address in the on-chip memories (such as memories 30, 32, or 415). The external address 810b and 820b is an address of the off-chip memory 615. In the case of a read memory to memory transfer operation, the on-chip memory block starting the internal address (810c or 820c) is read and transferred to the off-chip private memory 615 starting at the external address (810b or 820b). In the case of a write memory to memory transfer operation, data is moved from the off-chip memory 615 starting at the external address (810b or 820b) and written to the on-chip memory starting at the internal address (810c or 820c).

If the execution unit is halted (i.e., not active), the internal address may point in any memory, such as memory 30, 32 or the program memory 415. If the execution unit is not halted (i.e., active), the internal address must point in memory 30 or 32. The external address must indicate the external memory and must be word aligned. Memory 811 is a two ported RAM, one read and one write port. When memory to memory transfers are active, the read access of this memory is reserved for the memory to memory transfer logic to read parameters when it starts a transfer. The write access of the RAM is reserved for the execution unit 430 and the host CPU 510 to write parameters when initialized for a memory to memory transfer.

In order to activate a memory to memory transfer operation for a particular transfer channel of the present invention, the parameter information must be loaded into the memory 811. For example, selecting channel1, the internal 810c and external 810b addresses must be loaded by the execution unit 430 or the CPU 510 and the count value must be loaded into 810a. Lastly, the control word 810d is loaded into the control register for channel0. It is appreciated that the act of loading the control word into the associated register initiates the transfer operation for the indicated channel. It is appreciated that the CPU 510 communicates to the memory to memory transfer block 416 via the system bus interface 418.

Referring still to FIG. 14, when a memory to memory transfer operation is started by the present invention, the selected channel parameters (i.e., the channel having its control register just written into) are read out of the parameter RAM 811 and stored into the working registers only if the channel is free; if the channel is busy the transfer will be pending. If channel1 is selected then the value from 810a is placed into 818, the value from 810b is placed into 817 and the value of 810c is placed into 816. If channel0 is selected then the value from 820a is placed into 818, the value from 820b is placed into 817 and the value of 820c is placed into 816. Register 818 is the working count register, register 816 is the working internal address register and register 817 is the working external address register. During a transfer operation, the registers stored in RAM 811 are not modified, only the working registers are updated and contain the current addresses and remaining counts. The memory to memory transfer logic does not update the current transfer parameters located in the RAM 811. The active transfer parameters, as discussed above, are located within the working registers which can be read from the system bus 100 when no channel is active. It is appreciated that the control words 810d and 820d can be written by the CPU 510 or execution unit 430 at any time but only read while the channels are not active.

The memory to memory transfer logic 416, upon activation of a channel, writes the parameter information for that channel into the working registers 818, 816, and 817. Upon the activation of a channel, the memory to memory transfer logic will perform all of the necessary functions (i.e., sequencing and generation of memory accessing requests to the proper destination and source) to perform the information transfer. To this extent, the memory to memory transfer block 416 is autonomous from the execution unit in that it does not require any more instruction or processing power from the execution unit. The memory to memory transfer logic then outputs the external address 817 to the memory controller and depending whether the transfer is a read or write will request a read or a write operation from the off-chip memory 615. This request will be interfaced to the off-chip memory and arbitrated via the memory controller 419. Simultaneously, the internal address 816 will be output to the execution unit 419 which contains the program memory 415 and the data memories 30 and 32. Recall that all of the on-chip memories contain accessing logic from the memory to memory transfer bus 115. Depending on the selection, read/write, of the control word, the execution unit (multiported on-chip memories) will be given a memory read or a memory write operation. The memory to memory transfer logic will decrement the count placed in the count register 818 by the decrement operator 819. The internal address 816 will be incremented by the increment operator 821 and lastly the external address register 817 will be incremented by the increment operator 822. According to the above, all of the working registers 818, 816 and 817 will be updated by the memory to memory transfer block 416. As can be seen by the above, logic of the present invention provides an independent sequencer able to generate sequential source and destination addresses and able to generate data requests to internal and external memory controllers.

Once activated, the memory to memory transfer logic 416 of the present invention will continue to repeat the above steps until the count 818 reaches zero. Then the processing of the block transfer will complete as indicated by the zero block 823. At this point, the memory to memory transfer done flag is set, (see Appendix B and Appendix C for addresses of the flag for each transfer channel). It is appreciated that since the original parameters of a particular channel are not modified, i.e., only the working parameters are modified, the channel does not require reprogramming of the original parameter to repeat the transfer a sequential time. That is, if the same transfer is requested by the same channel a second time after a prior transfer is compete, only the control word need be rewritten. The execution unit or CPU 510 does not need to reload all of the other channel parameters again. This is advantageous because it increases pattern recognition efficiency by eliminating a program step of reloading parameters.

The following Table V illustrates the functions supported by the memory to memory transfer block 416 as defined within the control words stored in 810d and 820d for channel1 and channel0 respectively.

TABLE V

| Bits | Name | Comment | Value After Reset | Value After Control Word is Written | Value After Abort Command |
|---|---|---|---|---|---|
| 0 | R/W | 0: Read<br>1: Write | 0 | R/W | R/W |
| 1 | Link | 0: no Link<br>1: start next channel as soon as this one completes | 0 | Link | Link |
| 2 | Abort | 0: Keep going<br>1: Abort | 0 | 0 | 1 |
| 4–3 | MMT<br>Memory to<br>Memroy<br>Transfer | 00: Inactive<br>01: Active<br>10: Pending<br>11: Aborted | 00 | 01: if other MMT of the pair is not active<br>10: if other MMT of the pair is active | 11 |
| 15–5 | | Reserved | | | |

The first bit of the control word indicates whether the memory to memory transfer (MMT) operation is to be a read operation wherein information is read from the internal memory and stored off-chip or if the operation is a write operation wherein information is written to the internal memory from the off-chip memory. The Link bit indicates whether or not the next channel will perform a sequential memory to memory transfer operation upon the completion of the first transfer. It is possible to link sequential transfer operations together (i.e., when transferring information off-chip to both memories 30 and 32 or transferring information from these memories to an external source, among other examples). The abort bit allows the CPU 510 or execution unit 430 to abort a memory to memory transfer operation. Setting this bit to 1 aborts an active transfer and cancels a transfer which is in the pending state. If a transfer is aborted, the link bit is ignored.

Referring still to Table V, the status of a memory transfer is indicated by bits 4 and 3 of the control word of the present invention. State 00 is the inactive state, this typically indicates the end of a transfer operation for a particular channel. State 01 is the active state and a channel is in this state when the memory transfers are actually started. Writing the control word of a channel puts this channel in the active state if the other channel of the pair is not already active. State 10 is the pending state and a channel is in this state, if when it is activated, the other channel of the pair is already active. If the other channel of a pair is already active, the second channel must wait on completion of the first channel before it can start its transfer of data; while waiting this channel is pending. Lastly, state 11 is the aborted state. A channel whose transfer is aborted because it receives an abort command or because it has a parity error or an address range error will end in this state. When a control word, such as 810d or 820d, is written by the host CPU 510 or the execution unit 430 only bits 0, 1 and 2 are written. The status bits 3 and 4 are read only for the host CPU and for the execution unit, these bits can only be written by the memory to memory transfer logic.

Figure 15:
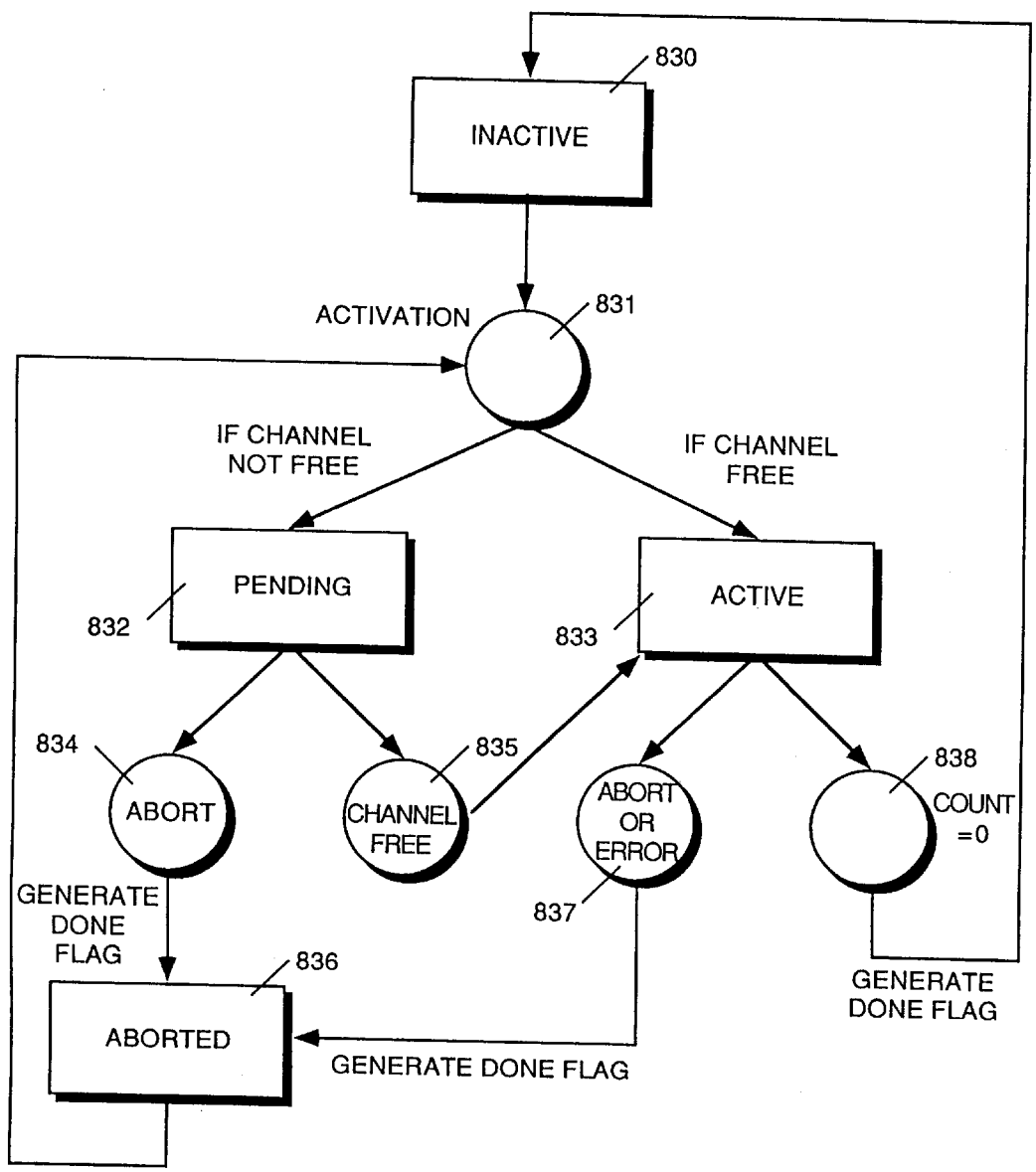
FIG. 15 is a state and event diagram illustrating the states and events of a memory transfer channel of the present invention.

FIG. 15 illustrates a flow chart of the major states and events executed by each channel of the memory to memory transfer block 416 of the PR engine 525 of the present invention. At state 830 the current channel, either channel0 or channel1, is inactive. The current channel may be activated at event 831 by a write of its control word, or by the count of the other channel reaching zero and the link bit set to 1 of the other channel's control word. Since channels are activated by writing the control word, the control must be the last parameter of a memory transfer to be written within the present invention. When the control word of a channel is written, the corresponding done signal in the flag register is reset to zero (see Appendix B and Appendix C for flag locations). Upon event 831 occurring, the memory to memory transfer channel will go to the pending state 832 if the channel is not free, that is, if the other channel is active. If the other channel is not active, then the current channel will flow to the active state 833 where the current channel will begin transfer operations and data is moved. If an abort event 837 is generated by the execution unit 430 or by the CPU 510, then the aborted state 836 will be entered and a done flag will be generated by the current channel. This channel will remain in the aborted state unit an activation event 831 is encountered.

If not aborted by 837, the current channel will remain processing the memory to memory transfer, and will update the working registers until the count register 818 becomes zero. At this event 838, the current channel will generate a done flag, indicate channel free information for the other channel and return to the inactive state. If the link bit of the active transfer is set to 1, the other channel is activated as soon as the active transfer is done. When in the pending state 832, if an abort event 832 is encountered then the current channel will generate a done flag and return to the abort state 836 without having transferred any data. At this time any link information will be ignored. At the pending state 832, if the current channel becomes free, via event 835, then the current channel will flow from the pending state to the active state 833 and the above discussions apply. It is appreciated that if the link bit of the aborted transfer is set to 1, it is ignored and the second transfer is not started. When an active transfer is aborted, then channel free information is generated for the other transfer channel to be activated if it is pending. If the transfer is pending when it receives the abort command the status is changed from pending to aborted.

Data returning from the external memory 615 have the highest priority in the data memories 30 and 32 and program memory 415. If data fetched by a transfer channel operation is creating conflict of access in one of these internal memories, between the memory transfer block 416 and the execution unit 430, the execution unit will temporarily stall. However, to prevent the execution unit from stalling for too long a period of time when a conflict occurs, the execution unit 430 requests the channel to insert an empty slot in its pipeline of requests to external memory, for the execution unit to perform the write operation in memory 30, memory 32 and resume execution of the program. When a channel is reading memory 30 or 32 it has lower priory over the execution unit 430. It must wait on the execution unit 430 to make the data available before sending the write request to the external memory. It is appreciated that with regard to conflicts between memory read operations from the external memory and read operations from the execution unit 430, the MMT transfer block 416 takes low priority with reference to the execution unit of the PR engine 525. This is the case so that the MMT block and the execution unit 430 maintain parallelism in operation. However, with respect to conflicts between write operations to external memory locations, the MMT block takes priority over the execution unit and will act to stall the execution units as discussed above during conflicts. So that the execution units 430 do not stall for too long a period, requests are given to allow the MMT block to delay for a transfer cycle and allow the execution unit 430 to operate.

The memory to memory transfer block 416, as described above may be utilized to transfer two non contiguous blocks of data, one channel can be used for each block. Both channels can be initialized and started by writing their control words. Waiting on the done flag of the channel which is started last is equivalent to waiting on both memory to memory transfer done flags. Another use of the above memory transfer features is if both the host CPU 510 and the execution unit 430 need to transfer data between the on-chip memory and the off-chip memory. One way to avoid access conflicts the two channels between the host CPU 510 and the execution unit 430 is to dedicate one channel to the execution unit and one channel to the CPU 510. As long as the link bits are both 0, the two channels are totally independent, but only one channel is active at a time.

Double Buffering the Data Memories and the Off-chip Memory

Figure 16:
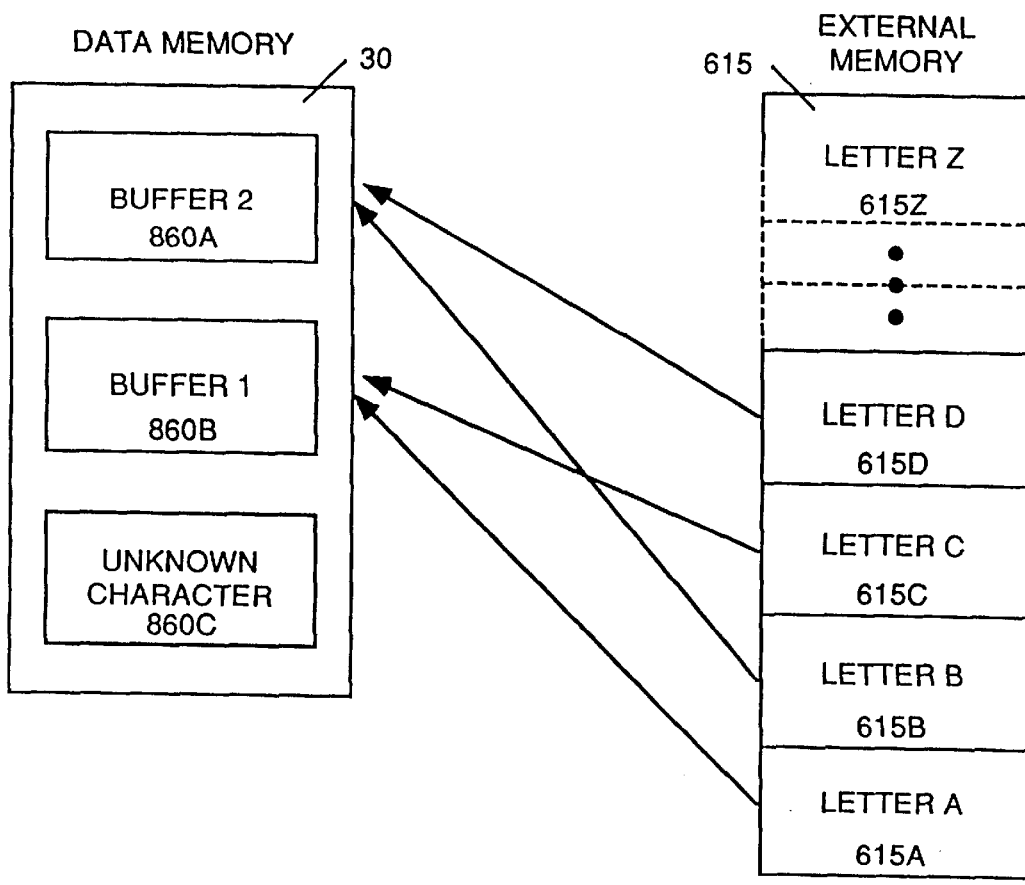
FIG. 16 is a diagram illustrating a double buffering technique that can be employed by the present invention.

The following discussion illustrates how the memory to memory transfer functions can be utilized within the PR engine 525 of the present invention to perform double buffering operations between data memory 30 (used with the distance arithmetic pipeline) and the off-chip private memory 615 that contains the reference patterns for comparison. It is appreciated that while the below discussion refers to memory 30, this discussion applies equally well to memory 32 in that information from on-chip 32 may be doubled buffered between external memory 615. Refer to FIG. 16. Recall that memory 30 may be utilized by the distance arithmetic pipeline 38 for containing data representing an unknown pattern form comparison and also used for containing data representing one of the reference patterns for comparison. The distance arithmetic pipeline 38, under direction of a program stored within program memory 415, will then compare, point by point, each point of the unknown pattern against each point of the known reference pattern. The present invention advantageously creates three buffers, two buffers referenced 860a and 860b, within the memory 30 for receiving reference pattern data and another, third, buffer 860c for holding the input unknown pattern.

Double buffering between the external memory 615 and the on-chip memories is particularly effective within the present invention due to the multiported nature of the on-chip data memories 30 and 32. Recall that memories 30 and 32 have at least two read address ports (30d and 30c) and two read data ports (35 and 44) so that two operands can be accessed by each arithmetic pipeline per instruction. However, each of the memories 30 and 32 also contains an additional and separate write address port (30a) and separate write data port (30b) so that write operations may be performed in conjunction with read operations. In summary, write operations (i.e., memory to memory transfers into the data memories) can occur in parallel with read operations (i.e., accessing of operands and arithmetic operations) within instruction cycles. In this way double buffering may be accomplished by the preferred embodiment of the present invention.

In operation, the present invention loads one of the buffers 860a, 860b with a known reference pattern while the other of the buffers is actively being used by the arithmetic pipeline for comparison against the unknown pattern. Once the comparison step is complete the buffers switch tasks. This is done so that no additional time is consumed for the load operation. In so doing, the present invention offers an efficient and powerful method of memory transfer and comparison processing.

For example, with reference to FIG. 16, an unknown handwriting pattern may be loaded into the buffer 860c by the host CPU 510 or by the execution unit 430 of the PR engine 525. Next a pattern representing the letter "a" may be loaded into buffer 860b by using channel0 of memory to memory transfer block 416 and: 1) setting the internal address parameter 820c to the start address of buffer 860b; 2) setting the count parameter 820a to the number of points of the known pattern "a"; and 3) setting the start address of the location of the known pattern within buffer 615a of private memory 615. A write control word is then written into control word 820a to start the transfer.

Then, while the arithmetic pipeline 38 is performing a comparison of the patterns in buffers 860b and 860c, channel1 may be setup to buffer the reference pattern for letter "b" into buffer 860a using the memory to memory transfer block 416 and: 1) setting the internal address parameter 810c to the start address of buffer 860a; 2) setting the count parameter 810a to the number of points of the known pattern "b"; and 3) setting the start address of the location of the known pattern within buffer 615b of private memory 615. A write control word is then written into control word 810a to start the transfer. The transfer will then occur simultaneously with the comparison functions of the arithmetic pipeline 38 and buffers 860b and 860c.

Next, the arithmetic pipeline 38 is directed, by programming logic within the program memory, to compare the buffers 860a and 860c to compare the letter "b" against the unknown pattern. While this is occurring, the present invention will be loading the pattern for letter "c" into buffer 860b. The internal address parameter 820c for channel0 is already set to the start address of buffer 860b from the prior operation. The count parameter 820a is already set to the number of points of the known pattern, because they are all the same typically. Only the start address of the location of the known pattern within buffer 615c of private memory 615 need be loaded. A write control word is then written into control word 820a to start the transfer. Therefore, upon subsequent memory to memory transfers, fewer load instructions need be given because some channel parameters can be reused. Again, because the working registers 818, 816, 817 are updated, and not the channel parameters, the present invention may advantageously perform the above short cut. At the completion of the comparison operation between buffers 860a and 860c, the present invention then utilizes channel1 to load the pattern for letter "d" while performing a comparison against buffers 860c and 860b. This transfer is accomplished by: 1) loading the external address of 810b as the start address of buffer 615d and then writing a write control word into buffer 810d.

It is appreciated that the above double buffering system may be used to bring in all of the reference pattern patterns, one at a time, into the memory 30 buffers while at the same time comparing the pattern data via arithmetic pipeline 38. Each of the two transfer channels is assigned a particular buffer within memory 30. Here, channel0 was assigned to buffer 860b and channel1 assigned to buffer 860a. It is appreciated that since the channel parameters are not directly updated (i.e., the working copy is updated) the present invention does not need to reload these values upon each transfer operation when duplicates are desired, thus saving processing time.

It is also appreciated that the memory to memory transfer block 416 may be utilized for these memory transfers without consuming processing power from the execution unit 430 of the present invention. The double buffering technique described above allows memory transfers of the prototype library 615 to occur in parallel with arithmetic pipeline processing of the pattern data, thus further reducing overall pattern recognition time.

VI. Specialized Instructions within the Present Invention

A. The Case Instruction

The case instruction is a special control flow instruction within the present invention which, in response to a set of predetermined conditions, allows a program to branch to a selection of addresses. For example, if either condition 1, 2, 3, or 4 is met, the program branches to either address 1, address 2, address 3 or address 4, respectively.

The present invention uses condition bits produced within the control flow pipeline to facilitate execution of the case instruction. By using condition bits, the present invention PR engine is able to execute a case instruction in one cycle. In the currently preferred embodiment, the condition bits are flags. In the currently preferred embodiment, four condition bits are produced by the control flow pipeline. The condition bits can be used individually, to test a loop counter for example, or used in groups to generate state numbers. The state numbers represent the different labels of a case statement.

An example of the use of a case instruction can be illustrated from the four conditions depicted below:

Case A: X≧0 and Y<0

Case B: X<0 and Y≧0

Case C: X≧0 and Y≧0

Case D: X<0 and Y<0

Only two condition bits are required in the example above:

Cond0=X<0

Cond1=Y≧0

Table VI below illustrates condition bit values for the example.

TABLE VI

| Case Number | COND1 | COND0 | Case Label |
|---|---|---|---|
| 0 | 0 | 0 | A |
| 1 | 0 | 1 | D |
| 2 | 1 | 0 | C |
| 3 | 1 | 1 | B |

The states of condition bits COND1 and COND0 define a register number in the control register. To implement the case instruction, the control registers must be initialized such that control register CR0 contains the address corresponding to Label A, control register CR1 contains the address corresponding to Label D, control register CR2 contains the address corresponding to Label C, and control register CR3 contains the address corresponding to Label B.

Control registers CR0–CR3 are initialized outside of the portion of the program encompassing the case instructions (i.e., the outer loop). The condition bits COND0 and COND1 need to be updated by the programmer every time X or Y changes value. A single case (i.e., COND1, COND0) instruction is capable of branching to the correct code (i.e., address) after each iteration depending on the new value of X and Y. Therefore, in the present invention, conditions bits are used to define the separate states which may result from execution. Then the states are mapped with a label (e.g. A, B, C, D, etc.). A number is assigned to each label. In the present invention, the number depicting each state indicates a distinct control register number.

At the beginning of the loop, the control registers are set up with all of the different labels, such that the initialization is performed only once. In this manner, the addresses associated with the available branching locations within the case instruction do not have to be encoded in the instructions. In the currently preferred embodiment, the control pipeline uses conditions to generate a number corresponding to a control register. The control register that corresponds to the state of the conditions is read to obtain the address of the target, which is subsequently stored into the program counter in the control pipeline, such that a branch occurs to that address. In the currently preferred embodiment, each instruction is capable of utilizing four condition bits. Therefore, up to sixteen labels can be associated with one case instruction. In this manner, in the present invention, a conditional jump can be set up to branch to sixteen separate locations upon the occurrence of sixteen distinct conditions or sets of conditions.

It should be noted that the condition bits can be generated by a program or can be loaded by a value of any flag in the processor. Thus, the condition bits can be loaded with any flag generated in the co-processor, such that any flag can be used in conjunction with the case instruction. A case instruction removes the need for multiple conditional branches or multi-branch code. Using condition bits allows the present invention to implement a case instruction in which each condition is associated with a different address. By not having the addresses encoded within the code, the time to load each of the separate and distinct addresses is also avoided. In this manner, a case instruction can be executed in one cycle.

The Execution of a Case Instruction

As discussed above, prior to the execution of a case instruction, the control registers in the control flow pipeline are initialized with the addresses of the different pieces of code associated with each possible state tested in a case statement. In other words, a label corresponding to a state number is associated with one of the control registers. As the program is executed, condition bits are set by the operator of the control flow pipeline. These condition bits are stored in the flag register. In one embodiment, a condition decoder could be used to decode the condition bits in a manner well-known in the art. Depending on the state defined by the condition bits at the time a case instruction is executed, a control register is chosen which outputs the target address (i.e., the branch address) for the program counter.

An example using a case instruction is given below. The example shown is in high level code:

```
If (a<b) and (a<c) then d1 = (b-a) + (c-a)      /* case 1 */
else if (b<a) and (b<c) then d2 = (a-b) + (c-b) /* case 2 */
else if (c<a) and (c<b) then d3 = (a-c) + (b-c) /* case 3 */
```

Each of the condition bits is associated with an equality. A truth table for the inequality is shown below.

|  | Cond 2<br>a<b | Cond 1<br>a<c | Cond 0<br>b<c |
|---|---|---|---|
| Case 1: | 1 | 1 | 0 or 1 |
| Case 2: | 0 | 0 or 1 | 1 |
| Case 3: | 0 or 1 | 0 | 0 |

Each of the separate cases is then associated with a control flow register. For instance:

| State Number | Case Number |
|---|---|
| 6 and 7 | Case 1 |
| 1 and 3 | Case 2 |
| 0 and 4 | Case 3 |

An example of the pseudo code for the example is given below. Initially, the control registers are initialized with the addresses of the different pieces of code associated with each state number:

CR6=&Label__Case1;

CR7=&Label__Case1;

CR1=&Label__Case2;

CR3=&Label__Case2;

CR0=&Label__Case3;

CR4=&Label__Case3;

Loop__address:
    /* read new value of a, b and c in memory */
    get (a, b, c)

```
        /* evaluation of the condition bits */
        Cond 0 = (a<b);
        Cond 1 = (a<c);
        Cond 2 = (b<c);
        /* use the case instruction to branch to the right code
directly) */
        Case (cond0, cond1, cond2);
        /* cod for the different cases */
Label__Case1: compute d1;
        loop over n;
Label__Case2: compute d2;
        loop over n;
Label__Case3: computer d3;
        loop over n;
```

Upon the execution of the instructions: (Cond 0=(a<b); Cond 1=(a<c); Cond 2=(b<c); condition bits are set and stored in the flag register. When a case instruction is executed, AND gate 705 performs a logical AND between the condition bits and the condition bit mask, which is encoded in the case instruction. The condition bit mask is set according to the instruction to provide the requisite condition bits to address the control register. In the currently preferred embodiment, the output of AND gate 705 is 4 bits. After ANDing the condition bit mask and the condition bits, control register file 707 is accessed, via read port RA1, with the bits from AND gate 705. In other words, the state numbers and the control registers are related, such that they may be accessed. The data, which corresponds to the address for the branch, is latched and passed through arithmetic operator to PC logic 710 in order to update the program counter. In this manner, the case instruction is executed in one cycle.

Note that although the currently preferred embodiment uses four condition bits and sixteen control flow registers for holding addresses, any number of condition bits and control registers may be used. Also note that the addresses of the different pieces of code to be executed could be stored in a general purpose register file or on-chip memory, instead of the control registers.

B. Manhattan Distance Instruction of the Present Invention

The Manhattan distance function is useful in pattern recognition processing. The arithmetic pipelines of the present invention can execute a specialized Manhattan distance instruction that performs subtraction between two operands and selects the absolute value of the result within a single instruction cycle. This instruction is useful within DTW and HMM procedures and therefore circuitry was placed into each arithmetic pipeline in order to accomplish, in high speed, this instruction. The Manhattan distance transfer instruction is called "absolute value of a difference" and is found within Appendix A as opcode number 1BH.

There are two operators within the operator unit 70 of each arithmetic pipeline that can perform subtraction. Referring to FIG. 8, the adder/subtractor 70b and the ALU operator 70c may perform subtraction operations on the two sources 68 and 69. According to the present invention execution of a Manhattan distance function, is accomplished by first loading into the two sources 68 and 69 the values of the two operands involved in the transfer function. Next, the ALU operator 70c performs a subtraction between the sources and at the same time the operator 70b performs a subtraction between the two sources in a different other than that specified by the ALU operator 70c. In order words if ALU 70c subtracts source1 from source2 then operator 70b will subtract source2 from source1. The results of both operations are then fed to multiplexer 72.

Multiplexer 72 contains the required circuitry to determine when a Manhattan distance function is being executed (by analyzing the ALU opcode associated with the pertinent ALU instruction) and also contains logic to determine which of the two operator outputs (i.e., from operator 70b and 70c) is a negative result. The multiplexer 72 will then select the positive (or non-negative) result of the operator outputs and channel that result to the accumulator 74. In so doing, the absolute value and subtraction functions are executed by an arithmetic pipeline of the PR engine 525 of the present invention within a single instruction cycle in order to provide rapid calculation of this operation.

VII. Program Examples for Lower Level Procedures

A. Dynamic Time Warping Pattern Recognition Example

As discussed, the PR engine 525 of the present invention has been architected for DTW to take full advantage of all the available pipelines. The unknown and the reference patterns may be stored in the data memory 30. The reference library is stored in the private memory 615. The arithmetic pipeline 38 may be used to compute local distances between the points of the patterns stored within memory 30. Reference patterns are double buffered between memory 30 and external memory 615, for the next reference to be brought from the external memory via a memory to memory transfer during the comparison of the unknown with the current reference by arithmetic pipeline 38. Two columns of the results (lattice) are required at all times. They are stored in the data memory 32. The arithmetic pipeline 40 may be used to compute the best paths, and accumulate the results with the local distances. The pointer pipelines are used to keep track of addresses of the unknown and reference patterns stored within memory 30, and of the two working columns of results in memory 32. Of course, the control pipeline 454 is used to control the loop of the pattern recognition program stored in program memory 415.

The following program code of the present invention, modeled after the "C" program language, computes a lattice of points of size (MAXPOINTS+1)×(MAXPOINTS+1). It is supposed that memory 30 has been initialized (by the host CPU 510) with the series of points representing the unknown and the reference pattern. To this extent, the following code may be viewed as a detailed instruction sequence for flow block 404 or block 405 of FIG. 4. In this example, a point has three features: x, y, and z. Each feature is three bytes wide. It is appreciated that operations within the same line of the program code may be performed within one instruction cycle of the execution unit 430. It is further appreciated that although the following program code is applied to process handwriting patterns it could easily be extended to refer to voice recognition applications on voice patterns.

The below contents of the PR engine 525 are assigned the following functions and identities. Memory 30 is used to hold the unknown character and the current reference. Pointer usage in memory 30 (pointers should be initialized prior to code) is: Pt1 is the beginning of the reference; Pt2 is the running pointer to the reference; Pt3 is the x feature of the unknown; Pt4 is the y feature of the unknown; and Pt5 is the z feature of the unknown. Memory 32 holds the two columns of the results. Pointer usage in memory 32 (pointers should be initialized prior to code) is: Pt8 is start of buffer1; Pt9 is current column; Pt10 is start of buffer2; and Pt11 is previous column. General purpose register usage is: R1 is dx; R2 is dy; R3 is dz; and R4 is minimum and accumulator.

Control register usage is: CR1 is first column loop label; CR2 is outer loop label; CR3 is inner loop label; CR14 is column count; and CR15 is row count. It is appreciated that due to certain execution sequencing techniques within the present invention, two arithmetic pipeline instructions are allowed to execute following the indication of a conditional branch instruction before the branch instruction is actually performed. Therefore, these following instructions should be viewed as executing prior to the actual branch instruction, which branch instruction may be placed before the two instructions in the program code.

DTW Program of the Present Invention:

```
#define MAXPOINTS 39
/* use buffer2 to store first column */
Pt11=Pt10;
/* first point computation for x, y, z features */
R1 = |*Pt2 - *Pt3|, Pt2++;
R2 = |*Pt2 - *Pt4|, Pt2++, R4=R1;
R3 = |*Pt2 - *Pt5|, Pt2++, R4=Acc2 + R2;
*Pt11 = Acc2 + R3;
/* computation of the first column */
CR15 = MAXPOINTS;
CR1=&first_column;
first_column:
R1 = |*Pt2 - *Pt3|, Pt2++, CR15 --;
R2 = |*Pt2 - *Pt4|, Pt2++, R4=*Pt11+R1, Pt11+2, Branch(NC) CR1;
R3 = |*Pt2 - *Pt5|, Pt2++, R4 = Acc2 + R2;
*Pt11 = Acc2 + R3;
/* compute all of other columns */
/* reset Pt11 to beginning of the previous column,
        in buffer2 */
Pt11 = Pt10;
/* use buffer1 to store first current column */
Pt9 = Pt8;
/* init outer loop counter and branch addresses */
CR14 = MAXPOINTS;
CR2 = &outer_loop;
CR3 = &inner_loop;
/* init R5 used to compute new pointers */
R5 = 3;
outer_loop:
/* init inner loop counter */
CR15 = MAXPOINTS;
/* init unknown pointer to next set of points */
Pt3 = Pt3 + R5;
Pt4 = Pt4 + R5;
Pt5 = Pt5 + R5;
/* reset reference pointer to first point */
Pt2 = Pt1;
/* compute first point of the column */
R1 = |*Pt2 - *Pt3|, Pt2++
R2 = |*Pt2 - *Pt4|, Pt2++, R4 = *Pt11 + R1;
R3 = |*Pt2 - *Pt5|, Pt2++, R4 = Acc2 + R2;
*Pt9 = Acc2 + R3
/* compute all other ponits of the column */
/* note that the inner loop executes in only 5 cycles */
inner_loop:
R1 = |*Pt2 - *Pt3|,Pt3++, R4 = min(*Pt9,*Pt11), Pt11+=2;
R2 = |*Pt2 - *Pt3|,Pt3++, R4 = min(*Pt11,Acc2), Pt9+=2, CR15--;
R3 = |*Pt2 - *Pt3|,Pt3++, R4 = Acc2 + R1, Branch(ZC) CR3;
R4 = Acc2 + R2;
*Pt9 = Acc2 + R3;
/* swap current and previous column and loop for all cols */
Pt11 = Pt8, CR14--;
Pt9 = Pt10, Cond0=(CR14==0);
/* exchange pointers of buffers 1 and 2 */
Pt12 = Pt8, Branch(Cond0) CR2;
Pt8 = Pt10;
Pt10 = Pt12;
```

Used in conjunction with the above program sequence is a double buffering technique for loading the reference patterns into memory 30 and this involves a memory to memory transfer operation between the memory 30 and the private memory 615 over the memory bus 110. Also performed is a memory to memory transfer operation for transferring data between memory 32 (the best path memory) and the memory space of the CPU 510 over the system bus to 100.

B. Hidden Markov Models Pattern Recognition Example

HMM models are usually too large to fix in the on-chip data memories. A model for a given prototype reference is the set of distribution probabilities, for all features, in all states, and for all possible features values. These probabilities can be organized in vectors, per feature and per state, or per feature and per feature value. The latter is assumed in the program example to follow. Vectors are brought in the data memory 30 one set at a time, for computations of one column of the lattice. During the computation of a column, the next set of distribution probabilities is brought in memory 30 using a memory to memory transfer operation. Local probabilities are computed in the arithmetic pipeline 38 and the best paths are computed in the arithmetic pipeline 40. The transition probabilities are kept in memory 32. The two columns of temporary results, the previous column, and the current column are also stored in data memory 32. The pointer pipelines are used to keep track of addresses in the probability vectors in memory 30, the transition probabilities, and temporary results in memory 32. The control pipeline is used to manage the loop.

In the following "C" modeled program code these definitions are given. Memory 30 is used to hold the unknown character and the probability vectors for the current observation point. For memory 30, Pt1 is the distribution probability for feature x, and observation i, Pt2 is similar for feature y, and Pt3 is similar for feature z. Memory 32 is used to hold the two columns of results and the transitions probabilities. For memory 32, Pt8 is the beginning of buffer1, Pt9 is the current column, Pt10 is the beginning of buffer2, Pt11 is the previous column, Pt12 is the previous column, current state, Pt13 is the start of transition probabilities, and Pt14 is the running transition probabilities. The general purpose registers are defined such that R1 is the local probability and R4 is the maximum and accumulator. Of the control registers, CR1 is the first column loop label, CR2 is the outer loop label, CR3 is the inner loop label, CR14 is the column count, and CR15 is the row count.

HMM Program of the Present Invention:

```
#define MAXPOINTS 39
#define MAXSTATES 9
/* start memory to memory transfer to bring next set of
distribution probability vectors into memory 30 from external
memory 615 (code not shown) */
/* use buffer 2 to store first column */
Pt11 = Pt10;
Pt12 = Pt11;
Pt12 +=2;
/* first point computation */
R1 = *Pt1 + *Pt2, Pt1++;
R1 = Acc1 + *Pt3, Pt2++'
Pt3++, *Pt11 = R1;
/* computation of the first column */
CR15=MAXSTATES'
CR1 = &first_column;
first_column:
R1 = *Pt1 + *Pt2, Pt1++, R4=*Pt11 + *Pt14, Pt14++, CR15--;
R1 = Acc + *Pt3, Pt2++, Pt11 +2, Branch (ZC) CR1;
Pt3++; *Pt12 = Acc2 + R1, Pt12 +=2;
/* computation of other columns */
/* reset Pt11 to start of the previous column, in buffer2 */
Pt11 = Pt10;
/* use buffer1 to store first current column */
Pt9 = Pt8;
/* init output loop counter and branch addreses */
```

HMM Program of the Present Invention:

CR14 = MAXPOINTS;
CR2 = &outer_loop;
CR3 = &inner_loop;
/* init R6 to 2 to use as an index */
R6 = 2;
outer_loop:
/* init inner loop counter */
CR15 = MAXSTATES;
/* reset Pt14 to beginning of transition probability */
Pt14 = Pt13;
/* Check if memory to memory transfer is done, wait if not done, init distribution probability pointer to new set of vectors, start memory to memory transfer for next observation point, (this code not shown) */
/* compute first point of the column */
R1 = *Pt1 + *Pt2, Pt1++; R4 = *Pt11 + *Ptl4, Pt14++;
R1 = Acc1 + *Pt3, Pt2++;
Pt3++, *Pt9 = Acc2 + R1, Pt9 +=2;
/* compute all other points of the column */
/* note inner loop executes in only 4 cycles */
inner_loop:
R1 = *Pt1 + *Pt2, Pt1++, R5 = *Pt11 + *Pt14, Pt14++, CR15--;
R1 = Acc1+*Pt3,Pt2++,R4=*(Pt11+R6)+*P14,Pt14++,Branch(ZC) CR3;
Pt3++, R4=max(R5, Acc2), Pt11 += 2;
*Pt9 = Acc2 + R1, Pt9 += 2;
/* swap current and previous column in memory 32 and loop for all columns */

HMM Program of the Present Invention:

Pt11 = Pt8, CR14--;
Pt9 = Pt10, Cond0 = (CR14==0);
/* exchange pointers of buffers 1 and 2 */
Pt12 = Pt8, Branch (Cond0) CR2;
Pt8 = Pt10;
Pt10 = Pt12;

It is appreciated that although the above program code is applied to process handwriting patterns, it could easily be extended to refer to voice recognition applications on voice patterns.

The preferred embodiment of the present invention, a memory to memory transfer system for transferring information from set or sets of memory locations to alternate set or sets of memory locations having particular use within a multiprocessor pattern recognition system which may be used, for example, for handwriting and/or voice identification applications, is thus described. While the present invention has been described in one particular embodiment, it should be appreciated that the present invention should not be construed as limited by such embodiment, but rather construed according to the below claims.

APPENDIX A

| Opc. | Operation | Name | Flags |
|---|---|---|---|
| 0H | Nop | No operation | |
| 1H | Src1 -Byte- Zero-Ext | First Operand (unsigned byte) | |
| 2H | Src1 -Byte- Sign-Ext | First Operand (signed byte) | |
| 3H | Src1 | First Operand (word) | |
| 4H | Src2-Byte-Zero-Ext | Second Operand (unsigned byte) | |
| 5H | Src2-Byte-Sign-Ext | Second Operand (signed byte) | |
| 6H | Src2 | Second Operand (word) | |
| 7H | Src1 + Src2 | Add | N, Z, C, O |
| 8H | addu Src1 +Src2 | Unsigned Add | Z, C |
| 9H | Src1 +Src2 + CIN | Add with Carry | N, Z, C, O |
| AH | Src1 - Src2 | Sub | N, Z, C, O |
| BH | subu Src1 - Src2 | Unsigned Sub | N, Z, C, O |
| CH | Src2 - Src1 | Reverse Sub | N, Z, C, O |
| DH | subu Src2 -Src1 | Unsigned Reverse Sub | Z, C |
| EH | Src1 - Src2 - CIN | Sub with Carry | N, Z, C, O |
| FH | Src2 - Src1 CIN | Reverse Sub with Carry | N, Z, C, O |
| 10H | Src1 & Scr2 | Logical And | Z |
| 11H | Src1 \| Src2 | Logical Or | Z |
| 12H | ~Src1 | Logical Not First Operand | Z |
| 13H | ~Src2 | Logical Not Second Operand | Z |
| 14H | Src1 ^ Src2 | Logical Xor | Z |
| 15H | ~(Src1 & Src2) | Logical Nand | Z |
| 16H | Rd = 16 bit immediate | Load Immediate | |
| 17H | Min (Src1, Src2) | Minimum | MM |
| 18H | UMin (Scr1, Src2) | Unsigned Minimum | MM |
| 19H | Max (Src1, Src2) | Maximum | MM |
| 1AH | UMax (Src1, Src2) | Unsigned Maximum | MM |
| 1BH | \|Src1 - Src2\| | Absolute Value of Difference | N=0, Z, C=0, O |
| 1CH | Src1 >> Src2 | Right Shift | N=0, Z, C |
| 1DH | Src1 << Src2 | Left Shift | N, Z, C |
| 1EH | Src1 Arith >> Src2 | Arithmetic Right Shift | N, Z, C |
| 1FH | Src1 Right Rot Src2 | Right Rotate | N, Z |
| 20H | Src1 Left Rot Src2 | Left Rotate | N, Z |
| 21H | Src1? Src2 | Compare | N, Z, C=0, O=0 |
| 22H | UComp Src1?Scr2 | Unsigned Compare | N, Z, C=0, O=0 |
| 23H | imull Src1 * Src2 | Integer multiply (lower half) | N, Z, C, O |
| 24H | imulh Src1 * Src2 | Integer multiply (upper half) | N, Z, C=0, O=0 |
| 25H | umull Src1 * Src2 | Unsigned multiply (lower half) | Z, C |
| 26H | umulh Src1 * Src2 | Unsigned multiply (upper half) | Z, C=0 |

42390.P1232

APPENDIX A Cont'd

| 27H | TstSt | Test and Set | |
|---|---|---|---|
| 28H | rpr | Read Pointer Register | |
| 29H | rcr | Read Control Register | |
| 2AH | rsr | Read Special Register | |
| 2BH | wsr | Write Special Register | |
| 2CH | Ext Byte Ld - Zero Extend | External byte Load Zero Extend | |
| 2DH | Ext Byte Ld - Sign Extend | External Byte load Sign Extend | |
| 2EH | Ext Byte St | External Byte Store | |
| 2FH | Ext Word Ld | External Word Load | |
| 30H | Ext Word St | External Word Store | |
| 31H | itp | Interrupt | |
| 32H-3FH | Reserved | | |

42390.P1232

APPENDIX B

| Selector | Offset | Name |
|---|---|---|
| 0000 to FFFE | 0000H - FFFFH | Private Memory 615 |
| FFFF | 0000H - 01FFH | Mem 32 (256 x 16 bits) |
| FFFF | 2000H - 3FFFH | Reserved |
| FFFF | 4000H - 41FFH | Mem 30 (256 x 16 bits) |
| FFFF | 4200H - 7FFFH | Reserved |
| FFFF | 8000H - 8FFFH | Program Memory 415 |
| FFFF | 9000H - EFFFH | Reserved |
| FFFF | F000H - FFFFH | iPR Engine Registers |

| Offset | Name |
|---|---|
| F162H-F163H | Accumulator 2 |
| F160H-F161H | Accumulator 1 |
| F140H-F15FH | GPR: R0-R15 |
| F120H-F13FH | Pointer Registers: P0-P15 |
| F100H-F11FH | Control Registers CR0-CR15 |
| F0FCH-F0FFH | Flag Registers |
| F072H-F0FBH | Reserved |
| F070H-F071H | Data Port |
| F05CH-F06FH | Reserved |
| F054H-F05BH | Active Channel Parameters |
| F040H-F053H | PR Engine Channel Parameters |
| F016H-F03FH | Reserved |
| F014H-F015H | Signature |
| F012H-F013H | Timer 2 |
| F010H-F011H | Timer 1 |
| F00EH-F00FH | Timers Control |
| F00CH-F00DH | Reserved |
| F00AH-F00BH | Memory Configuration |
| F008H-F009H | Mask Register |
| F006H-F007H | PR Engine Status Word (High) |
| F004H-F005H | PR Engine Status Word (Low) |
| F002H-F003H | Command Register |
| F000H-F001H | Program Counter: PC |

42390.P1232

-1̶2̶0̶-
99

APPENDIX C

Short Control Instructions

Short Control Instruction Format

| 1 bit | 3 bits | 4 bits |
|---|---|---|
| 0 | Opcode | CRn |
| 0 | 000 CRn = CR0<br>001 CRn = Immediate(*)<br>010 CRn = Regf(*)<br>011 CRn = CRn − 1<br>100 Cond0 = (CRn ==0)<br>101 Branch Absolute (if Cond0) CRn<br><br>(*) Regf and Immediate are fields of the ALU instruction. | CRn |
| 0 | 110 Cond0 = Flag n | Flag n |
| 0 | 111 Case (Cond Mask) | Cond Mask |

CRn = CRn-1

This instruction decrements the control register CRn by one. Flags NC (Negative in Control Pipe) and ZC (Zero in Control Pipe) are affected. In the currently preferred embodiment, the register specifier n is a number from the set [0...15], representing one of the 16 control registers.

CRn = Immediate

The control register CRn is loaded with the 16 bit immediate field of the ALU instruction. No flags are affected. No ALU or pointer instructions can be grouped with this control instruction. In the currently preferred embodiment, this control instruction must be by itself in a short control instruction. The register specifier n is a number from the set [0...15]. With long control instructions, one can load immediate values in a control register, but these immediate values are 8 bit wide.

CRn = Regf

42390.P1232

APPENDIX C (Cont'd)

The control register CRn is loaded with the content of the general purpose Regf. The general purpose register Regf is specified in the ALU instruction (which has to be an ALU1 instruction). Flags NC and ZC are affected. In the currently preferred embodiment, the general purpose register specifier Regf is a number in the set [0...15], and the register specifier n is a one number from the set [0...15].

Cond0 = (CRn==0)

The content of the control register CRn is compared to 0. If CRn is equal to 0, the condition bit Cond0 (Condition Bit 0) is set to 1. If CRn is different from 0, the condition bit Cond0 is reset to 0. In the currently preferred embodiment, the register specifier n is a number from the set [0...15]. In the currently preferred embodiment, this instruction can only be a short control instruction.

CRn = CR0

The control register CRn is loaded with the content of control register CR0. In the currently preferred embodiment, register specifier n is a number from the set [0...15]. No flags are affected. If n is equal to 0, this instruction is a nop.

Cond0 = Flag n

The condition bit Cond0 is set to 1 if flag n is 1, and reset to 0 if flag n is 0. Note that in the currently preferred embodiment only the first 16 flags can be used in this instruction.

Branch Absolute (if Cond0) CRn

If the condition bit 0 is set to 1, the program counter PC is loaded with the content of the control register CRn. If the condition bit 0 is equal to 0, the branch is not executed, and the program counter PC is incremented normally. In the currently preferred embodiment, the register specifier n is a number from the set [0...15].

Case (Cond Mask)

The four condition bits are ANDed with the mask Cond Mask, which is the last field of this instruction to give a 4 bit index I which addresses the control registers. The program counter is loaded with the content to the control register CR1. I = Cond[3...0] & Cond Mask. PC = CR1. Index I is a number from the set [0...15].

APPENDIX C (Cont'd)

Long Control Instructions

Long Control Instruction Format

| Form | 1 bit | 3 bits | 3 or 4 bits | 5 or 4 bits | 4 bits |
|---|---|---|---|---|---|
| Form1 | 1 | 0 x x | CRm | Cond p | CRn |
| Form2 | 1 | 10 x | 8-bit integer | | CRn |
| Form3 | 1 | 110 | 000 x | CRp (4 bits) | CRn |
| Form4 | 1 | 110 | x x 1 | Flag q (5 bits) | Cond n |
| Form5 | 1 | 110 | 111 | | Cond Mask |
| Form6 | 1 | 111 | x x x | Flag q (5 bits) | CRn |

The following table specifies, for each format, the opcodes and the corresponding instructions in the currently preferred embodiment. Note that the opcode width is different for each type of format.

-~~123~~-
  102

APPENDIX C (Cont'd)

Long Control Instruction Opcode Specification

| Format | Opcode | Instruction |
|---|---|---|
| Format 1 | 000 | Cond p = (CRn == CRm) |
| | 001 | Cond p = (CRn ! = CRm) |
| | 010 | Cond p = (CRn < CRm) |
| | 011 | Cond p = (CRn >= CRm) |
| Format 2 | 100 | CRn = CRn + signed_integer |
| | 101 | CRn = signed_integer |
| Format 3 | 1100000 | CRn = Regf |
| | 1100001 | CRn = CRp |
| Format 4 | 110001 | Cond n = Flag q |
| | 110011 | Set Cond q |
| | 110101 | Reset Cond q |
| Format 5 | 110111 | Case (Cond Mask) |
| Format 6 | 111000 | Branch Relative (if Flag q) (PC + CRn) |
| | 111001 | Branch Relative (if not Flag q) (PC + CRn) |
| | 111010 | Branch Absolute (if Flag q) (CRn) |
| | 111011 | Branch Absolute (if not Flag q) (CRn) |
| | 111100 | Call (if Flag q) (CRn) |
| | 111101 | Call (if not Flag q) (CRn) |
| | 111110 | Halt |
| | 111111 | Nop |

In the currently preferred embodiment, the instructions of format 1 and format 4 involve the condition bits, where the names of the condition bits are Cond0, Cond1, Cond2 and Cond3, but the corresponding values of the fields p, n and q are 1, 2, 3, and 4.

Cond p = (CRn == CRm)

Condition bit p is set to 1 if CRn is equal to CRm. If CRn is different from CRm, condition bit p is reset to 0. In the currently preferred embodiment, register specifier m, n are numbers from the set [0...15] and condition bit p is from the set [0...3].

42390.P1232

-124-
APPENDIX C (Cont'd)

Cond p = (CRn ! = CRm)
Condition bit p is set to 1 if CRn is not equal to CRm. If CRn is equal to CRm, condition bit p is reset to 0. In the currently preferred embodiment, register specifier m, n are numbers from the set [0...15] and condition bit p is a number from the set [0...3].

Cond p = (CRn < CRm)
Condition bit p is set to 1 if CRn is less than CRm. If CRn is equal to or greater than CRm, condition bit p is reset to 0. In the currently preferred embodiment, register specifier m, n is a number from the set [0...15] and condition bit p is in the set [0...3].

Cond p = (CRn >= CRm)
Condition bit p is set to 1 if CRn is equal to or greater than CRm. If CRn is less than CRm, condition bit p is reset to 0. In the currently preferred embodiment, register specifier m, n are each a number from the set [0...15] and condition bit p is in the set [0...3].

CRn = CRn + signed integer
The 8 bit integer field is signed extended and added to the content of CRn. The result is written in the control register CRn. Flags NC and ZC are affected. In the currently preferred embodiment, register specifier n is a number from the set [0...15].

CRn = signed integer
The 8 bit integer field is signed extended and written into the control register CRn. No flags are affected. In the currently preferred embodiment, register specifier n is a number from the set [0...15].

CRn = Regf
The control register CRn is written with the content of the general purpose register Regf. The general purpose Regf is specified in the ALU1 instruction. Flags NC and ZC are affected. In the currently preferred embodiment, specifier Regf is a number in the set [0..15], and the register specifier n is a number from the set [0...15].

CRn = CRp

42390.P1232

APPENDIX C (Cont'd)

The control register CRn is written with the content of the control register CRp. No flags are affected. In the currently preferred embodiment, register specifier p and n are from the set [0...15].

Cond n = Flag q

Condition bit n is set to 1 if flag q is equal to 1, condition bit n is reset to 0 if flag q is equal to 0. In the currently preferred embodiment, condition bit specifier n is in the set [0...3] and flag specifier q is in the set [0...26]

Set Cond q

Condition bit q is set to 1. In the currently preferred embodiment, condition bit specifier q is a number from the set [0...3].

Reset Cond q

Condition bit q is reset to 0. In the currently preferred embodiment, condition bit specifier q is a number from the set [0...3].

Case (Cond Mask)

The four condition bits are ANDed with the mask Cond Mask to give a 4-bit index I. The program counter is loaded with the content of the control register CR1. Index I = Cond[3...0] & Cond Mask. PC = CR1.

RELATIVE BRANCHES are relative to the branch instruction itself. In the following description, PC is the address of the branch instruction.

Branch Relative (if Flag q) (PC + CRn)

If Flag q is set to 1, the content of control register CRn is added to the program counter PC. If the Flag q is not set to 1, the program counter is incremented normally. In the currently preferred embodiment, flag specifier q is in the set [0...26] and the register specifier n is in the set [0...15].

Below is a table showing the list of flags available for branch instructions, and the currently preferred embodiment of their corresponding coding in the field Flag q. Note that in the currently preferred embodiment, the coding 00000 in the flag q field means that no

42390.P1232

APPENDIX C (Cont'd)

flag is tested, and the branch instruction is unconditional. This is true for all flavor of branch and call instructions in the currently preferred embodiment. Note that flags and condition bits are different. In the currently preferred embodiment, condition bits are a sub-set of all available flags.

Flags

| Coding | Mnemonic | Name |
|---|---|---|
| 00000 | True | True Flag (Unconditional) |
| 00001 | Cond0 | Condition Bit 0 |
| 00010 | Cond1 | Condition Bit 1 |
| 00011 | Cond2 | Condition Bit 2 |
| 00100 | Cond3 | Condition Bit 3 |
| 00101 | NC | Negative in Control Pipe |
| 00110 | ZC | Zero in Control Pipe |
| 00111 | ZP1 | Zero in Pointer 1 |
| 01000 | CP1 | Carry in Pointer 1 |
| 01001 | ZP2 | Zero in Pointer 2 |
| 01010 | CP2 | Carry in Pointer 2 |
| 01011 | MC0 | Done Signal Memory Channel 0 |
| 01100 | MC1 | Done Signal Memory Channel 1 |
| 01101 | Timer 1 | Done Signal Timer 1 |
| 01110 | Timer 2 | Done Signal Timer 2 |
| 01111 | | Reserved |
| 10000 | N1 | Negative in ALU1 |

42390.P1232

APPENDIX C (Cont'd)

| | | |
|---|---|---|
| 10001 | Z1 | Zero in ALU1 |
| 10010 | CIN1 | Carry in ALU1 |
| 10011 | O1 | Overflow in ALU1 |
| 10100 | MM1 | Min Max in ALU1 |
| 10101 | N2 | Negative in ALU2 |
| 10110 | Z2 | Zero in ALU 2 |
| 10111 | CIN2 | Carry in ALU2 |
| 11000 | O2 | Overflow in ALU2 |
| 11001 | MM2 | Min Max in ALU2 |
| 11010-11111 | | Reserved |

Branch Relative (if not Flag q) (PC+CRn)

If Flag q is reset to 0, the content of control register CRn is added to the program counter PC. In the currently preferred embodiment, the flag specifier q is in the set of [0...26]. In the currently preferred embodiment, condition bit specifier n is in the set [0...15].

Branch Absolute (if Flag q) (CRn)

If Flag q is set to 1, the program counter PC is loaded with the content of control register CRn. If Flag q is 0, the program counter is incremented normally. In the currently preferred embodiment, the flag specifier q is in the set [0...26], and the register specifier is n is in the set [0...15].

Branch Absolute (if not Flag q) (CRn)

If Flag q is reset to 0, the program counter PC is loaded with the content of control register CRn. If Flag q is 1, the program counter is incremented normally. In the currently preferred embodiment, the flag specifier q is in the set [0...26], and the register specifer n is in the set [0...15].

42390.P1232

APPENDIX C (Cont'd)

Call (if Flag q) (CRn)

If Flag q is set to 1, the program counter PC is loaded with the content of control register CRn, and the address to return to after completion of the sub-routing is stored in CR0. If Flag q is 0, the program counter is incremented normally, and CR0 is not modified. In the currently preferred embodiment, the flag specifier q is in the set [0...26] and the register specifier n is in the set [0...15]. In the currently preferred embodiment, an unconditional branch to CR0 is equivalent to a return, and can be used at the end of a sub-routine.

Call (if Flag not q) (CRn)

If Flag q is reset to 0, the program counter PC is loaded with the content of control register CRn, and the address to return to after completion of the sub-routine is stored in CR0. If Flag q is 1, the program counter is incremented normally, and CR0 is not modified. In the currently preferred embodiment, flag specifier q is in the set [0...26] and the register specifier n is in the set [0...15].
Note that the address to return to after completion of a subroutine is the address of the third instruction after the call. The two instructions following the call are executed in delay mode before the call completes.

Halt

The halt instruction stops execution of the program running in the execution unit of the present invention. In the currently preferred embodiment, the halt instruction is issued only when all register scoreboards are cleared, i.e. when all pending data loads from external memory have returned. In the currently preferred embodiment, the halt instruction cannot be grouped with any other instruction and must be by itself in a long instruction.

What is claimed is:

1. A memory transfer apparatus comprising:

processing means for performing comparisons of written characters and for providing control functions;

memory transfer means for performing memory transfer operations by generating memory access requests in response to a plurality of parameters provided by said processing means, wherein said plurality of parameters are not modified by performing said memory transfer operations such that subsequent memory transfer operations are performed in accordance with said plurality of parameters;

an external memory coupled to said memory transfer means, said external memory to store a plurality of reference patterns representing a plurality of written characters; and first and second internal memories, coupled to said memory transfer means;

wherein a first selected reference pattern representing a first written character of said plurality of reference patterns is transferred to said first internal memory from said external memory during a comparison by said processing means of a second selected reference pattern representing a second written character previously transferred to said second internal memory and an unknown pattern representing an unknown written character, and further wherein a third selected reference pattern representing a third written character of said plurality of reference patterns is transferred to said second internal memory during subsequent comparison by said processing means of said first selected reference pattern and said unknown pattern.

2. A memory transfer apparatus comprising:

(a) a processor to compare patterns representing written characters;

(b) a memory transfer channel that automatically generates memory access requests in response to a plurality of parameters provided by said processor, wherein said plurality of parameters are not modified by performing said memory access requests such that subsequent memory access requests are performed in accordance with said plurality of parameters;

(c) an external memory coupled to said memory transfer channel, said external memory storing a plurality of reference patterns; and (d) internal memory storing an unknown pattern representing a written character and selected reference patterns representing selected written characters selected from said plurality of reference patterns;

wherein a first of said selected reference patterns is transferred from said external memory during a comparison by said processor of said unknown pattern and a previously transferred reference pattern and a second of said selected reference patterns is transferred from said external memory to said internal memory during comparison by said processor of said first selected reference pattern and said unknown pattern.

3. The memory transfer apparatus as described in claim 2 further comprising circuitry to sequentially link memory transfer operations between individual memory transfer channels.

4. A method comprising:

generating memory access requests to a first internal memory and to said external memory to transfer a first selected reference pattern representing a first written character from a library of reference patterns representing a plurality of written characters stored in said external memory between said external memory and said internal memory in response to a first plurality of parameters;

comparing an unknown pattern to said first selected reference pattern; and transferring a second selected reference pattern representing a second written character from said external memory to a second internal memory during comparison of said unknown pattern to said first selected reference pattern in response to a second plurality of parameters;

wherein transfer of said reference patterns between said external memory and said first and second internal memories occur during comparison between said unknown pattern and a previously transferred selected reference pattern and said plurality of parameters are not modified by transferring said first and second selected reference patterns between said external memory and said first and second internal memories such that subsequent transfers are performed in accordance with said plurality of parameters.

* * * * *